United States Patent
Butte et al.

(10) Patent No.: US 12,025,557 B2
(45) Date of Patent: Jul. 2, 2024

(54) SYSTEMS, DEVICES, AND METHODS FOR TIME-RESOLVED FLUORESCENT SPECTROSCOPY

(71) Applicants: Black Light Surgical, Inc., Los Angeles, CA (US); Cedars-Sinai Medical Center, Los Angeles, CA (US)

(72) Inventors: Pramod Butte, Studio City, CA (US); Keith Black, Los Angeles, CA (US); Jack Kavanaugh, Los Angeles, CA (US); Bartosz Bortnik, Los Angeles, CA (US); Zhaojun Nie, Pasadena, CA (US)

(73) Assignees: Black Light Surgical, Inc., Los Angeles, CA (US); Cedars-Sinai Medical Center, Los Angeles, CA (US)

( * ) Notice: Subject to any disclaimer, the term of this patent is extended or adjusted under 35 U.S.C. 154(b) by 0 days.

(21) Appl. No.: 17/578,932

(22) Filed: Jan. 19, 2022

(65) Prior Publication Data
US 2022/0276167 A1 Sep. 1, 2022

Related U.S. Application Data

(63) Continuation of application No. 16/849,102, filed on Apr. 15, 2020, which is a continuation of application (Continued)

(51) Int. Cl.
*G01N 21/64* (2006.01)
*G01J 3/02* (2006.01)
(Continued)

(52) U.S. Cl.
CPC ........ *G01N 21/6408* (2013.01); *G01J 3/0218* (2013.01); *G01J 3/10* (2013.01);
(Continued)

(58) Field of Classification Search
CPC .......... G01N 21/6408; G01N 21/6402; G01N 2021/6484; G01J 3/0218; G01J 3/10;
(Continued)

(56) References Cited

U.S. PATENT DOCUMENTS

| 4,097,338 A | 6/1978 | Konttinen et al. |
| 4,937,457 A | 6/1990 | Mitchell |
| (Continued) | | |

FOREIGN PATENT DOCUMENTS

| CN | 101189505 A | 5/2008 |
| CN | 101262822 A | 9/2008 |
| (Continued) | | |

OTHER PUBLICATIONS

Macklin et al., "Imaging and Time-Revolved Spectroscopy of Single Molecules at an Interface", Science, vol. 272, pp. 255-258. (Year: 1996).*

(Continued)

*Primary Examiner* — Kiho Kim
(74) *Attorney, Agent, or Firm* — Wilson Sonsini Goodrich & Rosati

(57) ABSTRACT

Provided herein are devices, systems, and methods for characterizing a biological sample in vivo or ex vivo in real-time using time-resolved spectroscopy. A light source generates a light pulse or continuous light wave and excites the biological sample, inducing a responsive fluorescent signal. A demultiplexer splits the signal into spectral bands and a time delay is applied to the spectral bands so as to capture data with a detector from multiple spectral bands from a single excitation pulse. The biological sample is characterized by analyzing the fluorescence intensity magnitude and/or decay of the spectral bands. The sample may comprise one or more exogenous or endogenous fluorophore. The device may be a two-piece probe with a detach-
(Continued)

able, disposable distal end. The systems may combine fluorescence spectroscopy with other optical spectroscopy or imaging modalities. The light pulse may be focused at a single focal point or scanned or patterned across an area.

24 Claims, 35 Drawing Sheets

Related U.S. Application Data

No. 15/475,750, filed on Mar. 31, 2017, now Pat. No. 10,656,089.

(60) Provisional application No. 62/351,615, filed on Jun. 17, 2016, provisional application No. 62/317,459, filed on Apr. 1, 2016, provisional application No. 62/317,443, filed on Apr. 1, 2016, provisional application No. 62/317,452, filed on Apr. 1, 2016, provisional application No. 62/317,460, filed on Apr. 1, 2016, provisional application No. 62/317,451, filed on Apr. 1, 2016, provisional application No. 62/317,453, filed on Apr. 1, 2016, provisional application No. 62/317,449, filed on Apr. 1, 2016, provisional application No. 62/317,455, filed on Apr. 1, 2016, provisional application No. 62/317,456, filed on Apr. 1, 2016.

(51) Int. Cl.
| | | |
|---|---|---|
| *G01J 3/10* | (2006.01) | |
| *G01J 3/28* | (2006.01) | |
| *G01J 3/32* | (2006.01) | |
| *G01J 3/44* | (2006.01) | |
| *G01J 3/12* | (2006.01) | |

(52) U.S. Cl.
CPC .............. *G01J 3/2889* (2013.01); *G01J 3/32* (2013.01); *G01J 3/4406* (2013.01); *G01N 21/6402* (2013.01); *G01J 2003/1213* (2013.01); *G01J 2003/1265* (2013.01); *G01N 2021/6484* (2013.01)

(58) Field of Classification Search
CPC .......... G01J 3/2889; G01J 3/32; G01J 3/4406; G01J 2003/1213; G01J 2003/1265
See application file for complete search history.

(56) References Cited

U.S. PATENT DOCUMENTS

| | | | |
|---|---|---|---|
| 5,196,709 A | 3/1993 | Berndt et al. | |
| 5,464,013 A | 11/1995 | Lemelson | |
| 5,585,089 A | 12/1996 | Queen et al. | |
| 5,697,373 A | 12/1997 | Richards-Kortum et al. | |
| 5,701,902 A | 12/1997 | Vari et al. | |
| 5,749,830 A | 5/1998 | Kaneko et al. | |
| 5,762,609 A | 6/1998 | Benaron et al. | |
| 5,769,081 A | 6/1998 | Alfano et al. | |
| 5,991,653 A | 11/1999 | Richards-Kortum et al. | |
| 5,998,597 A | 12/1999 | Fisher et al. | |
| 6,051,437 A | 4/2000 | Luo et al. | |
| 6,095,982 A | 8/2000 | Richards-Kortum et al. | |
| 6,097,485 A | 8/2000 | Lievan | |
| 6,124,597 A | 9/2000 | Shehada et al. | |
| 6,246,817 B1 | 6/2001 | Griffin | |
| 6,258,576 B1 | 7/2001 | Richards-Kortum et al. | |
| 6,272,376 B1 | 8/2001 | Marcu et al. | |
| 6,427,082 B1 | 7/2002 | Nordstrom et al. | |
| 6,571,118 B1 | 5/2003 | Utzinger et al. | |
| 6,697,652 B2 | 2/2004 | Georgakoudi et al. | |
| 6,697,666 B1 | 2/2004 | Richards-Kortum et al. | |
| 6,912,412 B2 | 6/2005 | Georgakoudi et al. | |
| 6,933,154 B2 | 8/2005 | Schomacker et al. | |
| 6,975,899 B2 | 12/2005 | Faupel et al. | |
| 7,015,484 B2 | 3/2006 | Gillispie et al. | |
| 7,103,401 B2 | 9/2006 | Schomacker et al. | |
| 7,113,814 B2 | 9/2006 | Ward et al. | |
| 7,127,282 B2 | 10/2006 | Nordstrom et al. | |
| 7,136,518 B2 | 11/2006 | Griffin et al. | |
| 7,192,783 B2 | 3/2007 | Alfano et al. | |
| 7,253,894 B2 | 8/2007 | Zeng et al. | |
| 7,260,248 B2 | 8/2007 | Kaufman et al. | |
| 7,515,952 B2 | 4/2009 | Balas et al. | |
| 7,647,092 B2 | 1/2010 | Motz et al. | |
| 7,890,157 B2 | 2/2011 | Jo et al. | |
| 8,005,527 B2 | 8/2011 | Zelenchuk | |
| 8,049,880 B2 | 11/2011 | Robbins et al. | |
| 8,089,625 B2 | 1/2012 | Marcu et al. | |
| 8,380,268 B2 | 2/2013 | Georgakoudi et al. | |
| 8,405,827 B2 | 3/2013 | Claps | |
| 9,404,870 B2 | 8/2016 | Butte et al. | |
| 10,288,567 B2 | 5/2019 | Butte et al. | |
| 10,656,089 B2 | 5/2020 | Butte et al. | |
| 10,983,060 B2 | 4/2021 | Butte et al. | |
| 11,630,061 B2 | 4/2023 | Butte et al. | |
| 2002/0016533 A1 | 2/2002 | Marchitto et al. | |
| 2002/0197736 A1 | 12/2002 | Amirkhanian | |
| 2003/0136921 A1 | 7/2003 | Reel | |
| 2003/0236458 A1 | 12/2003 | Hochman | |
| 2004/0029213 A1 | 2/2004 | Callahan et al. | |
| 2004/0039269 A1 | 2/2004 | Ward et al. | |
| 2004/0043502 A1 | 3/2004 | Song et al. | |
| 2004/0225222 A1 | 11/2004 | Zeng et al. | |
| 2005/0105791 A1* | 5/2005 | Lee | G01N 21/47 382/145 |
| 2006/0058683 A1* | 3/2006 | Chance | A61B 5/6834 600/407 |
| 2006/0197033 A1 | 9/2006 | Hairston et al. | |
| 2006/0223172 A1 | 10/2006 | Bedingham et al. | |
| 2006/0229515 A1 | 10/2006 | Sharareh et al. | |
| 2007/0194249 A1 | 8/2007 | Gavrilov et al. | |
| 2007/0197894 A1 | 8/2007 | Jo et al. | |
| 2008/0068615 A1 | 3/2008 | Striemer et al. | |
| 2008/0171383 A1 | 7/2008 | Selker et al. | |
| 2009/0095911 A1 | 4/2009 | Kim et al. | |
| 2009/0099460 A1 | 4/2009 | Zuluaga | |
| 2010/0067003 A1* | 3/2010 | Marcu | G01J 3/02 356/318 |
| 2010/0069720 A1 | 3/2010 | Fulghum et al. | |
| 2010/0106025 A1 | 4/2010 | Sarfaty et al. | |
| 2010/0198080 A1 | 8/2010 | Liu et al. | |
| 2010/0231896 A1* | 9/2010 | Mann | G01N 21/4133 356/73 |
| 2010/0234684 A1 | 9/2010 | Blume et al. | |
| 2011/0240857 A1 | 10/2011 | Kovtoun et al. | |
| 2011/0311442 A1 | 12/2011 | Ehringer et al. | |
| 2011/0319759 A1* | 12/2011 | Liu | A61B 8/12 600/439 |
| 2012/0010541 A1 | 1/2012 | Cain et al. | |
| 2012/0035442 A1 | 2/2012 | Barman et al. | |
| 2012/0088262 A1 | 4/2012 | Dehghani et al. | |
| 2012/0245473 A1 | 9/2012 | Mary-Ann et al. | |
| 2013/0076861 A1 | 3/2013 | Sternklar | |
| 2013/0087718 A1 | 4/2013 | Mei et al. | |
| 2013/0218479 A1 | 8/2013 | Claps | |
| 2014/0187879 A1 | 7/2014 | Wood et al. | |
| 2015/0320319 A1 | 11/2015 | Alfano et al. | |
| 2016/0003742 A1 | 1/2016 | Butte et al. | |
| 2016/0374562 A1 | 12/2016 | Vertikov | |
| 2017/0290515 A1 | 10/2017 | Butte et al. | |
| 2017/0367583 A1 | 12/2017 | Black et al. | |
| 2020/0319108 A1 | 10/2020 | Butte et al. | |
| 2021/0255107 A1 | 8/2021 | Butte et al. | |

FOREIGN PATENT DOCUMENTS

| | | | |
|---|---|---|---|
| CN | 102525481 A | 7/2012 | |
| CN | 102770071 A | 11/2012 | |
| CN | 105359028 A | 2/2016 | |
| EP | 0442295 A2 | 8/1991 | |

(56) References Cited

FOREIGN PATENT DOCUMENTS

| | | |
|---|---|---|
| EP | 1287114 A2 | 3/2003 |
| EP | 1659944 A2 | 5/2006 |
| EP | 2972224 A1 | 1/2016 |
| EP | 3265785 A1 | 1/2018 |
| EP | 3301435 A1 | 4/2018 |
| EP | 3436805 A1 | 2/2019 |
| EP | 4083611 A1 | 11/2022 |
| JP | H07222712 A | 8/1995 |
| JP | H07229835 A | 8/1995 |
| JP | H09121892 A | 5/1997 |
| JP | 2001509589 A | 7/2001 |
| JP | 2004305382 A | 11/2004 |
| JP | 2005512086 A | 4/2005 |
| JP | 2007501414 A | 1/2007 |
| JP | 2008511824 A | 4/2008 |
| JP | 2011503552 A | 1/2011 |
| JP | 2011062348 A | 3/2011 |
| JP | 2011196852 A | 10/2011 |
| JP | 2013027392 A | 2/2013 |
| WO | WO-9006718 A1 | 6/1990 |
| WO | WO-9009637 A1 | 8/1990 |
| WO | WO-9510766 A1 | 4/1995 |
| WO | WO-0008443 A1 | 2/2000 |
| WO | WO-0194528 A2 | 12/2001 |
| WO | WO-2005019800 A2 | 3/2005 |
| WO | WO-2006086382 A2 | 8/2006 |
| WO | WO-2013131062 A1 | 9/2013 |
| WO | WO-2014145786 A1 | 9/2014 |
| WO | WO-2014168734 A1 | 10/2014 |
| WO | WO-2017075176 A1 | 5/2017 |
| WO | WO-2017173315 A1 | 10/2017 |
| WO | WO-2017177194 A1 | 10/2017 |

OTHER PUBLICATIONS

Allen et al., Remington: The Science and Practice of Pharmacy 22nd ed., Pharmaceutical Press (Sep. 15, 2012).
Bigio et al. Ultraviolet and visible spectroscopies fortissue diagnostics: fluorescence spectroscopy and elastic-scattering spectroscopy. Physics in Medicine and Biology (1997). 42(5):803-814.
Blackwell et al. In vivo time-resolved autofluorescence measurements to test for glycation of human skin. Journal of Biomedical Optics (2008). 13(1): 014004.
Butte, et al. 2005. Diagnosis of meningioma by time-resolved fluorescence spectroscopy. Journal of Biomedical Optics, 10(6), 064026. doi:10.1117/1.2141624.
Butte, et al. 2010. Fluorescence lifetime spectroscopy for guided therapy of brain tumors. NeuroImage, 54, S125-S135. doi:10.1016/j.neuroimage.2010.11.001.
Butte, et al. 2010. Intraoperative delineation of primary brain tumors using time-resolved fluorescence spectroscopy. Journal of Biomedical Optics, 15(2), 027008. doi:10.1117/1.3374049.
Butte, P. et al. Time-Resolved Laser Induced Fluorescence Spectroscopy (TRLIFS): A Tool for Intra-operative Diagnosis of Brain Tumors and Maximizing Extent of Surgical Resection. Tumors of the Central Nervous System, vol. 5 (2012), pp. 161-172.
Co-pending U.S. Appl. No. 16/100,638, inventors Blackkeith; L. et al., filed Aug. 10, 2018.
EP16860766.1 European Search Report dated Mar. 6, 2018.
EP17186617.1 European Search Report dated Feb. 7, 2018.
EP17776805.8 Extended European Search Report dated Nov. 8, 2019.
European search report with written opinion dated Dec. 12, 2016 for EP14763125.
Examination Report dated Aug. 3, 2010 European patent application No. 04781453.8 (filed Aug. 19, 2004), 4 pages.
Examination Report dated Dec. 15, 2008 for European patent application No. 04781453.8 (filed Aug. 19, 2004), 4 pages.
Examination Report dated Sep. 11, 2009 European patent application No. 04781453.8 (filed Aug. 19, 2004), 2 pages.
Examination Report dated Feb. 25, 2009 for Japanese patent application No. 2006-523995 (filed Aug. 19, 2004), 7 pages.
Examination Report dated Feb. 8, 2010 for Japanese patent application No. 2006-523995 (filed Aug. 19, 2004), 4 pages.
Fang et al., "Time-Domain laser-Induced Fluorescence Spectroscopy Apparatus for Clinical Diagnostics," Rev. Sci. Instrum., vol. 75, No. 1, pp. 151-162 (2004).
Gallagher NB, et al.,Curve resolution for multivariate images with applications to TOF-SIMS and Raman. Chemometrics and Intelligent Laboratory Systems 2004, 73(1): 105-117.
Greenfield, Antibodies A Laboratory Manual 2nd ed., Cold Spring Harbor Press (Cold Spring Harbor N.Y., 2013).
Haaland, DM., et al., Hyperspectral Confocal Fluorescence Imaging: Exploring Alternative Multivariate Curve Resolution Approaches. Appl Spectrosc 2009, 63(3):271-279.
Haaland, et al., "New augmented classical least squares methods for improved quantitative spectral analyses." Vibrational Spectroscopy 29.1 (2002): 171-175.
Haaland, et al., "New prediction—augmented classical least— squares (PACLS) methods: application to unmodeled interferents." Applied Spectroscopy 54.9 (2000): 1303-1312.
Hornyak et al., Introduction to Nanoscience and Nanotechnology, CRC Press (2008).
Huang et al. Laser-induced autofluorescence microscopy of normal and tumor human colonic tissue. Int J Oncol (2004). 24(1):59-63.
International Preliminary Report on Patentability dated Sep. 24, 2015 for International Application No. PCT/US2014/029781 (7 pages).
International Preliminary Report on Patentability dated Sep. 24, 2015 for International Application No. PCT/US2014/030610 (7 pages).
International Preliminary Report on Patentability dated Feb. 21, 2006 for PCT patent application No. PCT/US04/26759 (filed Aug. 19, 2004), 6 pages.
International Search Report and Written Opinion dated Aug. 10, 2017 for International PCT Patent Application No. PCT/US2017/026697.
International Search Report dated Jul. 25, 2014 for International Application No. PCT/US2014/029781 (3 pages).
International Search Report dated Jul. 30, 2014 for International Application No. PCT/US2014/030610 (3 pages).
International search report with written opinion dated Feb. 27, 2017 for PCT/US2016/059054.
International search report with written opinion dated Jun. 16, 2017 for PCT/US2017/025451.
International search report with written opinion dated Nov. 14, 2005 for PCT/US2004/026759.
Jermyn et al., Intraoperative brain cancer detection with Raman spectroscopy in humans, Science Translational Medicine, Feb. 11, 2015, 7(274) 274ra19 (9 pages).
Jo et al., "Fast Model-Free De-convolution of Fluorescence Decay for Analysis of Biological Systems," J. Biomed. Opt., vol. 9, No. 4., pp. 743-752 (2004).
Jo et al., "Laguerre Nonparametric De-convolution Technique of Time-Resolved Fluorescence Data; Application to the Prediction of Concentrations in a Mixture of Biochemical Components" Conference; Jul. 21, 2004; Proc. SPIE, vol. 5326, Jul. 21, 2004.
Jo et al., "Nonparametric Analysis of Time-Resolved Fluorescence Data Based on the Laguerre Expansion Technique" Proceedings of the 25th Annual International Conference of the IEEE Engineering in Medicine and biology Society, Sep. 17, 2003; pp. 1015-1018; vol. 2.
Kohler et al. Derivation of specific antibody-producing tissue culture and tumor lines by cell fusion. European Journal of Immunology, 6.7 (1976): 511-519.
Kut et al., Detection of Human Brain Cancer Infiltration ex vivo and in vivo Using Quantitative Optical Coherence Tomography, Sci Transl Med., Jun. 1, 20157; 7(292): 292ra100.
Lakowicz, J. R. (2006). Principles of fluorescence spectroscopy (3rd ed., p. xxvi, 954 p.). New York: Springer. Retrieved from http://www.loc.gov/catdir/enhancements/fy0824/2006920796-b.html.

(56) References Cited

OTHER PUBLICATIONS

Ma et al., Technique for real-time tissue characterization based on scanning multispectral fluorescence lifetime spectroscopy (ms-TRFS), 2015, Optics Express vol. 6, No. 3, pp. 987-1002.
Maarek et al., Time-resolved Fluorescence Spectra of Arterial Fluorescent Compounds: Reconstruction with the Laguerre Expansion Technique, 2000, Photochemistry and Photobiology, 71(2), 178-187.
Marcu, et al. (2004). Fluorescence lifetime spectroscopy of glioblastoma multiforme. Photochemistry and Photobiology, 80, 98-103. doi:10.1562/2003-12-09-RA-023.1.
Marcu, L. Fluorescence lifetime in cardiovascular diagnostics. J Biomed Opt. Jan.-Feb. 2010;15(1):011106. doi: 10.1117/1.3327279.
Mayinger et al. Evaluation of in vivo endoscopic autofluorescence spectroscopy in gastric cancer. Gastrointest Endosc (2004). 59(2):191-198.
Notice of allowance dated Apr. 4, 2016 for U.S. Appl. No. 14/776,086.
Notice of Allowance dated Nov. 15, 2010 for U.S. Appl. No. 10/567,248.
Notice of Allowance dated Dec. 23, 2020 for U.S. Appl. No. 16/382,791.
Office action dated Feb. 3, 2017 for U.S. Appl. No. 15/196,354.
Office action dated May 9, 2017 for U.S. Appl. No. 15/475,750.
Office action dated Aug. 24, 2010 for U.S. Appl. No. 10/567,248.
Office Action dated Aug. 28, 2017 for U.S. Appl. No. 15/475,750.
Office Action dated Sep. 5, 2017 for U.S. Appl. No. 15/196,354.
Office action dated Sep. 11, 2009 for U.S. Appl. No. 10/567,248.
Office Action dated Sep. 14, 2017 for U.S. Appl. No. 15/482,442.
Office action dated Dec. 1, 2020 for U.S. Appl. No. 16/849,102.
Office Action dated Dec. 10, 2015 for U.S. Appl. No. 14/776,086.
Phipps, J.E. Time-resolved fluorescence techniques for atherosclerotic cardiovascular disease characterization. 2005, a Ph.D. Dissertation, University of California, Davis. 119 pages. (Year: 2005).
Pogue, et al. (2001). In vivo NADH fluorescence monitoring as an assay for cellular damage in photodynamic therapy. Photochemistry and Photobiology, 74(6), 817-24. Retrieved from http://www.ncbi.nlm.nih.gov/pubmed/11783938.
Riechmann et al. Reshaping human antibodies for therapy. Nature, 332.6162:323-7 (1988).
Rolinsky et al. (2001) A New Approach to Fluorescence Lifetime Sending Based on Molecular Distributions. Proceedings of SPIE, vol. 4252, pp. 1-11.
Sambrook, et al. Molecular Cloning: A Laboratory Manual. 4th Edition, 2012.
Schneckenburger, H. (1992). Fluorescence decay kinetics and imaging of NAD(P)H and flavins as metabolic indicators. Optical Engineering, 31(7), 1447. doi:10.1117/12.57704.
Search Report dated Sep. 25, 2008 for European patent application No. 04781453.8 (filed Aug. 19, 2004), 5 pages.
Siegel et al., "Studying Biological Tissue with Fluorescence Lifetime Imaging; Microscopy, Endoscopy, and Decay Profiles," Applied Optics, vol. 42 pp. 2995-3004 (2003).
Singleton, Dictionary of DNA and Genome Technology 3rd ed., Wiley-Blackwell (Nov. 28, 2012).
Singleton, Dictionary of Microbiology and Molecular Biology 3.sup.rd ed., revised ed., J. Wiley & Sons (New York, N.Y. 2006).
Smith, March's Advanced Organic Chemistry Reactions, Mechanisms and Structure 7.sup.th ed., J. Wiley & Sons (New York, N.Y. 2013).
Sun et al. Simultaneous time- and wavelength-resolved fluorescence spectroscopy for near real-time tissue diagnosis. Optics Letters (2008). 33(6):630-632.
Sun, Y., et al. (2009). Fluorescence lifetime imaging microscopy: in vivo application to diagnosis of oral carcinoma. Opt Lett, 34(13), 2081-2083. doi:183277.
Thomas, et al., Comparison of multivariate calibration methods for quantitative spectral analysis. Analytical Chemistry 1990 62 (10), 1091-1099.
Thomas, E.V., A primer on multivariate calibration. Analytical Chemistry 1994 66 (15), 795A-804A.
U.S. Appl. No. 15/196,354 Notice of Allowance dated Jan. 11, 2019.
U.S. Appl. No. 15/196,354 Office Action dated Jun. 6, 2018.
U.S. Appl. No. 15/475,750 Notice of Allowance dated Mar. 5, 2020.
U.S. Appl. No. 15/475,750 Office Action dated Apr. 8, 2019.
U.S. Appl. No. 15/475,750 Office Action dated Mar. 5, 2018.
U.S. Appl. No. 15/475,750 Office Action dated Oct. 11, 2018.
U.S. Appl. No. 15/475,750 Office Action dated Oct. 24, 2019.
U.S. Appl. No. 15/482,442 Office Action dated Apr. 16, 2018.
U.S. Appl. No. 16/382,791 Office Action dated May 5, 2020.
U.S. Appl. No. 16/849,102 Notice of Allowance dated Oct. 22, 2021.
U.S. Appl. No. 16/849,102 Office Action dated Feb. 7, 2022.
U.S. Appl. No. 16/849,102 Office Action dated May 7, 2021.
U.S. Appl. No. 17/198,816 Notice of Allowance dated Apr. 28, 2022.
U.S. Appl. No. 17/198,816 Office Action dated Nov. 8, 2021.
Wilson, et al. An optical fiber-based diffuse reflectance spectrometer for non-invasive investigation of photodynamic sensitizers in vivo. Proc. SPIE 6, 219-232, Jan. 21, 1990.
Written Opinion dated Jul. 25, 2014 International Application No. PCT/US2014/029781 (5 pages).
Written Opinion dated Jul. 30, 2014 for International Application No. PCT/US2014/030610 (5 pages).
Written Opinion dated Nov. 14, 2005 for PCT patent application No. PCT/US04/26759 (filed Aug. 19, 2004), 5 pages.
Yankelevich et al. Design and evaluation of a device for fast multispectral time-resolved fluorescence spectroscopy and imaging. Rev Sci Instrum. Mar. 2014;85(3):034303.
Yong, et al. Distinction of brain tissue, low grade and high grade glioma with time-resolved fluorescence spectroscopy. Front Biosci. May 1, 2006;11:1255-1263. doi: 10.2741/1878.
Co-pending U.S. Appl. No. 17/870,090, inventors Pramod; Butte et al., filed on Jul. 21, 2022.
EP22160557.9 Extended European Search Report dated Oct. 4, 2022.
U.S. Appl. No. 16/849,102 Notice of Allowance dated Mar. 3, 2023.
U.S. Appl. No. 16/849,102 Office Action dated Aug. 12, 2022.
Triveda, Chintan. Development of a time resolved fluorescence spectroscopy system for near real-time clinical diagnostic applications. May 2009. Office of Graduate Studies of Texas A&M University. 73 Pages.

* cited by examiner

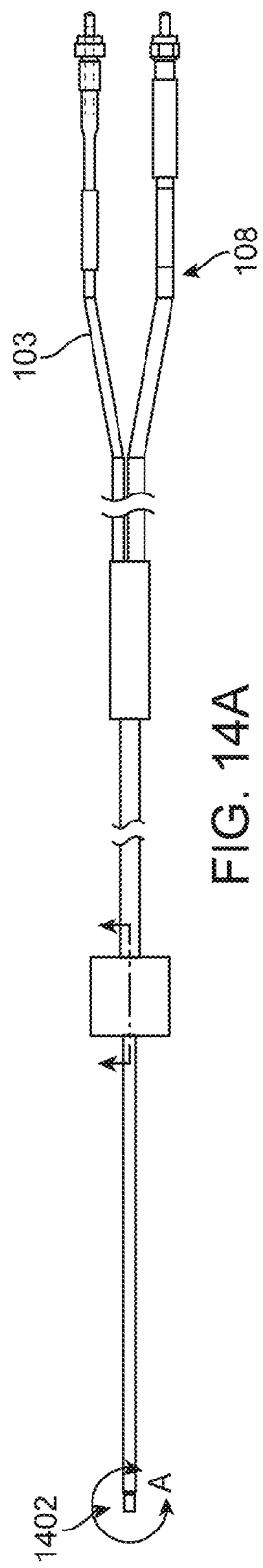
FIG. 14A
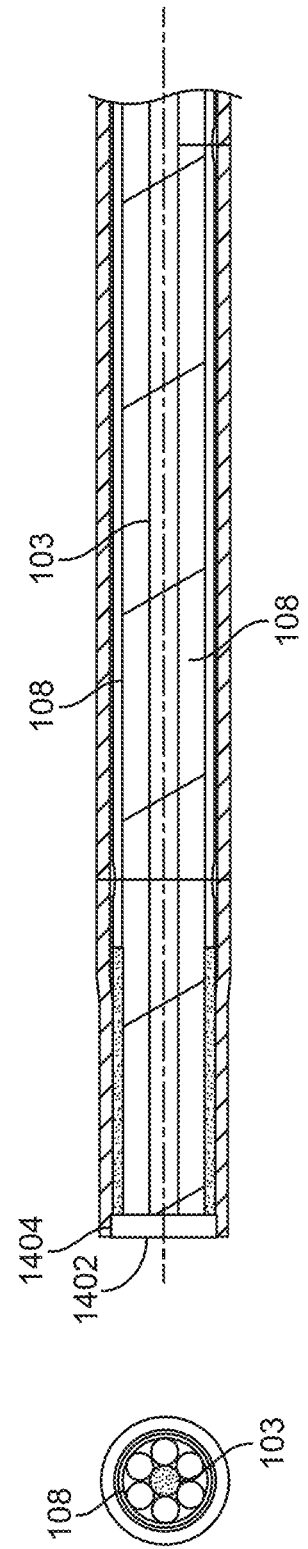
FIG. 14C
FIG. 14B

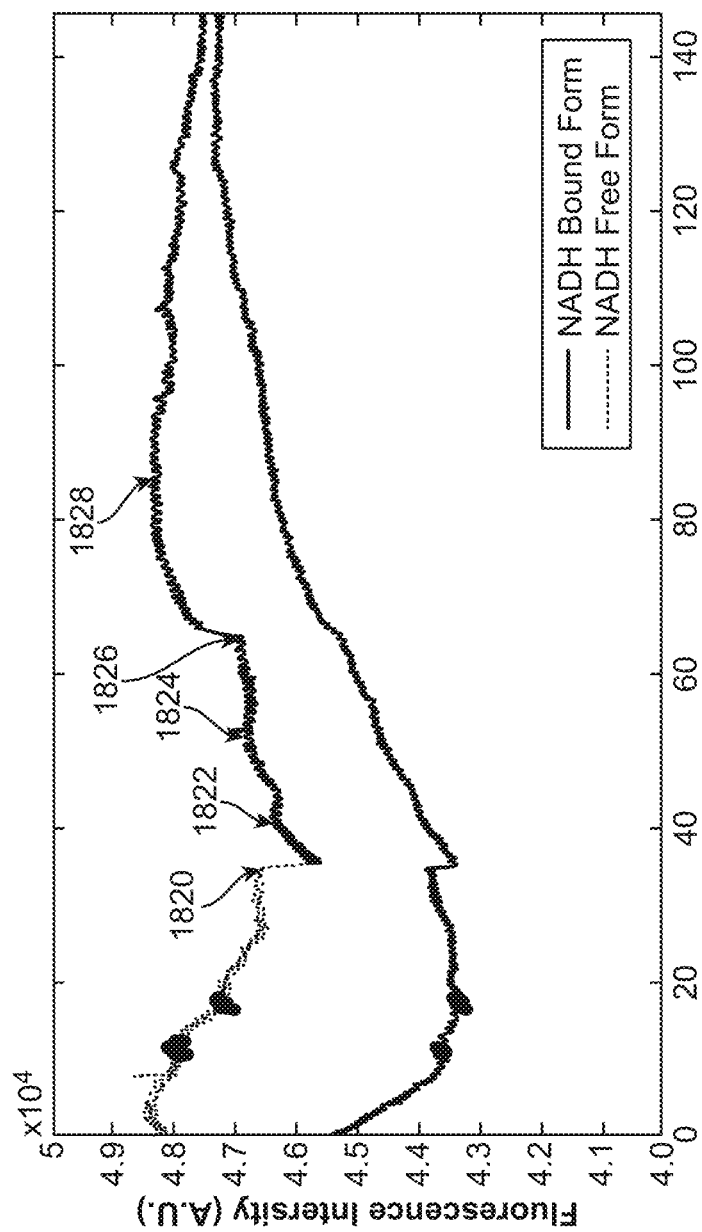

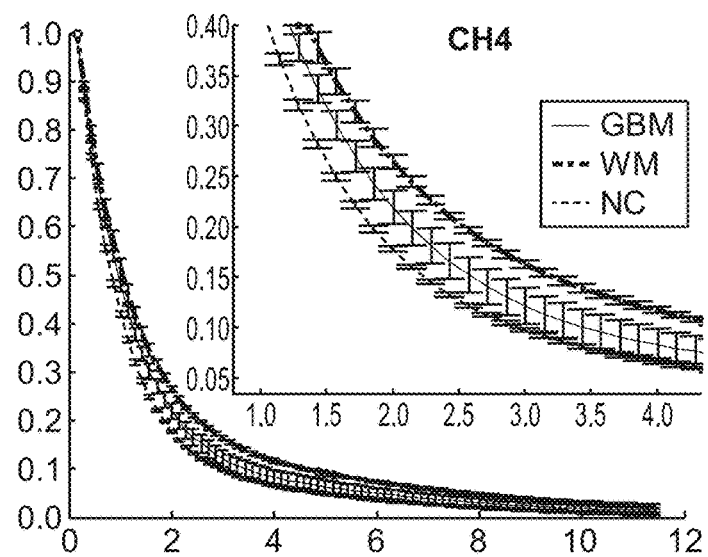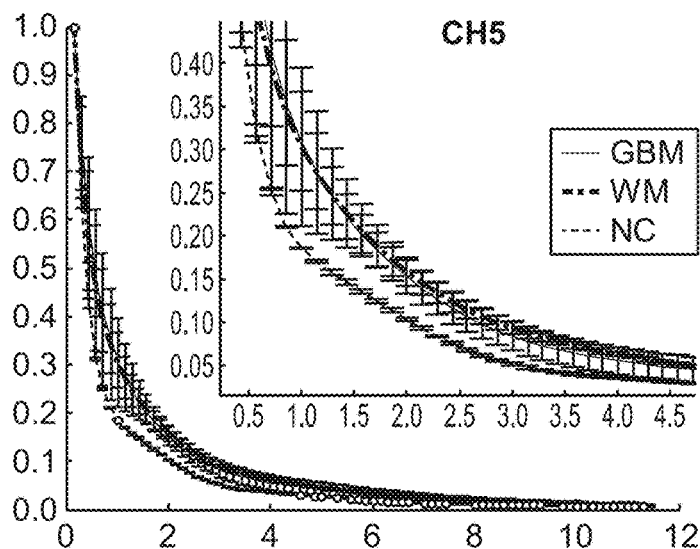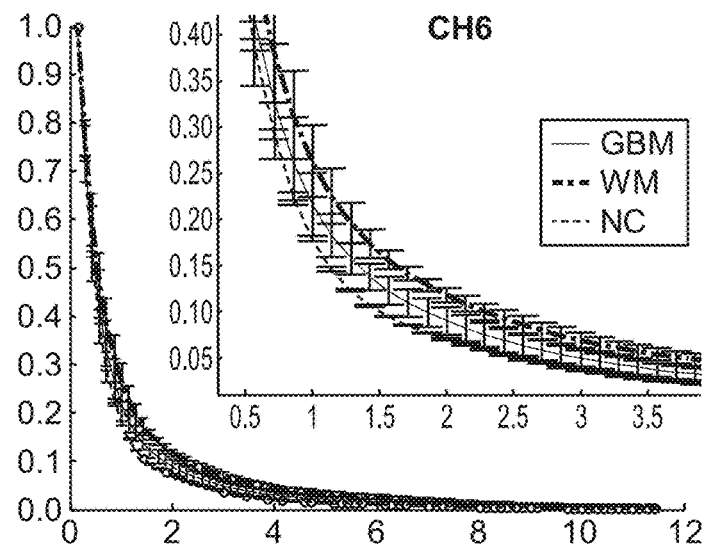
FIG. 22A (Cont.)

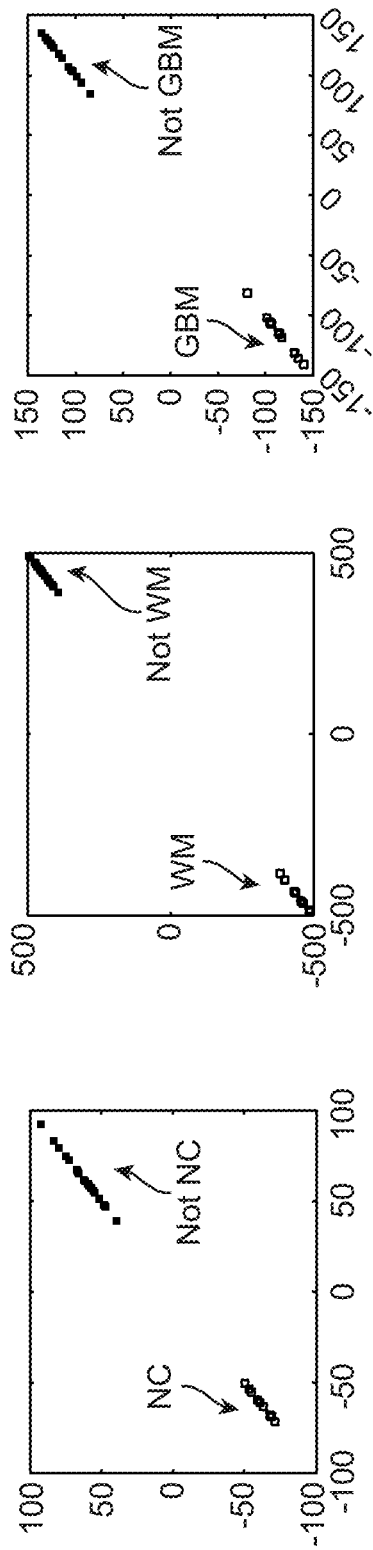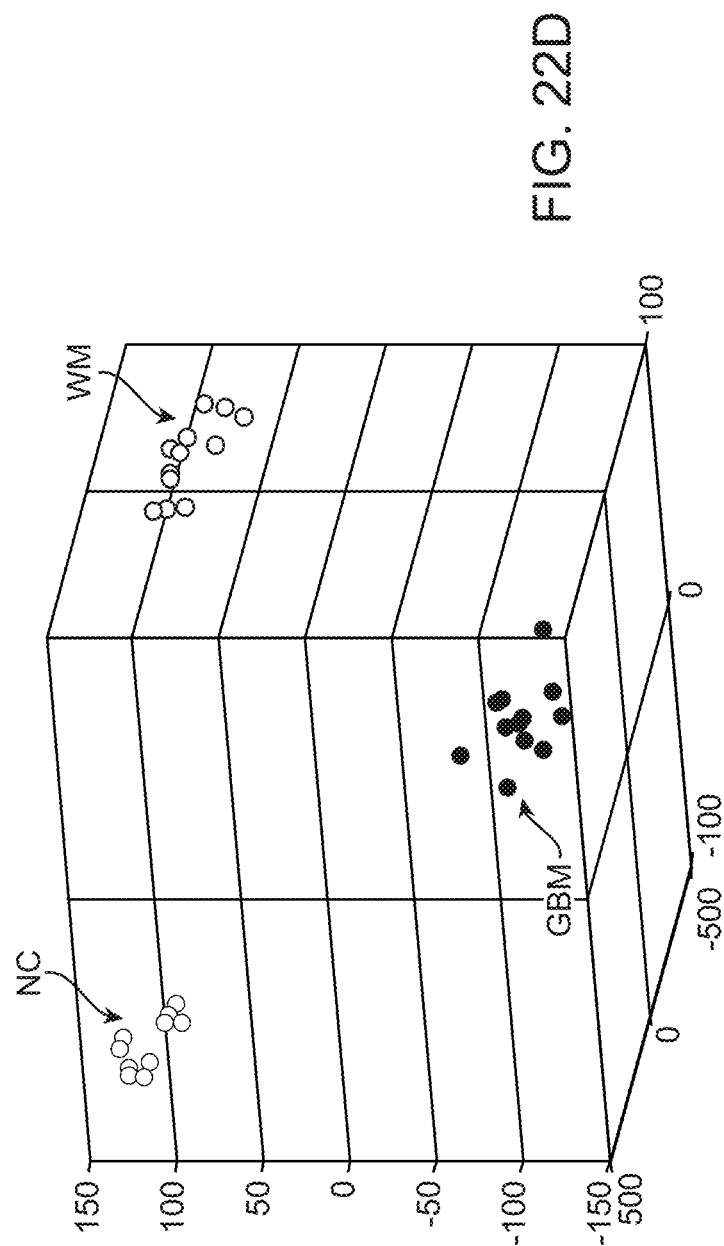
FIG. 22D

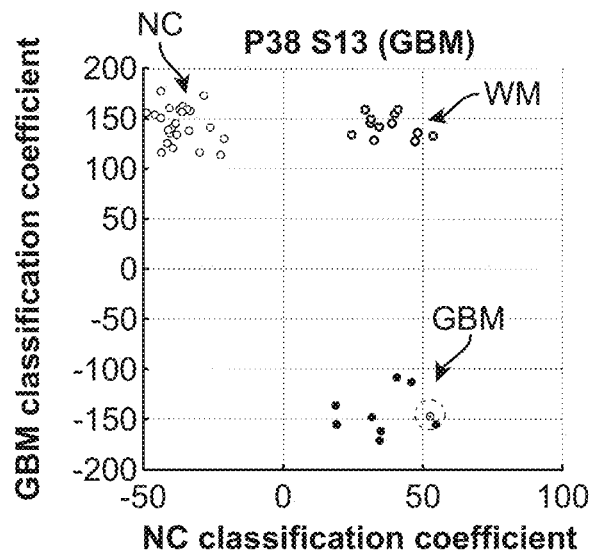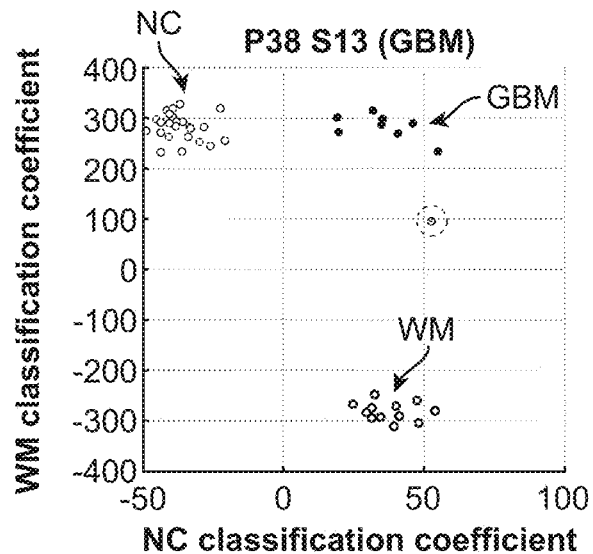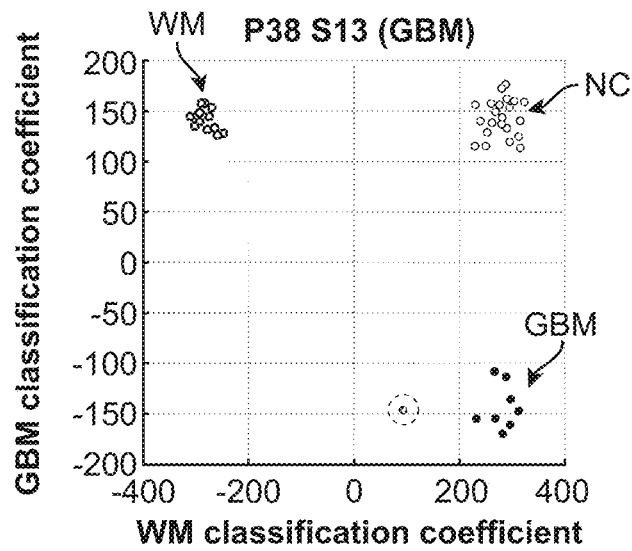
FIG. 25

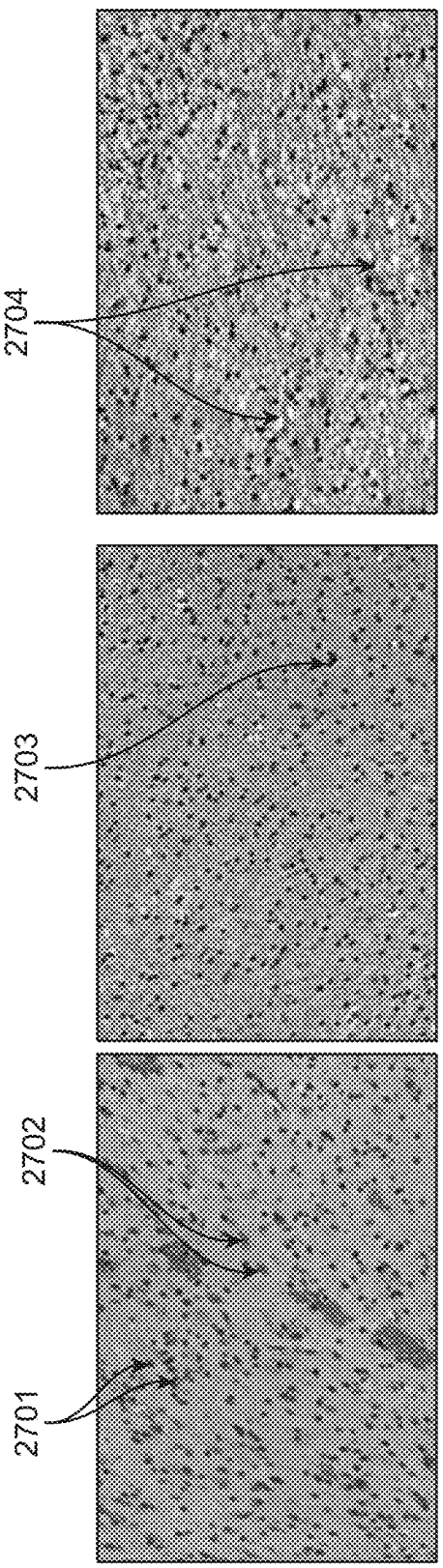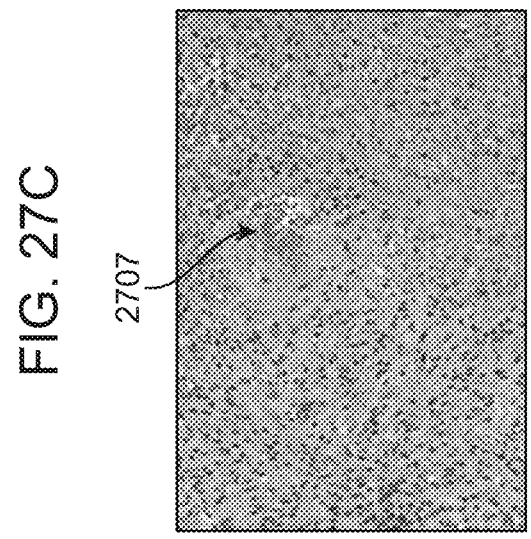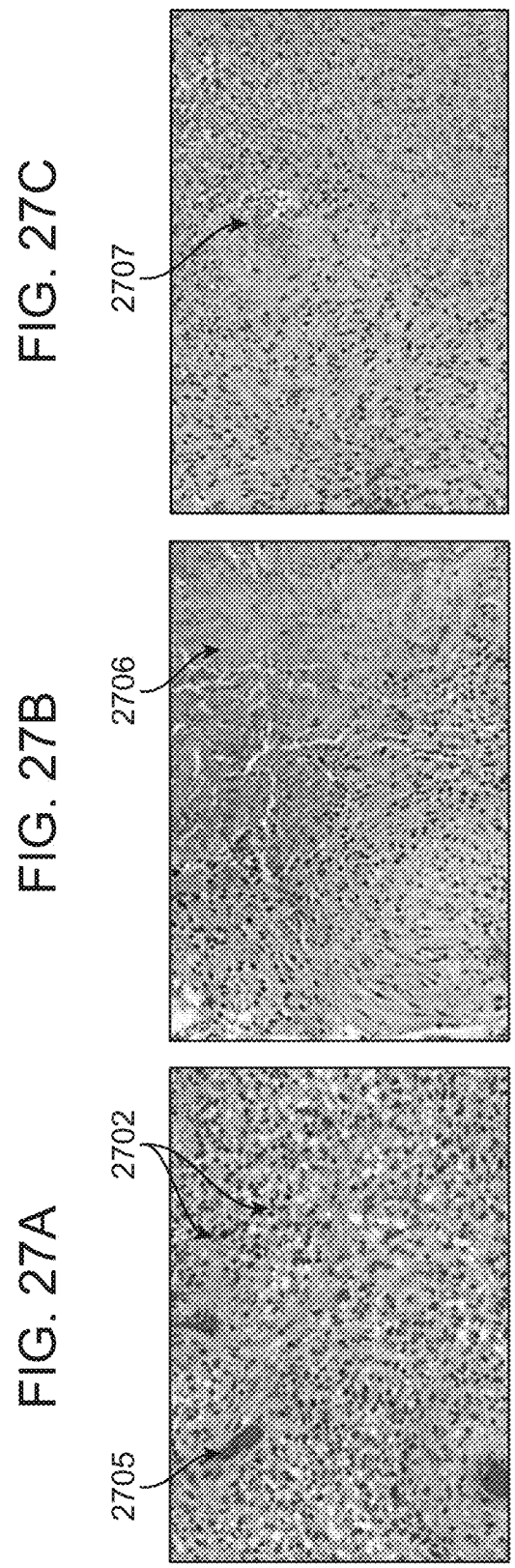

SYSTEMS, DEVICES, AND METHODS FOR TIME-RESOLVED FLUORESCENT SPECTROSCOPY

CROSS-REFERENCE

The present application is a continuation of U.S. patent application Ser. No. 16/849,102, filed Apr. 15, 2020, which is a continuation of U.S. patent application Ser. No. 15/475, 750, filed Mar. 31, 2017, which claims the benefit of U.S. Provisional Application No. 62/317,443, filed Apr. 1, 2016, U.S. Provisional Application No. 62/317,449, filed Apr. 1, 2016, U.S. Provisional Application No. 62/317,451, filed Apr. 1, 2016, U.S. Provisional Application No. 62/317,452, filed Apr. 1, 2016, U.S. Provisional Application No. 62/317, 453, filed Apr. 1, 2016, U.S. Provisional Application No. 62/317,455, filed Apr. 1, 2016, U.S. Provisional Application No. 62/317,456, filed Apr. 1, 2016, U.S. Provisional Application No. 62/317,459, filed Apr. 1, 2016, U.S. Provisional Application No. 62/317,460, filed Apr. 1, 2016, and U.S. Provisional Application No. 62/351,615, filed Jun. 17, 2016, which applications are incorporated herein by reference.

BACKGROUND

Laser-induced fluorescence spectroscopy (LIFS) has the ability to reveal both qualitative and quantitative information about the chemical or biochemical composition of an organic sample. LIFS has been applied in the diagnostic chemistry and medical fields to non-invasively provide information about biological systems in vivo. LIFS has advantages over some other optical techniques in that it can selectively and efficiently excite fluorophores in organic matter and greatly improve the fluorescence selectivity and detectability. Additional advantages of LIFS include wavelength tenability, narrow bandwidth excitation, directivity, and short pulse excitation. Early methods for LIFS detection and classification of biological samples were based on analysis of fluorescence intensity, spectral distribution, and polarization of light collected from the samples after excitation with a laser light source. In at least some instances, however, such detection methods may be unable to distinguish between fluorophores with similar emission spectra and may lack temporal resolution. Time-resolved LIFS (TR-LIFS) techniques build upon the characterization ability of earlier LIFS methods by adding the ability to analyze and characterize biological samples in real-time or near real-time. TR-LIFS takes advantage of short (on the order of nanoseconds) and ultra-short (on the order of picoseconds) pulsed laser technology and high speed electronics in order to allow the real-time evolution of a sample emission to be recorded directly.

Methods of TR-LIFS may involve monitoring the fluorescence lifetime or fluorescence decay of an excited biological sample in order to characterize the sample. Because the light emission process occurs very quickly after excitation by a light pulse (fluorescence decay is on the order of nanoseconds), a time-resolved measurement may provide information about molecular species and protein structures of the sample. While many molecules may have similar excitation and emission spectra, and may have similar fluorescence intensities, the decay profiles may be distinct or unique depending on the structure of the molecules. Thus, analysis of the fluorescence decay by TR-LIFS may distinguish between molecules which traditional LIFS fails to separate. TR-LIFS techniques may also be adapted to distinguish between "early" processes (typically the direct excitation of short-lived states or very rapid subsequent reactions) and "late" processes (typically from long-lived states, delay excitation by persisting electron populations, or by reactions which follow the original direct excitation) in a sample following excitation.

The fluorescence decay data may be complemented by spectral information (e.g. fluorescence intensity) for analysis of complex samples. A technique that has been used to record both fluorescence decay and fluorescence intensity data uses a scanning monochromator to select wavelengths from the broadband sample emission signal one wavelength at a time and direct the filtered signal to a photodetector for detection. However, in order to resolve another wavelength from the emission signal, the sample must be excited again in order to reemit the signal and the scanning monochromator must be re-tuned to a new wavelength. Such repeated measurements may take a significant amount of time, especially if a user wishes to resolve the sample emission signal into multiple spectral components, as switching between wavelengths can be a rate-limiting factor in producing real-time measurements. It would therefore be desirable to provide for characterizing a biological sample with time-resolved and wavelength-resolved analysis in (near) real-time.

SUMMARY

The subject matter described herein generally relates to characterization of a biological sample and, in particular, to methods, systems, and devices for time-resolved fluorescence spectroscopy.

In a first aspect, a device for classifying or characterizing a biological sample is provided. The device may comprise a distal part, a proximal part, an excitation signal transmission element disposed in the proximal part and coupled to a light source, at least one signal collection element disposed in the proximal part, a distal signal transmission element disposed in the distal part, and an optical assembly. The distal part may be detachable from the proximal part. The light source may be configured to generate a light pulse at a pre-determined wavelength configured to cause the biological sample to produce a responsive optical signal. The excitation signal transmission element may be configured to convey the light pulse therethrough. The distal signal transmission element may be coupled to the excitation signal transmission element and the signal collection element when the distal and proximal parts are coupled to one another. The optical assembly may be optically coupled to the at least one signal collection element and the optical delay element. The distal signal transmission element may be configured to direct the light pulse from the excitation signal transmission element to the biological sample. The distal signal transmission element may be configured to collect the responsive optical signal from the biological sample and direct the responsive optical signal to the at least one signal collection element. The optical assembly may be configured to split the responsive optical signal at pre-determined wavelength ranges to obtain a plurality of spectral bands. The biological sample may be characterized in response to the spectral bands.

In further or additional embodiments, wherein the optical assembly comprises an optical delay element and a demultiplexer. The demultiplexer may comprise wavelength splitting filters configured to split the responsive optical signal into the spectral bands. The optical delay element may be configured to provide one or more time delays to the spectral bands. The biological sample may be characterized in response to the one or more delays provided by the optical delay elements to the spectral bands. The one or more time delays may comprise a delay within a range of about 5 ns to about 700 ns, for example.

The wavelength splitting filters may comprise one or more of a neutral density filter, a bandpass filter, a longpass filter, a shortpass filter, a dichroic filter, a notch filter, a mirror, an absorptive filter, an infrared filter, an ultraviolet filter, a monochromatic filter, a dichroic mirror, or a prism.

The optical delay element may comprise at least a first optical fiber and a second optical fiber, the first optical fiber being longer than the second optical fiber. The first optical fiber may be 30 feet, 35 feet, 40 feet, 45 feet, 50 feet, 100 feet, 150 feet, 200 feet, or 250 feet longer than the second optical fiber, for example. The first optical fiber may comprise a first plurality of optical fibers and the second optical fiber may comprise a second plurality of optical fibers, each of the fibers of the first plurality of optical fibers and the second plurality of optical fibers being a different length.

In further or additional embodiments, the optical assembly comprises a filter wheel comprising a plurality of spectral filters. Passing the responsive optical signal through the sequentially through the spectral filters of the filter wheel to generate the spectral bands may impart a pre-determined time-delay between spectral bands generated by the different spectral filters. The filter wheel may comprise a plurality of encoders, each spectral filter being associated with at least one encoder. The filter wheel comprises a rotating filter wheel. The optical assembly may further comprise a mirror galvometer to selectively focus the responsive optical signal to at least one spectral filter of the filter wheel.

In further or additional embodiments, the responsive optical signal may comprise one or more of a fluorescence spectrum, a Raman spectrum, an ultraviolet-visible spectrum, or an infrared spectrum.

In further or additional embodiments, the pre-determined wavelength of the light pulse may be in the ultraviolet spectrum, the visible spectrum, the near infrared spectrum, or the infrared spectrum.

In further or additional embodiments, the excitation signal transmission element may comprise one or more of an optical fiber, a plurality of optical fibers, a fiber bundle, a lens system, a raster scanning mechanism, or a dichroic mirror device.

In further or additional embodiments, the signal collection element may comprise one or more of an optical fiber, a plurality of optical fibers, a fiber bundle, an attenuator, a variable voltage gated attenuator, a lens system, a raster scanning mechanism, a beam splitter, or a dichroic mirror device.

In further or additional embodiments, the biological sample may be characterized as normal, benign, malignant, scar tissue, necrotic, hypoxic, viable, non-viable or inflamed. The biological sample may comprise brain tissue, which may be characterized as normal cortex tissue, white matter tissue, or glioblastoma tissue.

In further or additional embodiments, the light source may comprise a pulsed laser, a continuous wave laser, a modulated laser, a tunable laser, or an LED.

In further or additional embodiments, the light pulse may comprise a laser pulse.

In further or additional embodiments, the biological sample may be characterized with a specificity of about 95 percent or greater.

In further or additional embodiments, the biological sample may be characterized with a sensitivity of about 95 percent or greater.

In further or additional embodiments, the pre-determined wavelength of the light pulse may be in a range of about 300 nm to about 1100 nm. The pre-determined wavelength of the light pulse may be in a range of about 330 nm to about 360 nm, about 420 nm to about 450 nm, about 660 nm to about 720 nm, or about 750 nm to about 780 nm.

In further or additional embodiments, the spectral bands may be in ranges of about 370 nm to about 900 nm. The spectral bands may be in ranges of about 365 nm or less, about 365 nm to about 410 nm, about 410 nm to about 450 nm, about 450 nm to about 480 nm, about 500 nm to about 560 nm, about 560 nm to about 600 nm, and about 600 nm or greater. The spectral bands may be in ranges of about 400 nm or less, about 415 nm to about 450 nm, about 455 nm to about 480 nm, and about 500 nm or greater.

In further or additional embodiments, the distal part may be disposable and replaceable.

In further or additional embodiments, the distal signal transmission element comprises a central fiber to direct the light pulse from the excitation signal transmission element to the biological sample and at least one peripheral fiber to collect the responsive optical signal from the biological sample. The distal signal transmission element may comprise a front-facing window to reduce contamination of space between the central and peripheral fibers, such as a sapphire window. The at least one peripheral fiber may comprise a plurality of fibers, such as a plurality of collection fiber bundles. The optical assembly may comprise the plurality of fibers, the plurality of fibers comprising one or more filters to split the responsive optical signal into the plurality of spectral bands.

In further or additional embodiments, the distal part comprises a handheld probe. The distal part may comprise a suction cannula. The distal party may comprise an ablation element, which may be configured to apply one or more of radiofrequency (RF) energy, thermal energy, cryo energy, ultrasound energy, X-ray energy, laser energy, or optical energy to ablate a target tissue. The ablation element may be configured to apply laser or optical energy to ablate the target tissue, and the ablation element may comprise the distal signal transmission element. That is, the ablative laser or optical energy may be applied through the same transmission element as the excitation signal.

In another aspect, a probe system for classifying or characterizing a biological sample is provided. The probe system may comprise a distal part, a proximal part detachably coupled to the distal part, a proximal transmission element disposed in the proximal part and configured to convey an optical excitation signal, a distal transmission element disposed in the distal part and coupled to the proximal transmission element, a signal collection element disposed in the proximal part and coupled to the distal transmission element, and an optical assembly. The distal transmission element may be configured to receive the optical excitation signal from the proximal transmission element and convey the optical excitation signal to the biological sample. The biological sample may generate a responsive optical signal in response to the optical excitation signal. The responsive optical signal may be received by the distal transmission element. The signal collection element may be configured to receive the responsive optical signal from the distal transmission element. The optical assembly may be configured to receive the responsive optical signal from the signal collection element and split the responsive optical signal into a plurality of spectral bands. The biological sample may be characterized in response to the spectral bands.

In further or additional embodiments, the optical assembly comprises an optical delay element and a demultiplexer. The demultiplexer may comprise wavelength splitting filters configured to split the responsive optical signal into the spectral bands. The optical delay element may be configured to provide one or more time delays to the spectral bands. The biological sample may be characterized in response to the one or more delays provided by the optical delay elements to the spectral bands. The time-delay element may comprise two or more optical fibers of different lengths. The two or more optical fibers may comprise a first optical fiber and a second optical fiber. The first optical fiber may be 30 feet, 35 feet, 40 feet, 45 feet, 50 feet, 100 feet, 150 feet, 200 feet, or 250 feet longer than the second optical fiber. The at least one time delay may comprise a delay within a range of about 5 ns to about 700 ns.

In further or additional embodiments, the optical assembly comprises a filter wheel comprising a plurality of spectral filters. Passing the responsive optical signal through the sequentially through the spectral filters of the filter wheel to generate the spectral bands may impart a pre-determined time-delay between spectral bands generated by the different spectral filters. The filter wheel may comprise a plurality of encoders, and each spectral filter may be associated with at least one encoder. The filter wheel may comprise a rotating filter wheel. The optical assembly may further comprise a mirror galvometer to selectively focus the responsive optical signal to at least one spectral filter of the filter wheel.

In further or additional embodiments, the responsive optical signal may comprise one or more of a fluorescence spectrum, a Raman spectrum, an ultraviolet-visible spectrum, or an infrared spectrum.

In further or additional embodiments, the distal transmission element may comprise one or more of an optical fiber, a gradient-index lens, a ball lens, a dichroic filter, a mirror, or an absorptive filter.

In further or additional embodiments, the biological sample may be characterized with a specificity of about 95 percent or greater.

In further or additional embodiments, the biological sample may be characterized with a sensitivity of about 95 percent or greater.

In further or additional embodiments, the biological sample may be characterized as normal, benign, malignant, scar tissue, necrotic, hypoxic, viable, non-viable or inflamed. The biological sample may comprise brain tissue, which may be characterized as normal cortex tissue, white matter tissue, or glioblastoma tissue.

In further or additional embodiments, the pre-determined wavelength of the light pulse may be in a range of about 300 nm to about 1100 nm. The pre-determined wavelength of the light pulse may be in a range of about 330 nm to about 360 nm, about 420 nm to about 450 nm, about 660 nm to about 720 nm, or about 750 nm to about 780 nm.

In further or additional embodiments, the spectral bands may be in ranges of about 370 nm to about 900 nm. The spectral bands may be in ranges of about 365 nm or less, about 365 nm to about 410 nm, about 410 nm to about 450 nm, about 450 nm to about 480 nm, about 500 nm to about 560 nm, about 560 nm to about 600 nm, and about 600 nm or greater. The spectral bands may be in ranges of about 400 nm or less, about 415 nm to about 450 nm, about 455 nm to about 480 nm, and about 500 nm or greater.

In further or additional embodiments, the distal signal transmission element comprises a central fiber to direct the light pulse from the excitation signal transmission element to the biological sample and at least one peripheral fiber to collect the responsive optical signal from the biological sample. The distal signal transmission element may comprise a front-facing window to reduce contamination of space between the central and peripheral fibers, such as a sapphire window. The at least one peripheral fiber may comprise a plurality of fibers. The plurality of fibers may comprise a plurality of collection fiber bundles. The optical assembly may comprise the plurality of fibers, and the plurality of fibers may comprise one or more filters to split the responsive optical signal into the plurality of spectral bands.

In further or additional embodiments, the distal part is disposable and replaceable. The distal part may comprise a handheld probe. The distal part may comprise a suction cannula. The distal part may comprise an ablation element, which may be configured to apply one or more of radiofrequency (RF) energy, thermal energy, cryo energy, ultrasound energy, X-ray energy, laser energy, or optical energy to ablate a target tissue. The ablation element may be configured to apply laser or optical energy to ablate the target tissue, and the ablation element may comprise the distal signal transmission element. That is, the ablative laser or optical energy may be applied through the same transmission element as the excitation signal.

In another aspect, a probe for classifying or characterizing a biological sample is provided. The probe may comprise a distal part and a distal transmission element disposed in the distal part. The distal part may be detachably coupled to a proximal part. The proximal part may comprise a proximal transmission element disposed in the proximal part and configured to convey an optical excitation signal. The distal transmission element may be coupled to the proximal transmission element. The distal transmission element may be configured to receive the optical excitation signal from the proximal transmission element and convey the optical excitation signal to the biological sample. The biological sample may generate a responsive optical signal in response to the optical excitation signal. The responsive optical signal may be received by the distal transmission element. A signal collection element disposed in the proximal part may be coupled to the distal transmission element and may receive the responsive optical signal from the distal transmission element. An optical assembly may receive the responsive optical signal from the signal collection element and may split the responsive optical signal into a plurality of spectral bands. The biological sample may be characterized in response to the spectral bands.

In further or additional embodiments, the optical assembly comprises an optical delay element and a demultiplexer. The demultiplexer may comprise wavelength splitting filters configured to split the responsive optical signal into the spectral bands. The optical delay element may be configured to provide one or more time delays to the spectral bands. The biological sample may be characterized in response to the one or more delays provided by the optical delay elements to the spectral bands. The time-delay element may comprise two or more optical fibers of different lengths. The two or more optical fibers may comprise a first optical fiber and a second optical fiber, and the first optical fiber may be 30 feet, 35 feet, 40 feet, 45 feet, 50 feet, 100 feet, 150 feet, 200 feet, or 250 feet longer than the second optical fiber. The at least one time delay may comprise a delay within a range of about 5 ns to about 700 ns.

In further or additional embodiments, the optical assembly comprises a filter wheel comprising a plurality of spectral filters. Passing the responsive optical signal through the sequentially through the spectral filters of the filter wheel to generate the spectral bands may impart a pre-determined time-delay between spectral bands generated by the different spectral filters. The filter wheel may comprise a plurality of encoders, each spectral filter being associated with at least one encoder. The filter wheel may comprise a rotating filter wheel. The optical assembly may further comprise a mirror galvometer to selectively focus the responsive optical signal to at least one spectral filter of the filter wheel.

In further or additional embodiments, the responsive optical signal may comprise one or more of a fluorescence spectrum, a Raman spectrum, an ultraviolet-visible spectrum, or an infrared spectrum.

In further or additional embodiments, the distal transmission element may comprise one or more of an optical fiber, a gradient-index lens, a ball lens, a dichroic filter, a mirror, or an absorptive filter.

In further or additional embodiments, one or more of the proximal part or the distal part may comprise a coupling element which couples the distal transmission element to the proximal transmission element and the signal collection element.

In further or additional embodiments, the biological sample may be characterized as normal, benign, malignant, scar tissue, necrotic, hypoxic, viable, non-viable or inflamed. The biological sample may comprise brain tissue, which may be characterized as normal cortex tissue, white matter tissue, or glioblastoma tissue.

In further or additional embodiments, the biological sample may be characterized with a specificity of about 95 percent or greater.

In further or additional embodiments, the biological sample may be characterized with a sensitivity of about 95 percent or greater.

In further or additional embodiments, the pre-determined wavelength of the light pulse may be in a range of about 300 nm to about 1100 nm. The pre-determined wavelength of the light pulse may be in a range of about 330 nm to about 360 nm, about 420 nm to about 450 nm, about 660 nm to about 720 nm, or about 750 nm to about 780 nm.

In further or additional embodiments, the spectral bands may be in ranges of about 370 nm to about 900 nm. The spectral bands may be in ranges of about 365 nm or less, about 365 nm to about 410 nm, about 410 nm to about 450 nm, about 450 nm to about 480 nm, about 500 nm to about 560 nm, about 560 nm to about 600 nm, and about 600 nm or greater. The spectral bands may be in ranges of about 400 nm or less, about 415 nm to about 450 nm, about 455 nm to about 480 nm, and about 500 nm or greater.

In further or additional embodiments, the distal transmission element comprises a central fiber to direct the light pulse from the proximal transmission element to the biological sample and at least one peripheral fiber to collect the responsive optical signal from the biological sample. The distal transmission element may comprise a front-facing window to reduce contamination of space between the central and peripheral fibers, such as a sapphire window. The at least one peripheral fiber may comprise a plurality of fibers. The plurality of fibers may comprise a plurality of collection fiber bundles. The optical assembly may comprise the plurality of fibers, and the plurality of fibers may comprise one or more filters to split the responsive optical signal into the plurality of spectral bands.

In further or additional embodiments, the distal part is configured to be handheld. The distal part may comprise a suction cannula. The distal part may be disposable. The distal part may comprise an ablation element, which may be configured to apply one or more of radiofrequency (RF) energy, thermal energy, cryo energy, ultrasound energy, X-ray energy, laser energy, or optical energy to ablate a target tissue. The ablation element may be configured to apply laser or optical energy to ablate the target tissue, and the ablation element may comprise the distal signal transmission element. That is, the ablative laser or optical energy may be applied through the same transmission element as the excitation signal.

In another aspect, a system for classifying or characterizing a biological sample is provided. The system may comprise an excitation signal transmission element, a light source coupled to the excitation signal transmission element and configured to generate a light pulse at a pre-determined wavelength configured to cause the biological sample to produce a responsive optical signal, at least one signal collection element, and an optical assembly coupled to the at least one collection element. The light pulse may be conveyed from the light source to the biological sample by the excitation signal transmission element. The responsive optical signal may comprise a first spectrum and a second spectrum, the first spectrum comprising a fluorescence spectrum. The at least one signal collection element may be adapted to collect the responsive optical signal from the biological sample. The optical assembly may be configured to receive the responsive optical signal from the at least one signal collection element. The optical assembly may be configured to split the first spectrum of the responsive optical signal at pre-determined wavelengths to obtain spectral bands. The biological sample may be characterized in response to the spectral bands and the second spectrum.

In further or additional embodiments, the optical assembly comprises an optical delay element and a demultiplexer. The demultiplexer may comprise wavelength splitting filters configured to split the first spectrum of the responsive optical signal into the first set of spectral bands. The optical delay element may be configured to provide one or more time delays to the first set of spectral bands. The second spectrum may be split by the demultiplexer to obtain a second set of spectral bands and the biological sample is characterized in response to the time-delayed first set of spectral bands and the second set of spectral bands.

In some embodiments, the optical assembly may comprise a second demultiplexer. The second spectrum may be split by the second demultiplexer to obtain a second set of spectral bands and the biological sample is characterized in response to the time-delayed first and second sets of spectral bands. The second demultiplexer may comprise one or more of a beam splitter, an absorptive filter, a lowpass filter, a highpass filter, a notch filter, or a mirror.

In some embodiments, the biological sample is characterized in response to the one or more delays provided by the optical delay elements to the first set of spectral bands. The one or more time delays may comprise a delay within a range of about 5 ns to about 700 ns.

In further or additional embodiments, the second spectrum may comprise one or more of a Raman spectrum, an ultraviolet-visible spectrum, or an infrared spectrum.

In further or additional embodiments, the pre-determined wavelength of the light pulse may be in the ultraviolet spectrum, the visible spectrum, the near infrared spectrum, or the infrared spectrum.

In further or additional embodiments, the biological sample may be characterized with a specificity of about 95 percent or greater.

In further or additional embodiments, the biological sample may be characterized with a sensitivity of about 95 percent or greater.

In further or additional embodiments, the biological sample may be characterized as normal, benign, malignant, scar tissue, necrotic, hypoxic, viable, non-viable or inflamed. The biological sample may comprise brain tissue, which may be characterized as normal cortex tissue, white matter tissue, or glioblastoma tissue.

In some embodiments, the light source may comprise a pulsed laser, a continuous wave laser, a modulated laser, a tunable laser, or an LED.

In further or additional embodiment, the light pulse may comprise a laser pulse.

In further or additional embodiment, the light pulse may comprise a continuous light wave.

In further or additional embodiments, the pre-determined wavelength of the light pulse may be in a range of about 300 nm to about 1100 nm. The pre-determined wavelength of the light pulse may be in a range of about 330 nm to about 360 nm, about 420 nm to about 450 nm, about 660 nm to about 720 nm, or about 750 nm to about 780 nm.

In further or additional embodiments, the spectral bands may be in ranges of about 370 nm to about 900 nm. The spectral bands may be in ranges of about 365 nm or less, about 365 nm to about 410 nm, about 410 nm to about 450 nm, about 450 nm to about 480 nm, about 480 nm to about 500 nm, about 500 nm to about 560 nm, about 560 nm to about 600 nm, and about 600 nm or greater. The spectral bands may be in ranges of about 400 nm or less, about 415 nm to about 450 nm, about 455 nm to about 480 nm, and about 500 nm or greater.

In another aspect, a method for classifying or characterizing a biological sample is provided. A biological sample may be radiated with a light pulse at a pre-determined wavelength to cause the biological sample to produce a responsive fluorescence signal. The responsive fluorescence signal may be collected from the biological sample. The responsive fluorescence signal may be split at pre-determined wavelength ranges to obtain spectral bands. The biological sample may be characterized in response to the spectral bands. The light pulse may comprise a plurality of pulses such that two photons of the pulses simultaneously radiate the biological sample and combine to cause the biological sample to produce the responsive fluorescence signal.

In further or additional embodiments, at least one time delay is applied to the spectral bands with a time delay mechanism. The at least one time delay may comprise a time delay within a range of about 5 ns to about 700 ns. The time-delay mechanism may comprise a plurality of optical fibers or optical fiber bundles, each fiber or fiber bundle having a different length to provide at least one delay in travel time of the spectral bands.

In further or additional embodiments, the responsive fluorescence signal may be split with a demultiplexer and/or by passing the responsive fluorescence signal through a filter wheel. Passing the responsive optical signal through the sequentially through the spectral filters of the filter wheel to generate the spectral bands may impart a pre-determined time-delay between spectral bands generated by the different spectral filters.

In further or additional embodiments, the pre-determined wavelength of the light pulse may be in the near infrared spectrum or the infrared spectrum.

In further or additional embodiments, the spectral bands may be detected with a photodetector.

In further or additional embodiments, the responsive fluorescence signal may be split at the pre-determined wavelength ranges by applying one or more wavelength filters to the responsive fluorescence signal.

In further or additional embodiments, the biological sample may be characterized with a specificity of about 95 percent or greater.

In further or additional embodiments, the biological sample may be characterized with a sensitivity of about 95 percent or greater.

In further or additional embodiments, the light pulse may comprise a laser pulse.

In further or additional embodiments, the biological sample may be characterized as normal, benign, malignant, scar tissue, necrotic, hypoxic, viable, non-viable or inflamed. The biological sample may comprise brain tissue, which may be characterized as normal cortex tissue, white matter tissue, or glioblastoma tissue.

In further or additional embodiments, the light source may comprise a pulsed laser, a continuous wave laser, a modulated laser, a tunable laser, or an LED.

In further or additional embodiments, the pre-determined wavelength of the light pulse may be in a range of about 300 nm to about 1100 nm. The pre-determined wavelength of the light pulse may be in a range of about 330 nm to about 360 nm, about 420 nm to about 450 nm, about 660 nm to about 720 nm, or about 750 nm to about 780 nm.

In further or additional embodiments, the spectral bands may be in ranges of about 370 nm to about 900 nm. The spectral bands may be in ranges of about 365 nm or less, about 365 nm to about 410 nm, about 410 nm to about 450 nm, about 450 nm to about 480 nm, about 500 nm to about 560 nm, about 560 nm to about 600 nm, and about 600 nm or greater. The spectral bands may be in ranges of about 400 nm or less, about 415 nm to about 450 nm, about 455 nm to about 480 nm, and about 500 nm or greater.

In further or additional embodiments, the biological sample comprises a target tissue, which is ablated such as by applying one or more of radiofrequency (RF) energy, thermal energy, cryo energy, ultrasound energy, X-ray energy, laser energy, or optical energy to the target tissue. The target tissue may be ablated in response to the characterization of the biological sample. The target tissue may be ablated with a probe, and the probe may be configured to radiate the biological sample with the light pulse and collect the responsive fluorescence signal as well.

In another aspect, a method for image-guided surgery is provided. A target tissue may be radiated with a light pulse at a pre-determined wavelength configured to cause the target tissue to produce a responsive fluorescence signal. The responsive fluorescence signal may be collected from the biological sample. The responsive fluorescence signal may be split at pre-determined wavelengths to obtain spectral bands. The target tissue may be characterized in response to the spectral bands. The target tissue may be imaged with an imaging device to produce an image of the biological sample. The characterization of the target tissue may be registered with the image to generate spectroscopic information for the target tissue. The spectroscopic information for the target tissue may be displayed.

In further or additional embodiments, the target tissue being imaged with an imaging device includes generating one or more of a pre-operative or intra-operative image of the target tissue. The spectroscopic information may be displayed on the pre-operative or intra-operative image.

In further or additional embodiments, the pre-determined location may be imaged by generating an MRI image, an ultrasound image, a CT image, an OCT image, an NMR image, a PET image, or an EIT image. The image may be generated using one or more of an MRI scanner, a CT scanner, a PET scanner, an optical coherence tomography (OCT) device, an ultrasound transducer, an NMR imager, or an electrical impedance tomography (EIT) device.

In further or additional embodiments, biological sample may be characterized with a specificity of about 95 percent or greater.

In further or additional embodiments, biological sample may be characterized with a sensitivity of about 95 percent or greater.

In further or additional embodiments, a location of the probe is tracked. To registering the characterization of the target tissue with the image to generate spectroscopic information for the target tissue, the characterization of the target tissue may be registered with the tracked location of the probe and the image to generate the spectroscopic information for the target tissue at the tracked location.

In further or additional embodiments, the light pulse may comprise a laser pulse.

In further or additional embodiments, the biological sample may be characterized as normal, benign, malignant, scar tissue, necrotic, hypoxic, viable, non-viable or inflamed. The biological sample comprises brain tissue, which may be characterized as normal cortex tissue, white matter tissue, or glioblastoma tissue.

In further or additional embodiments, the light source may comprise a pulsed laser, a continuous wave laser, a modulated laser, a tunable laser, or an LED.

In further or additional embodiments, the pre-determined wavelength of the light pulse may be in a range of about 300 nm to about 1100 nm. The pre-determined wavelength of the light pulse may be in a range of about 330 nm to about 360 nm, about 420 nm to about 450 nm, about 660 nm to about 720 nm, or about 750 nm to about 780 nm.

In further or additional embodiments, the spectral bands may be in ranges of about 370 nm to about 900 nm. The spectral bands may be in ranges of about 365 nm or less, about 365 nm to about 410 nm, about 410 nm to about 450 nm, about 450 nm to about 480 nm, about 500 nm to about 560 nm, about 560 nm to about 600 nm, and about 600 nm or greater. The spectral bands may be in ranges of about 400 nm or less, about 415 nm to about 450 nm, about 455 nm to about 480 nm, and about 500 nm or greater.

In further or additional embodiments, the responsive fluorescence signal may be split by splitting the responsive fluorescence signal with a demultiplexer and/or filter element.

In further or additional embodiments, the target tissue is ablated such as by applying one or more of radiofrequency (RF) energy, thermal energy, cryo energy, ultrasound energy, X-ray energy, laser energy, or optical energy to the target tissue. The target tissue may be ablated in response to the characterizing of the target tissue. The target tissue may be ablated with a probe, and the probe may be configured to radiate the target tissue with the light pulse and collect the responsive fluorescence signal as well.

In another aspect, a method for detection of an exogenous fluorescent molecule is provided. A biological sample comprising an exogenous fluorescent molecule may be radiated with a light pulse at a pre-determined wavelength to radiate the exogenous fluorescent molecule to cause the exogenous fluorescent molecule to produce a responsive fluorescence signal. The responsive fluorescence signal may be collected from the biological sample. The responsive fluorescence signal may be split at pre-determined wavelengths to obtain spectral bands. A concentration of the exogenous fluorescent molecule in the biological sample may be determined in response to the spectral bands.

In further or additional embodiments, at least one time delay is applied to the spectral bands. The at least one time delay may comprise a delay within a range of about 5 ns to about 700 ns. The at least one time delay may be applied with a time-delay mechanism which may comprise a plurality of optical fibers or optical fiber bundles, each fiber or fiber bundle having a different length to provide at least one delay in travel time of the spectral bands.

In further or additional embodiments, the responsive fluorescence signal is split with a demultiplexer and/or by passing the responsive fluorescence signal through a filter wheel. Passing the responsive optical signal through the sequentially through the spectral filters of the filter wheel to generate the spectral bands may impart a pre-determined time-delay between spectral bands generated by the different spectral filters.

In further or additional embodiments, the pre-determined wavelength of the light pulse may be in the ultraviolet spectrum, the visible spectrum, the near infrared spectrum, or the infrared spectrum.

In further or additional embodiments, the pre-determined wavelength of the light pulse may be in a range of about 300 nm to about 1100 nm. The pre-determined wavelength of the light pulse may be in a range of about 330 nm to about 360 nm, about 420 nm to about 450 nm, about 660 nm to about 720 nm, or about 750 nm to about 780 nm.

In further or additional embodiments, the spectral bands may be in ranges of about 370 nm to about 900 nm. The spectral bands may be in ranges of about 365 nm or less, about 365 nm to about 410 nm, about 410 nm to about 450 nm, about 450 nm to about 480 nm, about 500 nm to about 560 nm, about 560 nm to about 600 nm, and about 600 nm or greater. The spectral bands may be in ranges of about 400 nm or less, about 415 nm to about 450 nm, about 455 nm to about 480 nm, and about 500 nm or greater.

In further or additional embodiments, the light pulse may comprise a laser pulse.

In s further or additional embodiments, the exogenous fluorescent molecule may comprise a fluorescently-labeled drug, a fluorescent dye, or a fluorescently-labeled tissue marker. The exogenous fluorescent molecule may comprise one or more of ICG-labeled chlorotoxin, ICG-labeled knottin, Cy5-labeled knottin, Cy7-labeled knottin, a fluorescently-conjugated tumor-targeting antibody, or a fluorescently-labeled tumor-targeting moiety.

In further or additional embodiments, the method may further comprise determining a distribution of the exogenous fluorescent molecule in the biological sample.

In further or additional embodiments, determining the concentration of the exogenous fluorescent molecule may comprise comparing the spectral bands to data generated from spectral bands of the exogenous fluorescent molecule at known concentrations.

In further or additional embodiments, the biological sample is characterized in response to the determined concentration of the exogenous fluorescent molecule. The biological sample may be characterized as normal, benign, malignant, scar tissue, necrotic, hypoxic, viable, non-viable or inflamed tissue. The biological sample may comprise brain tissue, which may be characterized as normal cortex tissue, white matter tissue, or glioblastoma tissue.

In further or additional embodiments, the biological sample comprises a target tissue, which is ablated such as by applying one or more of radiofrequency (RF) energy, thermal energy, cryo energy, ultrasound energy, X-ray energy, laser energy, or optical energy to the target tissue. The target tissue may be ablated in response to the determined concentration of the exogenous fluorescent molecule in the biological sample. The target tissue may be ablated with a probe, and the probe may be configured to radiate the biological sample with the light pulse and collect the responsive fluorescence signal as well.

In another aspect, a device for classifying or characterizing a biological sample is provided. The device comprises an excitation signal transmission element coupled to a light source, a signal modifying element coupled to the excitation signal transmission element, at least one signal collection element, and an optical assembly. The light source is configured to generate a light pulse at a pre-determined wavelength configured to cause the biological sample to produce a responsive optical signal. The excitation signal transmission element is configured to convey the light pulse to the signal modifying element. The signal modifying element is configured to receive the light pulse from the excitation signal transmission element and direct the light pulse to the biological sample. The at least one signal collection element is configured to receive the responsive optical signal from the biological sample. The optical assembly is configured to receive the responsive optical signal from the at least one signal collection element and split the responsive optical signal into a plurality of spectral bands. The biological sample is characterized in response to the spectral bands.

Optionally, the signal modifying element may be configured to shape the light pulse with one or more pre-determined patterns. The signal modifying element may comprise a digital micromirror device.

In some embodiments, the signal modifying element may be configured to scan the light pulse across a pre-determined portion of the biological sample. The signal modifying element may comprise a raster scanning mechanism.

In further or additional embodiments, the optical assembly comprises a time delay element and a demultiplexer. The demultiplexer may be configured to split the responsive optical signal into the spectral bands. The time delay element may be configured to provide one or more time delays to the spectral bands. The time delay element may comprise two or more optical fibers of different lengths. The time delay may comprise a delay within a range of about 5 ns to about 700 ns.

In further or additional embodiments, the optical processing element comprises a filter wheel configured to split the responsive optical signal into the spectral bands. Passing the responsive optical signal through the sequentially through the spectral filters of the filter wheel to generate the spectral bands may impart a pre-determined time-delay between spectral bands generated by the different spectral filters.

In further or additional embodiments, the responsive optical signal may comprise one or more of a fluorescence spectrum, a Raman spectrum, an ultraviolet-visible spectrum, or an infrared spectrum.

In further or additional embodiments, the biological sample may be characterized with a specificity of about 95 percent or greater.

In further or additional embodiments, the biological sample may be characterized with a sensitivity of about 95 percent or greater.

In further or additional embodiments, the biological sample may be characterized as normal, benign, malignant, scar tissue, necrotic, hypoxic, viable, non-viable or inflamed. The biological sample may comprise brain tissue, which may be characterized as normal cortex tissue, white matter tissue, or glioblastoma tissue.

In further or additional embodiments, the pre-determined wavelength of the light pulse may be in a range of about 300 nm to about 1100 nm. The pre-determined wavelength of the light pulse may be in a range of about 330 nm to about 360 nm, about 420 nm to about 450 nm, about 660 nm to about 720 nm, or about 750 nm to about 780 nm.

In further or additional embodiments, the spectral bands may be in ranges of about 370 nm to about 900 nm. The spectral bands may be in ranges of about 365 nm or less, about 365 nm to about 410 nm, about 410 nm to about 450 nm, about 450 nm to about 480 nm, about 500 nm to about 560 nm, about 560 nm to about 600 nm, and about 600 nm or greater. The spectral bands may be in ranges of about 400 nm or less, about 415 nm to about 450 nm, about 455 nm to about 480 nm, and about 500 nm or greater.

In another aspect, a method for classifying or characterizing a biological sample is provided. A biological sample may be radiated with a first patterned light pulse at a pre-determined wavelength to cause the biological sample to produce a responsive optical signal. The responsive optical signal may be collected from the biological sample. The responsive optical signal may be split at pre-determined wavelength ranges to obtain spectral bands. The biological sample may be characterized in response to the spectral bands.

In further or additional embodiments, the biological sample may be radiated with a second patterned light pulse at the pre-determined wavelength to cause the biological sample to produce a second responsive optical signal. The second responsive optical signal may be collected from the biological sample. The second responsive optical signal may be split at the pre-determined wavelength ranges to obtain a second set of spectral bands. The biological sample may be characterized in response to the first set of spectral bands and the second set of spectral bands. An image may be generated from the first set of spectral bands and the second set of spectral bands.

In further or additional embodiments, the responsive optical signal may comprise one or more of a fluorescence spectrum, a Raman spectrum, an ultraviolet-visible spectrum, or an infrared spectrum.

In further or additional embodiments, at least one time delay is applied to the spectral bands with a time delay mechanism. The time-delay mechanism may comprise a plurality of optical fibers or optical fiber bundles, each fiber or fiber bundle having a different length to provide a gap in travel time of the spectral bands. The time-delay mechanism may comprise two or more optical fibers of different lengths. The at least one time delay may comprise a delay within a range of about 5 ns to about 700 ns.

In further or additional embodiments, the responsive optical signal may be split with a demultiplexer and/or a filter wheel. Passing the responsive optical signal through the sequentially through the spectral filters of the filter wheel to generate the spectral bands may impart a pre-determined time-delay between spectral bands generated by the different spectral filters.

In further or additional embodiments, the biological sample may be characterized with a specificity of about 95 percent or greater.

In further or additional embodiments, the biological sample may be characterized with a sensitivity of about 95 percent or greater.

In further or additional embodiments, the biological sample may be characterized as normal, benign, malignant, scar tissue, necrotic, hypoxic, viable, non-viable or inflamed. The biological sample may comprise brain tissue, which may be characterized as normal cortex tissue, white matter tissue, or glioblastoma tissue.

In further or additional embodiments, the patterned light pulse may comprise a patterned laser pulse.

In further or additional embodiments, the patterned light pulse may be patterned using an optical mask.

In further or additional embodiments, the pre-determined wavelength of the patterned light pulse may be in a range of about 300 nm to about 1100 nm. The pre-determined wavelength of the patterned light pulse may be in a range of about 330 nm to about 360 nm, about 420 nm to about 450 nm, about 660 nm to about 720 nm, or about 750 nm to about 780 nm.

In further or additional embodiments, the spectral bands may be in ranges of about 370 nm to about 900 nm. The spectral bands may be in ranges of about 365 nm or less, about 365 nm to about 410 nm, about 410 nm to about 450 nm, about 450 nm to about 480 nm, about 500 nm to about 560 nm, about 560 nm to about 600 nm, and about 600 nm or greater. The spectral bands may be in ranges of about 400 nm or less, about 415 nm to about 450 nm, about 455 nm to about 480 nm, and about 500 nm or greater.

In further or additional embodiments, the biological sample comprises a target tissue, which is ablated such as by applying one or more of radiofrequency (RF) energy, thermal energy, cryo energy, ultrasound energy, X-ray energy, laser energy, or optical energy to the target tissue. The target tissue may be ablated in response to the determined concentration of the exogenous fluorescent molecule in the biological sample. The target tissue may be ablated with a probe, and the probe may be configured to radiate the biological sample with the light pulse and collect the responsive fluorescence signal as well.

In another aspect, a method for characterizing a biological sample is provided. A biological sample may be radiated with a light pulse in a pre-determined pattern and at a pre-determined wavelength to cause the biological sample to produce a responsive optical signal. The responsive optical signal may be collected from the biological sample. The responsive optical signal may be split at pre-determined wavelength ranges to obtain spectral bands. The biological sample may be characterized in response to the spectral bands.

In further or additional embodiments, the biological sample may be radiated in the pre-determined pattern at at least a first location and a second location. A first optical signal may be collected from the first location and a second optical signal may be collected from the second location. The first optical signal may be split to obtain a first set of spectral bands, and the second optical signal may be split to obtain a second set of spectral bands. The biological sample may be characterized in response to the first set of spectral bands and the second set of spectral bands. An image may be generated from the first set of spectral bands and the second set of spectral bands.

In further or additional embodiments, at least one time delay is applied to the spectral bands with a time delay mechanism. The at least one time delay may comprise a delay within a range of about 5 ns to about 700 ns.

In some embodiments, the time-delay mechanism may comprise a plurality of optical fibers or optical fiber bundles, each fiber or fiber bundle having a different length to provide a delay in travel time of the spectral bands.

In some embodiments, the time-delay mechanism may comprise two or more optical fibers of different lengths.

In further or additional embodiments, splitting the responsive optical signal may comprise splitting the responsive optical signal with a demultiplexer and/or a filter wheel. Passing the responsive optical signal through the sequentially through the spectral filters of the filter wheel to generate the spectral bands may impart a pre-determined time-delay between spectral bands generated by the different spectral filters.

In further or additional embodiments, the responsive optical signal comprises one or more of a fluorescence spectrum, a Raman spectrum, an ultraviolet-visible spectrum, or an infrared spectrum.

In further or additional embodiments, the biological sample may be characterized with a specificity of about 95 percent or greater.

In further or additional embodiments, the biological sample may be characterized with a sensitivity of about 95 percent or greater.

In further or additional embodiments, the biological sample may be characterized as normal, benign, malignant, scar tissue, necrotic, hypoxic, viable, non-viable or inflamed. The biological sample may comprise brain tissue, which may be characterized as normal cortex tissue, white matter tissue, or glioblastoma tissue.

In further or additional embodiments, the light pulse may be radiated in the pre-determined patterned using a scanning mechanism.

In further or additional embodiments, the pre-determined wavelength of the light pulse may be in a range of about 300 nm to about 1100 nm. The pre-determined wavelength of the light pulse may be in a range of about 330 nm to about 360 nm, about 420 nm to about 450 nm, about 660 nm to about 720 nm, or about 750 nm to about 780 nm.

In further or additional embodiments, the spectral bands may be in ranges of about 370 nm to about 900 nm. The spectral bands may be in ranges of about 365 nm or less, about 365 nm to about 410 nm, about 410 nm to about 450 nm, about 450 nm to about 480 nm, about 500 nm to about 560 nm, about 560 nm to about 600 nm, and about 600 nm or greater. The spectral bands may be in ranges of about 400 nm or less, about 415 nm to about 450 nm, about 455 nm to about 480 nm, and about 500 nm or greater.

In further or additional embodiments, the biological sample comprises a target tissue, which is ablated such as by applying one or more of radiofrequency (RF) energy, thermal energy, cryo energy, ultrasound energy, X-ray energy, laser energy, or optical energy to the target tissue. The target tissue may be ablated in response to the determined concentration of the exogenous fluorescent molecule in the biological sample. The target tissue may be ablated with a probe, and the probe may be configured to radiate the biological sample with the light pulse and collect the responsive fluorescence signal as well.

These and other embodiments are described in further detail in the following description related to the appended drawing figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the present disclosure are set forth with particularity in the appended claims. A better understanding of the features and advantages of the present disclosure will be obtained by reference to the following detailed description that sets forth illustrative embodiments, in which the principles of the present disclosure are utilized, and the accompanying drawings of which:

FIG. 14A shows a schematic of a probe for time-resolved spectroscopy, in accordance with embodiments;

FIG. 14B shows a magnified end view of the tip of the probe of FIG. 14A, in accordance with embodiments;

FIG. 14C shows a magnified, section view of the tip of the probe of FIG. 14A, in accordance with embodiments;

FIG. 22D shows a chart of the characterization of tissue in a training cohort of samples, in accordance with embodiments;

FIG. 25 shows a chart of the results of tissue characterization in a third brain tumor experiment, in accordance with embodiments;

FIGS. 27A-27F show representative histological images of different tissue classes used in tissue characterization of brain tumors, in accordance with embodiments;

DETAILED DESCRIPTION

Figure 1:
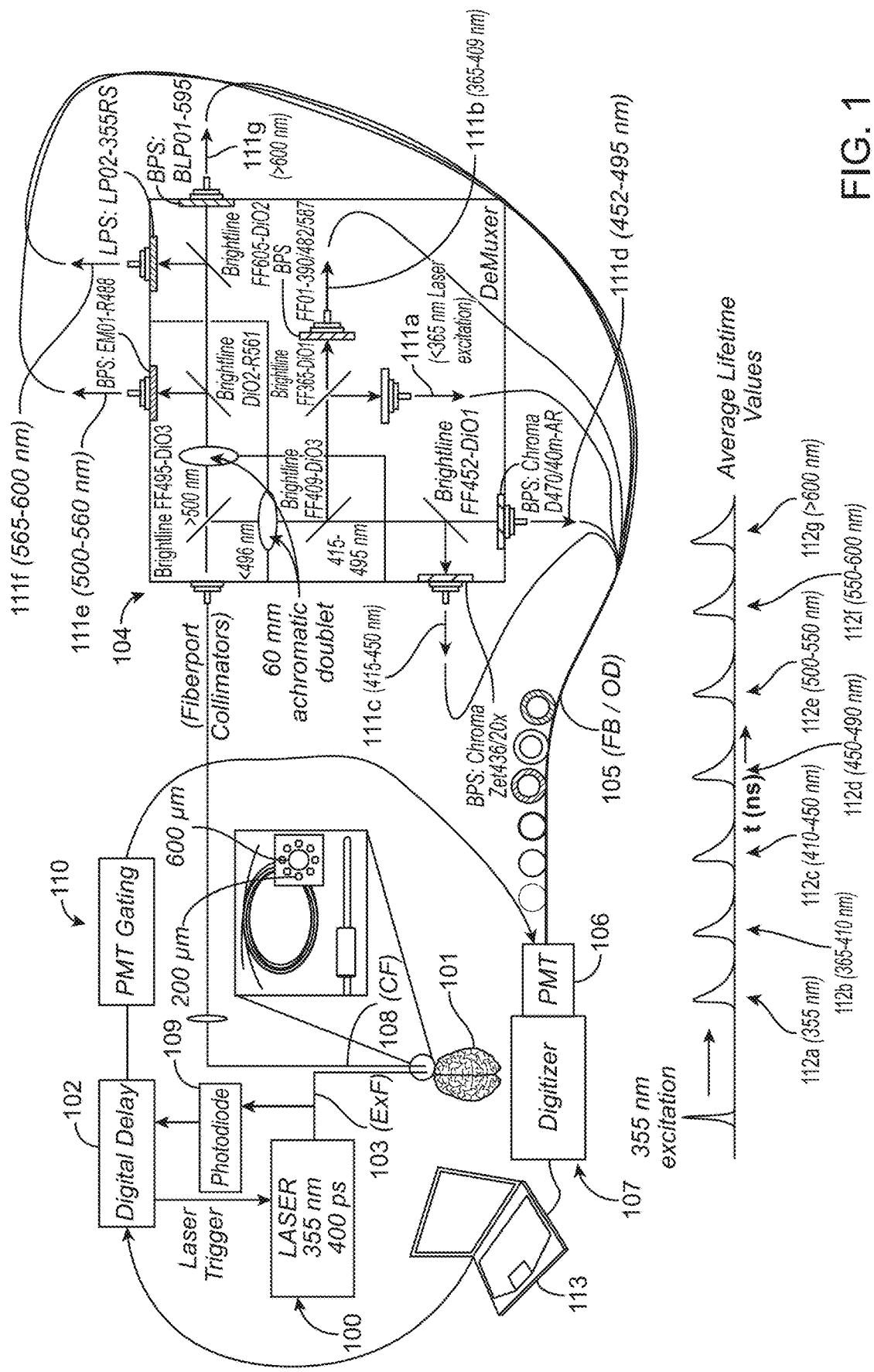
FIG. 1 shows a schematic of a time-resolved fluorescence spectroscopy (TRFS) system, in accordance with embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments, however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Although specific reference is made to characterizing brain tissue as malignant or non-malignant, the methods, systems, and devices disclosed herein can be used with many types of biological sample including blood, plasma, urine, tissue, microorganisms, parasites, saliva, sputum, vomit, cerebrospinal fluid, or any other biological sample from which a chemical signal can be detected. The biological sample may be a solid, semi-solid, or liquid biological sample. The biological sample may comprise tissue from the prostate, lung, kidney, brain, mucosa, skin, liver, colon, bladder, muscle, breast, eye, mouth, muscle, lymph node, ureters, urethra, esophagus, trachea, stomach, gallbladder, pancreas, intestines, heart, spleen, thymus, thyroid, ovaries, uterus, lungs, appendix, blood vessel, bone, rectum, testicle, or cervix, to name a few. The biological sample may be any tissue or organ that is accessible through non-surgical or surgical techniques. The biological sample may be collected from a patient and characterized ex vivo. For example, the biological sample may be a biopsy that is analyzed in the operating room during surgery or in a pathology lab to provide a preliminary diagnosis prior to immunohistochemical analysis. Alternatively, the biological sample may be characterized in vivo. For example, the embodiments disclosed herein may be used to characterize tissue in the brain, breast, or skin, for example, to distinguish between cancerous and non-cancerous tissue prior to surgical resection.

The systems, devices, and methods disclosed herein may be used to characterize a biological sample. The biological sample may, for example, be characterized as normal, benign, malignant, scar tissue, necrotic, hypoxic, viable, non-viable, inflamed, or the like. The systems, devices, and methods disclosed herein may be used to assess for post-injury tissue viability, determine tumor margins, monitor cellular metabolism, monitor therapeutic drug concentrations in blood plasma, or the like. The systems, devices, and methods disclosed herein may be adapted for a variety of applications and uses depending on the biological sample and molecule(s) of interest being assayed.

Although specific reference is made to characterizing a biological sample using an emitted fluorescence spectrum, it will be understood that the systems, methods, and devices disclosed herein can be used to characterize tissue with many types of optical spectra. For example, the signal emitted by the biological sample in response to excitation with a light pulse may comprise a fluorescence spectrum, a Raman spectrum, an ultraviolet-visible spectrum, an infrared spectrum, or any combination thereof.

FIG. 1 shows a schematic of a time-resolved fluorescence spectroscopy system. The system may be used to characterize a biological samples using real-time, or near real-time, time-resolved fluorescence spectroscopy. The system may comprise an excitation signal transmission element 103, a light source 100, at least one signal collection element 108, an optical assembly such as a demultiplexer 104 (described in detail in FIG. 2), and an optical delay device or element 105. The system may further comprise one or more of a detector 106, a digitizer 107, a photodiode 109, a detector gate 110, or a trigger synchronization mechanism 102 (described in detail in FIG. 5). The system may further comprise a computer or processor 113 with which the data may be processed.

The light source 100 may be configured to generate a light pulse or beam of continuous light at a pre-determined excitation wavelength. The light pulse may be directed towards the biological sample 101, for example, a patient's brain, by the excitation signal transmission element 103, for example, an optical fiber. Excitation by the light pulse may cause the biological sample 101 to produce a responsive optical signal which may be collected by one or more signal collection element 108. The responsive optical signal may then be directed towards the demultiplexer 104 by the signal collection element 108 in order to split the responsive optical signal into at least two spectral bands 111a-111g (i.e., spectral bands 111a, 111b, 111c, 111d, 111e, 111f, and 111g) at pre-determined wavelengths. The spectral bands 111a-111g may then be directed to an optical delay device 105 which applies at least one time delay to the spectral bands 111a-111g in order to temporally separate the spectral bands 111a-111g prior to being recorded. The time-delayed spectral bands 112a-112g (i.e., time-delayed spectral bands 112a, 112b, 112D, 112d, 112e, 112f, 112g corresponding to spectral bands 111a, 111b, 111c, 111d, 111e, 111f, and 111g, respectively) may then be directed towards the detector 106 and detected one at a time. For each spectral band 112a-112g, the detector 106 may record the fluorescence decay and the fluorescence intensity of a spectral band before the next spectral band reaches the detector 106. In this way, a single excitation light pulse may be used to gather both time-resolved (fluorescence decay) information as well as wavelength-resolved (fluorescence intensity) information from the responsive optical signal in real-time or near real-time.

The light source 100 may comprise any number of light sources such as a pulsed laser, a continuous wave laser, a modulated laser, a tunable laser, or an LED, to name a few. The pre-determined excitation wavelength of the light source 100 may be in one or more of the ultraviolet spectrum, the visible spectrum, the near infrared spectrum, or the infrared spectrum, for example within a range of about 300 nm to about 1100 nm. The pre-determined excitation wavelength of the light source 100 may be in a range of about 330 nm to about 360 nm, about 420 nm to about 450 nm, about 660 nm to about 720 nm, or about 750 nm to about 780 nm. For example, the light source 100 may emit a light pulse at about 355 nm as shown in FIG. 1. Alternatively or in combination, the light source 100 may emit a light pulse at about 700 nm or about 710 nm. The wavelength of the light source 100 may be chosen such that the biological sample 101 produces a responsive optical signal upon excitation with the light pulse. The wavelength of the light source 100 may be chosen such that the biological sample 101 produces a responsive optical signal without being damaged by the light pulse. For example, ultraviolet light may be chosen to excite a wide range of fluorophores within the biological sample and can be used to excite multiple fluorophores at the same time. Prolonged exposure to ultraviolet light, however, can cause cellular damage in at least some instances. Thus, in cases where exposure to ultraviolet light is a concern, near infrared or infrared light may be a safer alternative. An infrared light source 100 may be configured to excite a similar range of fluorophores as ultraviolet light by using a two-photon (or multi-photon) technique. For example, an infrared light source 100 may be configured to emit a plurality of light pulses in very quick succession such that two photons of the light pulses simultaneously radiate the biological sample 101. When two or more photons radiate the biological sample 101 at the same time, their energies may be added together and the sample may produce a responsive optical signal similar to that which may be produced in response to radiation with ultraviolet light but with the potential safety risk reduced.

Figure 5:
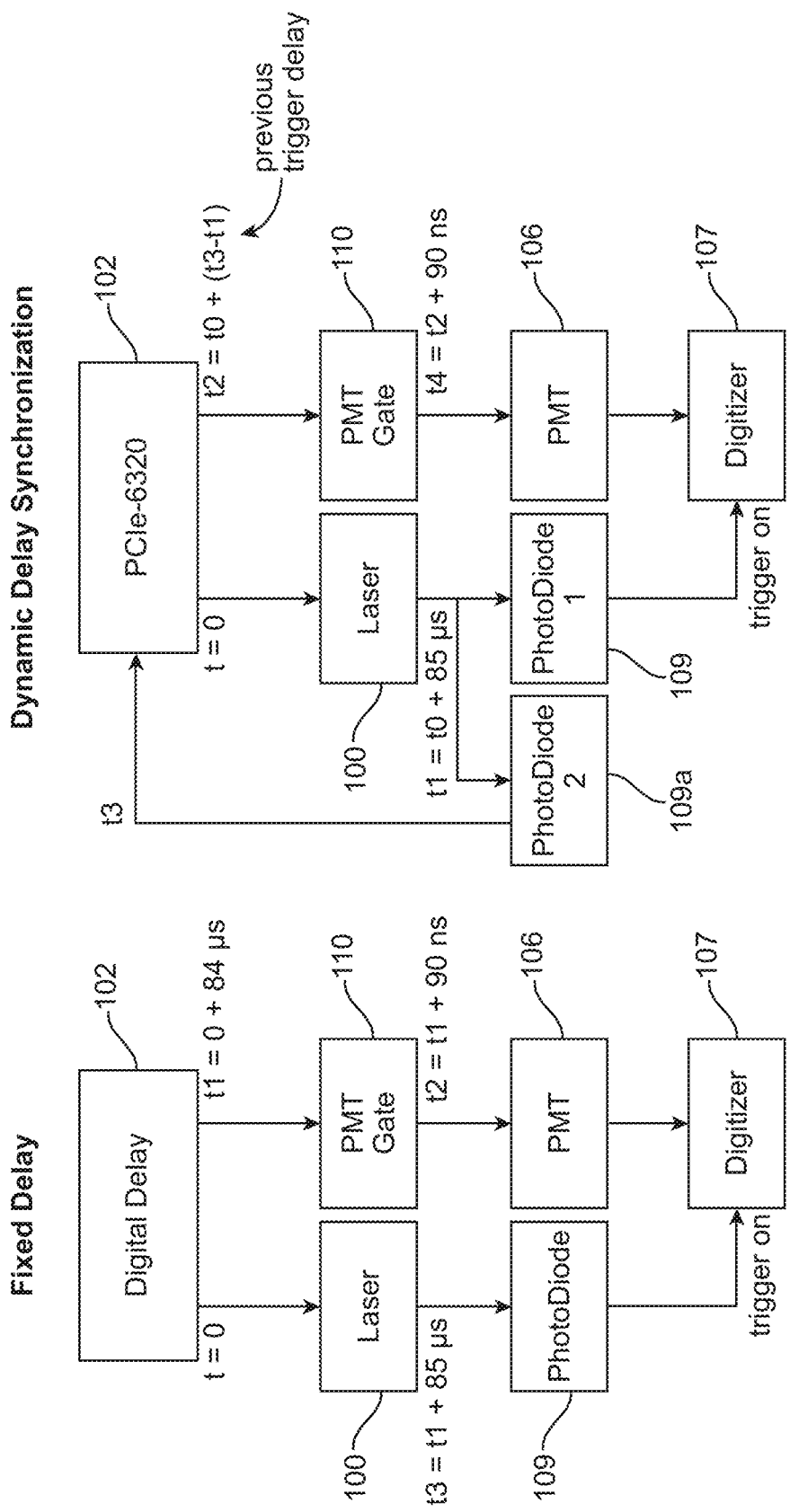
FIG. 5 shows a schematic of a trigger synchronization mechanism, in accordance with embodiments.

The light source 100 may be controlled by an internal or external pulse controller device or trigger device 102 which may provide precision timing to each light pulse output by the light source 100. The timing of each light pulse may be checked using a photodiode 109 and updated using an analog to digital converter device 102, for example NI PCIe-2320 as shown in FIG. 5. The trigger device 102 may be operably coupled to the digitizer 107 to provide feedback about the timing of the detector 106. The detector 106 may optionally be controlled by a detector gate 110 which couples the timing of the light pulse with the opening of the gate 110 and the activation of the detector 106 as described herein.

The light pulse may be focused from the light source 100 into an excitation signal transmission element 103. The excitation signal transmission element 103 may guide the light pulse to a pre-determined location or target tissue on the biological sample 101. The excitation signal transmission element 103 may for example comprise an optical fiber, a plurality of optical fibers, a fiber bundle, a lens system, a raster scanning mechanism, a dichroic mirror device, or the like, or any combination thereof.

The light pulse may radiate the biological sample 101 and cause the biological sample 101 to emit a responsive optical signal. The responsive optical signal may comprise one or more of a fluorescence spectrum, a Raman spectrum, an ultraviolet-visible spectrum, or an infrared spectrum. The responsive optical signal may have a wide spectrum comprising many wavelengths. The responsive optical signal may be a responsive fluorescence signal, for example. The responsive optical signal may comprise a fluorescence spectrum. The responsive optical signal may comprise a fluorescence spectrum and one or more additional spectra, for example a Raman spectrum, an ultraviolet-visible spectrum, or an infrared spectrum. The systems, devices, and methods described herein may be used to characterize the biological sample 101 based on the fluorescence spectrum and/or one or more additional spectra.

The responsive optical signal emitted by the biological sample 101 may be collected by one or more signal collection elements 108. The signal collection element 108 may, for example, comprise an optical fiber, a plurality of optical fibers, a fiber bundle, an attenuator, a variable voltage-gated attenuator, a lens system, a raster scanning mechanism, a dichroic minor device, or the like, or any combination thereof. The signal collection element 108 may comprise a bundle of multi-mode fibers or an objective lens, for example. The signal collection element 108 may comprise a bundle of step-index multi-mode fibers. The signal collection element 108 may comprise a bundle of graded-index multi-mode fibers. The fibers or bundle of fibers may be flexible or rigid. The signal collection element 108 may comprise a plurality of fibers which have a numerical aperture ("NA") selected to balance between the cone angle of the light entering the signal collection element 108 and the divergence angle of the light exiting the signal collection element 108 and passing through a fiber collimator. A lower NA may increase the efficiency of the optic coupling to the delay fibers by reducing the divergence angle while a higher NA may increase the amount of signal able to be collected by increasing the cone angle.

The responsive optical signal may be directed onto an optical assembly or wavelength-splitting device, for example, a demultiplexer or filter wheel as described herein, which splits the responsive optical signal into spectral bands. For example, the responsive optical signal may undergo a series of wavelength splitting processes in the demultiplexer 104 in order to resolve the wide-band responsive optical signal into a number of narrow spectral bands, each with a distinct central wavelength. The demultiplexer 104 may be configured to split the responsive optical signal into any number of spectral bands depending on the number desired. For example, the demultiplexer 104 may be configured to split the responsive optical signal into seven spectral bands 111*a*-111*g* in order to characterize fluorescent decay of a biological sample comprising six fluorescent molecules, with the seventh spectral band comprising the reflected excitation light.

Alternatively or in combination, the responsive optical signal may be directed onto a filter wheel which splits the responsive optical signal into spectral bands as described herein. The filter wheel may comprise a plurality of spectral filters. The filter wheel may optionally comprise a plurality of encoders. Each spectral filter may be associated with at least one encoder. The filter wheel may comprise a rotating filter wheel. The filter wheel may rotate continuously or in a stepwise fashion. Each rotation of the filter wheel may generate a set of wavelength-resolved spectral bands. Each subsequent rotation of the filter wheel may generate subsequent sets of spectral bands which are temporally distinct from each other set of spectral bands. A series of spectral band sets may be collected in order to generate time-resolved, wavelength-resolved data from the responsive optical signal. The filter wheel may be stationary, in which case the responsive optical signal may be directed onto the spectral filters in sequence by a minor galvometer. Use of a stationary filter wheel and a minor galvometer may increase the acquisition speed of the system compared to a rotating filter wheel. The minor galvometer may repeat its acquisition sequence of spectral filters in order to generate time-resolved, spectrally-resolved data.

The wavelength-resolved spectral bands may be directed from the demultiplexer 104 to the detector 106 by the optical delay element 105. The optical delay device 105 may apply one or more time-delays to the spectral bands such that they are temporally separated and each of the time-delayed spectral bands may reach the detector 106 at different times. The optical delay device 105 may provide a delay of within a range of about 5 ns to about 700 ns. For example, the optical delay device 105 may provide one or more delay of about 7.5±3 ns, 75±10 ns, 150±10 ns, 225±10 ns, 300±10 ns, 375±10 ns, 450±10 ns, 525±10 ns, 600±10 ns, or combinations thereof. The optical delay device 105 may be configured to provide any delay or combination of delays desired. The optical delay device 105 may comprise any number of delay devices. The optical delay device 105 may comprise a plurality of optical fibers of differing lengths, one for each spectral band, such that each spectral band travels a different distance and thus a different amount of time along the optical fiber before reaching the detector 106. For example, the optical delay device 105 may comprise two optical fibers, with the second optical fiber being longer than the first optical fiber such that a first spectral band reaches the detector 106 before a second spectral band. Alternatively or in combination, physical properties of the optical fibers other than the length may be varied in order to control the time delay applied by the optical delay element 105. For example, the refractive index of the fibers may be varied. Such physical properties may also be useful in determining the length of fiber necessary to achieve a desired delay. The length of the fibers may be selected based on the delay desired. The fibers may, for example, be configured such that the lengths of fibers increase from the first to the last in increments of about 30 feet, about 35 feet, about 40 feet, about 45 feet, or about 50 feet. The increment between fibers of the optical delay device 105 may be the same or may vary between fibers. It will be apparent to one skilled in the art that any number and any lengths of fibers may be chosen in order to apply the desired temporal delay to the spectral bands. For example, the spectral bands 111a-111g may be directed towards the detector 106 by fibers with lengths of about 5 feet, 55 feet, 105 feet, 155 feet, 205 feet, 255 feet, and 305 feet, with each spectral band moving along a different optical fiber, which apply varying temporal delays to the spectral bands 111a-111g such that the time-delayed spectral bands 112a-112g reach the detector 106 at different times. Given that each spectral band may have a decay profile that last for a specific amount of time (e.g., on the order of tens of nanoseconds), the temporal delay applied to each spectral band may be configured to be sufficiently long enough to temporally separate the respective decay profiles and allow the detector to detect multiple time-delayed spectral bands after a single excitation of the biological sample 101.

The plurality of optical fibers of the optical delay device may comprise a bundle of step-index multi-mode fibers. The plurality of optical fibers of the optical delay device may comprise a bundle of graded-index multi-mode fibers. In some instances, graded-index fibers may be preferred over step-index fibers as they generally have less loss of bandwidth with increased fiber length and may thus produce a stronger or better quality signal when long fibers are used as in the optical delay devices described herein. The fibers or bundle of fibers may be flexible or rigid.

In some instances, a time delay may be applied to responsive optical signal before entering the optical assembly, for example, a demultiplexer or filter wheel. In some instances, the optical delay element may comprise an optical assembly configured to split the time-delay responsive optical signal(s) into spectral bands. For example, the responsive optical signal may be directed onto the optical delay element. The optical delay element may apply one or more time delays to the responsive optical signal such that they are temporally separated and, prior to reaching the detector 106, the time-delayed signals may pass through one or more spectral filters to split the time-delayed optical signals into time-delayed spectral bands (see, for example, FIG. 17). The optical delay element may comprise a plurality of optical fibers as described herein which further comprise a plurality of spectral filters (for example, one per optical fiber) configured to generate a plurality of time-delayed spectral bands. Each of the time-delayed spectral bands may reach the detector 106 at different times.

In some instances, a time delay may not be applied to the spectral bands before reaching the detector 106 and the system may not comprise an optical delay element 105, for example, when the optical assembly comprises a filter wheel as described herein.

The detector 106 may be configured to receive the time-delayed spectral bands from the optical delay device 105 and record each time-delayed spectral band individually. The detector 106 may, for example, comprise a fast-response photomultiplier tube (PMT), a multi-channel plate photomultiplier tube (MCP-PMT), an avalanche photodiode (APD), a silicon PMT, or any other photodetector known in the art. The detector may be a high gain (e.g. $10^6$), low noise, fast rise time (e.g. about 80 picoseconds) photodetector, for example a Photek 210. The gain of the detector 106 may be controlled automatically. The voltage of the detector 106 may be dynamically changed based on the strength of the responsive optical signal detected. The voltage of the detector 106 may be altered after analyzing the strength of the spectral bands detected and prior to recording the signal. The recorded data may be digitized for display on a computer or other digital device by a high-speed digitizer 107. The digitizer 107 may, for example, digitize the recorded data at a rate of about 6.4 G samples/second. The digitizer 107 may, for example, be a 108ADQ Tiger. The data may optionally be analyzed by a processor 113, for example, a computer processor. The processor 113 may be configured with instructions to collect the data from the digitizer 107 and perform any of the methods for analysis described herein. Alternatively or in combination, the recorded data may be displayed using an oscilloscope. An optional preamplifier may provide additional gain to the recorded data prior to display. The detector 106 may be operably coupled to a detector gate 110 which controls the detector 106 such that the detector 106 responds to signals during a narrow detection window when the detector gate 110 is open and the detector 106 is active.

The responsive optical signal from the biological sample may vary depending on the molecule of interest being excited. The responsive optical signal may, for example, be very high for a highly responsive, or highly fluorescent, molecule in the biological sample or very low for a less responsive, or less fluorescent, molecule in the biological sample. A fluorophore, for example, emits a fluorescence spectrum with an intensity based on the quantum efficiency and/or absorption of the excitation light used to excite it. Depending on the conditions in which the fluorophore exists, the intensity of the fluorophore may differ. For example, a fluorophore in a tissue sample may have a different intensity than the same fluorophore in a blood sample or when isolated due to the differences in its surroundings. In order to properly record the fluorescence spectrum, the gain of the detector may be adjusted such that high fluorescence emission does not saturate the signal and low fluorescence emission does not reduce the signal to noise ratio. This may be achieved by rapidly changing the voltage of the detector 106, for example, a PMT, based on previously recorded data. For example, the biological sample may be excited with two light pulses and the recorded data may be averaged and analyzed to determine if the signal from the biological sample is too high or too low. The voltage may then be adjusted based on the determination in order to change the gain of the detector 106. Such adjustments may be done manually or automatically, for example, by the processor. Such adjustments may be done iteratively until the desired signal to noise ratio is reached. The data may be recorded once the desired signal to noise ratio is reached.

The time-delayed spectral bands may comprise fluorescence intensity decay data which can be measured by the systems, devices, and methods described herein. The measured fluorescence intensity decay data (FID(t,λ)) may be comprised of fluorescence decay components from one or more biomolecule as well as the optical and electronic transfer component functions known as Instrument Response Function (IRF(t, λ). Mathematically, the FID (t, λ) is the convolution of the fluorescence impulse response function (fIRF(t, λ)) with the IRF(t, λ). In order to estimate pure fIRF(t, λ) of a sample, the IRF(t, λ) may be deconvolved from the measured fluorescence pulse. The IRF (t, λ) describes the effects of optical path and wavelength system characteristics experienced by fluorescence photons and may be measured by recording very fast fluorescence decay(s) from standard dyes. The measured fast decay may be employed as an approximation of the true IRF(t, λ) when the decay is an order of magnitude faster than the fluorescence decay from the biological sample of interest (e.g. less than 70 ps is fast enough when brain tissue is the sample of interest). The "Laguerre expansion of kernels" may be used to determine the fIRF(t, λ). The Laguerre method is based on the expansion of orthonormal sets of discrete time Laguerre functions. The Laguerre parameter α (0<α<1) determines the rate of exponential (asymptotic) decline of the discrete Laguerre functions. The choice of parameter α is important in achieving accurate fIRF(t, λ) estimations. An iterative process may be used to determine the optimal a to recover accurate fluorescence decay. Prior to estimating α and fitting the Laguerre kernels to the fluorescence decay measured, the previously-recorded IRF and the fluorescence decay may be temporally aligned. Alignment may be achieve by taking a super-sample of both IRF(t, λ) and the measure FID(t, λ).

Figure 2:
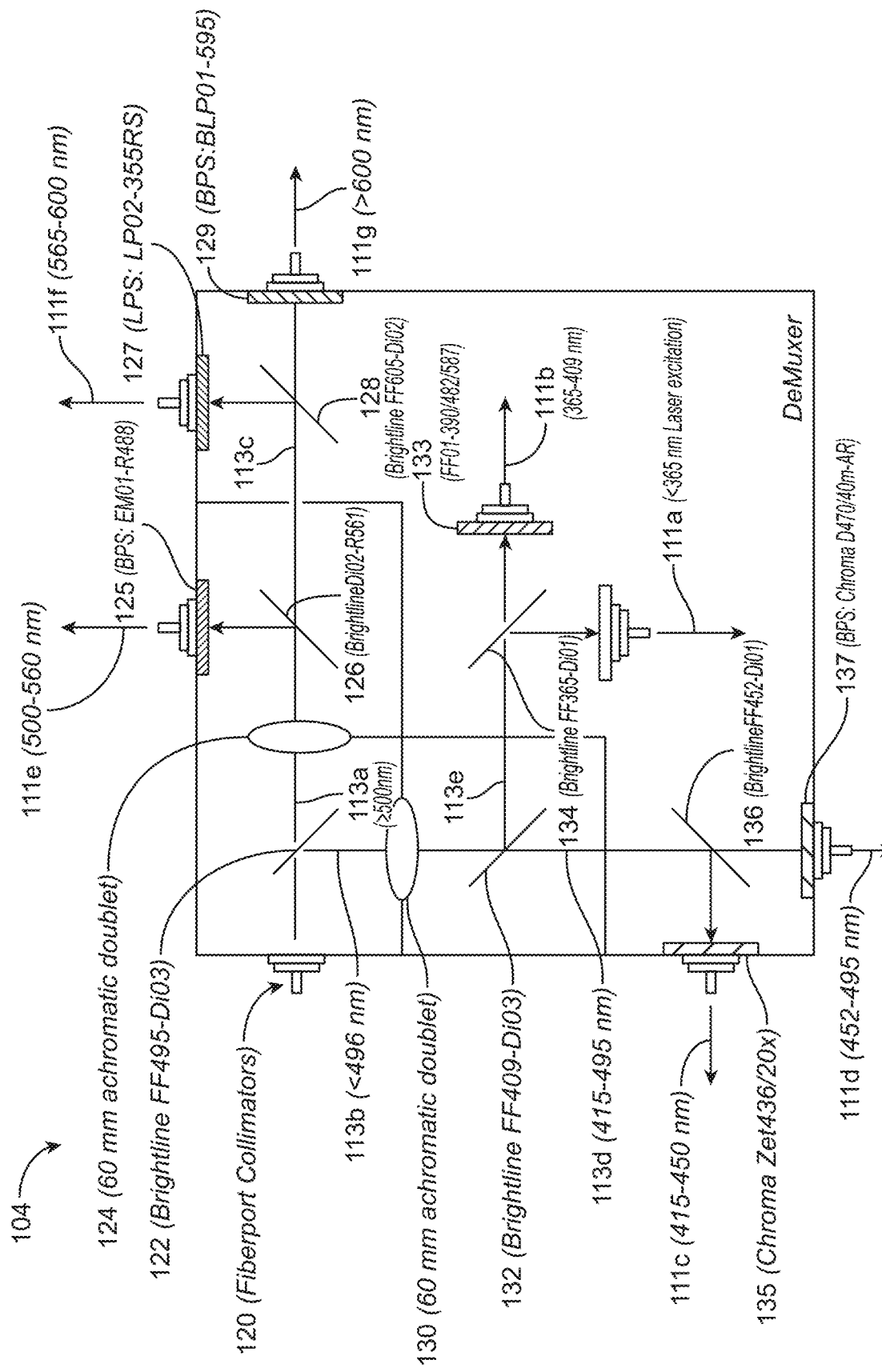
FIG. 2 shows a schematic of a demultiplexer, in accordance with embodiments.

FIG. 2 shows a schematic of a demultiplexer. The demultiplexer 104 may comprise one or more wavelength splitting filter configured to split the responsive optical signal at pre-determined wavelength ranges to obtain a plurality of spectral bands. The wavelength splitting filters may comprise one or more of a neutral density filter, a bandpass filter, a longpass filter, a shortpass filter, a dichroic filter, a notch filter, a mirror, an absorptive filter, an infrared filter, an ultraviolet filter, a monochromatic filter, a dichroic mirror, a prism, or the like. The responsive optical signal may undergo a series of wavelength splitting processes in the demultiplexer 104 in order to resolve the wide-band responsive optical signal into a number of narrow spectral bands, each with a distinct central wavelength. The spectral bands may be in ranges between about 370 nm to about 900 nm.

Figure 3A:
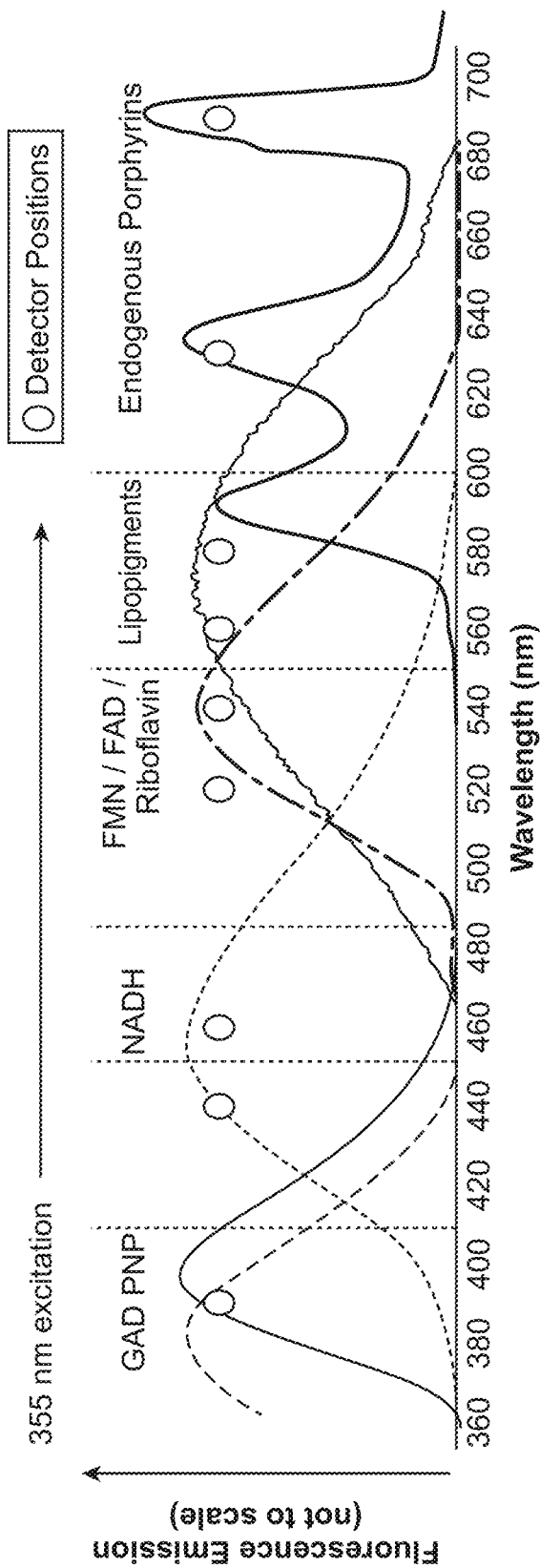
FIGS. 3A-3B show charts of the fluorescence emission spectra of various exemplary molecules, in accordance with embodiments.
Figure 3B:
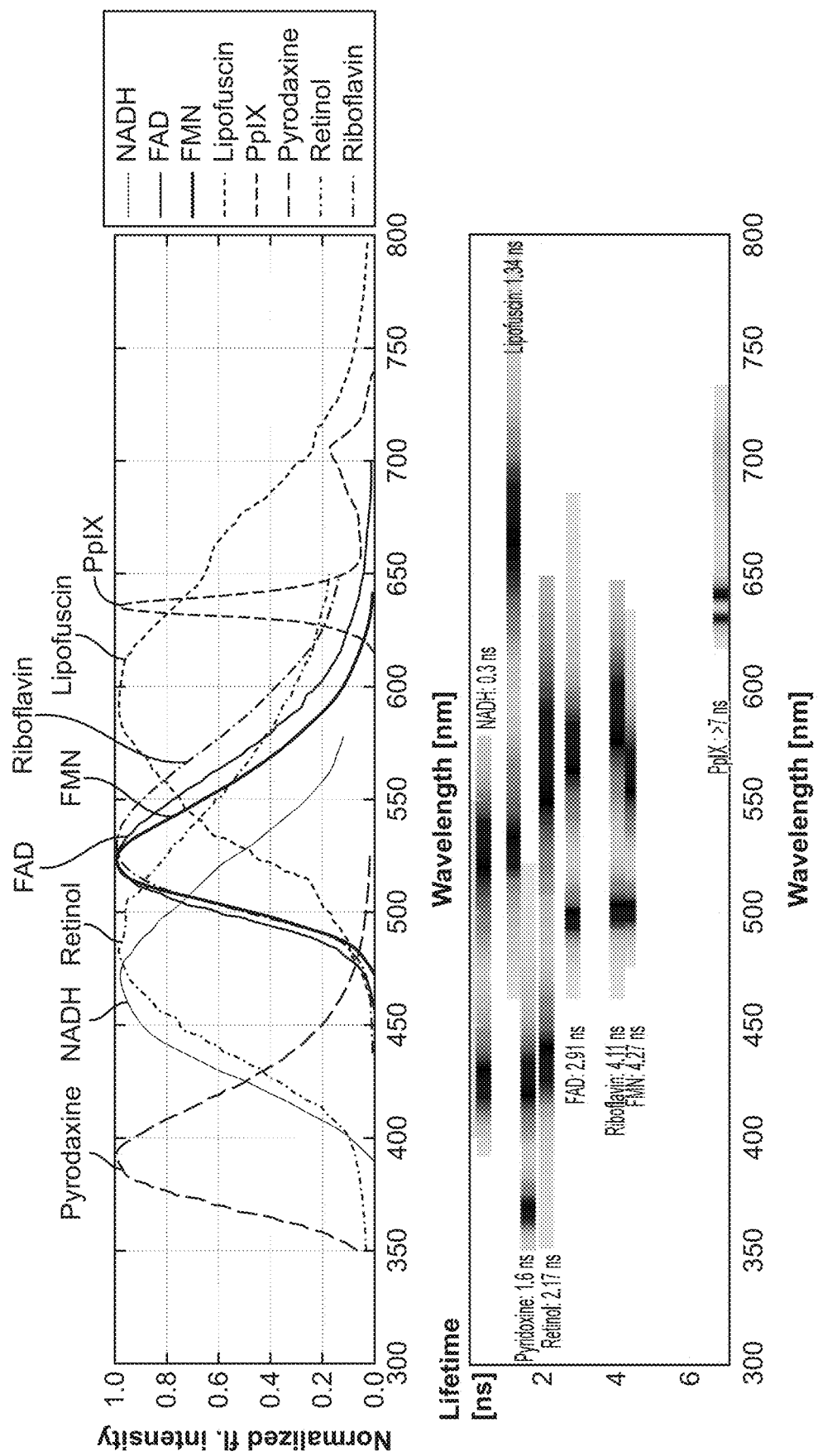

The demultiplexer 104 may, for example, be configured to split a responsive optical signal from a biological tissue sample comprising emission spectra from endogenous fluorophores. The fluorophores may, for example, comprise Flavin mononucleotide (FMN) riboflavin, Flavin adenine dinucleotide (FAD) riboflavin, lipopigments, endogenous porphyrin, free nicotinamide adenosine dinucleotide (NADH), bound NADH, or pyridoxal phosphate-glutamate decarboxylase (PLP-GAD), to name a few. FIG. 3A shows the fluorescence emission spectra of these exemplary molecules when excited with a 355 nm laser. The responsive optical signal of a biological sample excited by an ultraviolet light or laser source may be split into spectral bands ranging between the dotted vertical lines. The demultiplexer 104 may be configured to split a responsive optical signal excited into spectral bands of less than about 365 nm (comprising the reflected excitation light), about 365 nm to about 410 nm, about 410 nm to about 450 nm, about 450 nm to about 480 nm, about 500 nm to about 560 nm, about 560 nm to about 600 nm, and about 600 nm or greater. FIG. 3B shows the fluorescence emission spectra of various other endogenous fluorophores stimulated with a UV laser which may be assessed as well as their characteristic fluorescence decay lifetimes at various wavelengths. The demultiplexer may be configured to split a responsive optical signal excited into spectral bands which correspond to one or more of the peak wavelengths at which one or more of the fluorophores are excited. For example, the demultiplexer may be configured to detect NADH, FAD, FMN, lipofuscin, PpIX, purodaxine, retinol, riboflavin, or any combination thereof. The systems, devices, and methods described herein may be configured to detect any number or combination of fluorophores in a biological sample based on the spectral emission spectra and/or fluorescent decay properties of the fluorophore.

As shown in FIG. 2, the light responsive optical signal may enter the demultiplexer 104 at a FiberPort collimator 120 or the like, for example, a collimating lens. A collimating lens may, for example, comprise a gradient index (GRIN) lens, an aspheric lens, or the like. The responsive optical signal may be directed onto a first wavelength splitting filter 122 which splits the responsive optical signal into a first spectral component 113a comprising light with wavelengths greater than about 495 nm and a second spectral component 113b comprising light with wavelengths less than about 495 nm. The first spectral component 113a may then optionally be focused using a 60 mm focal length biconcave lens or achromatic doublet 124 before reaching a second wavelength splitting filter 126. The second wavelength splitting filter 126 may split the first spectral component 113a into a first spectral band 111e comprising light with wavelengths in a range of about 500 nm to about 560 nm and a third spectral component 113c comprising light with wavelengths greater than about 560 nm. The first spectral band 111e may be passed through a first filter 125. The third spectral component 113c may then be split by a third wavelength splitting filter 128 into a second spectral band 111f comprising light with wavelengths in a range of about 560 nm to about 600 nm and a third spectral band 111g comprising light with wavelengths above about 600 nm. The second spectral band 111f may be passed through a second filter 127. The third spectral band 111g may be passed through a third filter 129. The second spectral component 113b may be optionally focused using a 60 mm focal length biconcave lens or achromatic doublet 130 before reaching a fourth wavelength splitting filter 132. The fourth wavelength splitting filter 132 may split the second spectral component 113b into a fourth spectral component 113d comprising light with wavelengths in a range of about 415 nm to about 495 nm and a fifth spectral component 113e comprising light with wavelengths in a range of less than about 415 nm. The fourth spectral component 113d may be split by a fifth wavelength splitting filter 134 into a fourth spectral band 111c comprising wavelengths in a range of about 415 nm to about 450 nm and a fifth spectral band 111d comprising wavelengths in a range of about 450 nm to about 495 nm. The fourth spectral band 111c may be passed through a fourth filter 135. The fifth spectral band 111d may be passed through a fifth filter 137. The fifth spectral component 113e may be split by a sixth wavelength splitting filter 136 into a sixth spectral band 111b comprising wavelengths in a range of about 365 nm to about 410 nm and a seventh spectral band 111a comprising wavelengths of less than about 365 nm (e.g. the excitation light). The sixth spectral band 111b may be passed through a sixth filter 133. The seventh spectral band 111a which comprises the excitation light may be recorded in order to ensure accurate deconvolution of the responsive spectral bands 111b-111g.

Figure 4:
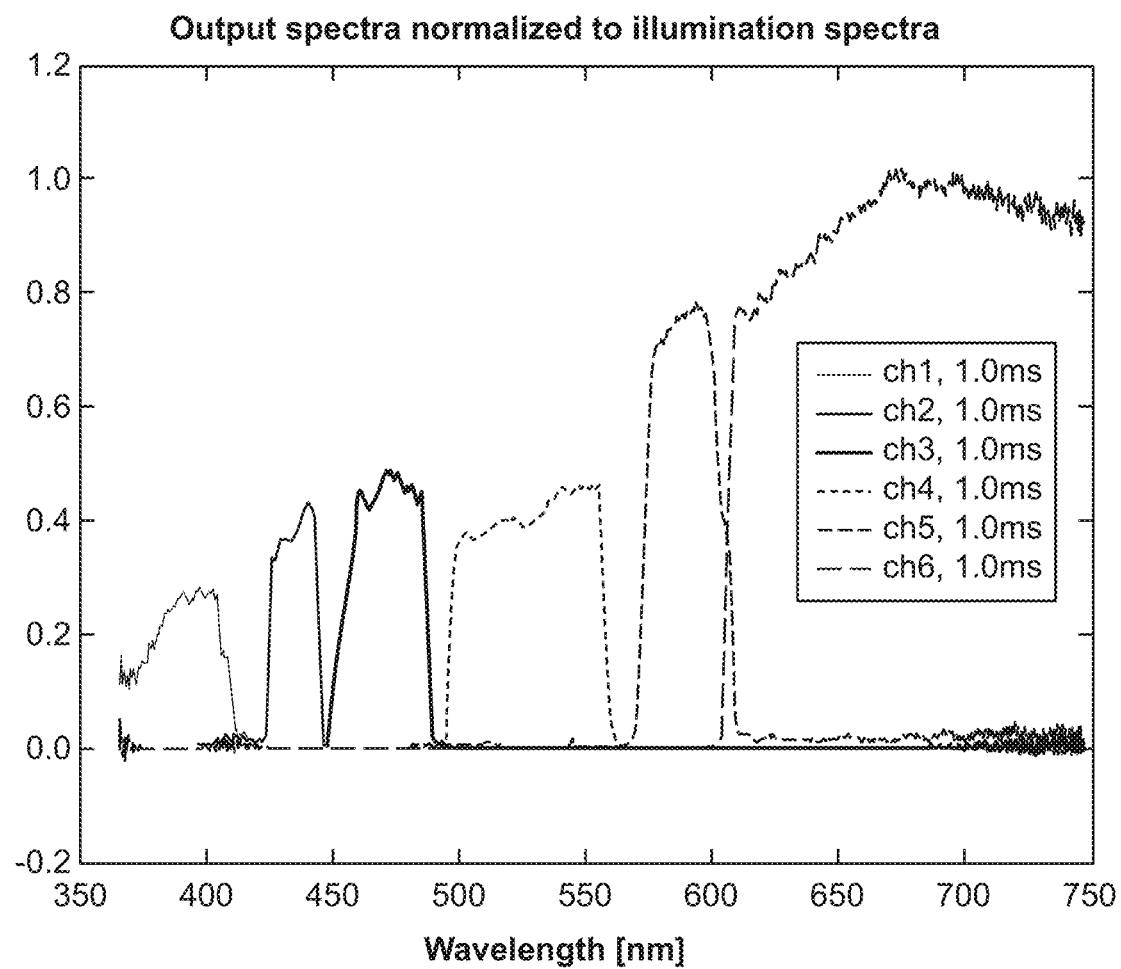
FIG. 4 shows a chart of the fluorescence emission spectra of various exemplary molecules after splitting by a demultiplexer, in accordance with embodiments.

FIG. 4 shows the fluorescence emission spectra of various exemplary molecules after splitting by the demultiplexer 104. The detector 106 was used to detect the six spectral bands 111b-111g (labeled as ch1-ch6 in FIG. 4, respectively) with wavelengths above the excitation wavelength of 355 nm after a time delay was applied to each spectral band 111a-111g as described herein. The demultiplexer 104 separated the spectral bands representing PLP-GAD or purine nucleoside phosphorylase (PNP) (channel 1), bound NADH (channel 2) free NADH (channel 3), FMN/FAD/Riboflavin (channel 4), Lipopigments (channel 5), and endogenous porphyrins (channel 6). The spectral band 111a with wavelengths at or about the excitation wavelength was used to normalize the data shown.

The demultiplexer 104 may be configured to split the responsive optical signal into more or fewer spectral bands as desired. In another example, the demultiplexer 104 may be configured to split the responsive optical signal from a biological sample comprising free and bound NADH and PLP-GAD. The biological sample may be excited by an ultraviolet light pulse of about 355 nm as described herein. The spectral bands may be in ranges of about 400 nm or less, about 415 nm to about 450 nm, about 455 nm to about 480 nm, and about 500 nm or greater. The responsive optical signal may be directed from the signal collection element onto a first wavelength splitting filter which splits the responsive optical signal into a first spectral component comprising wavelengths greater than about 400 nm and a first spectral band comprising wavelengths less than about 400 nm (e.g. excitation light). The first spectral component may be split by a second wavelength splitting filter into a second spectral component comprising wavelengths in a range of about 400 nm to about 500 nm and a second spectral band comprising wavelengths greater than about 500 nm. The second spectral component may be split by a third wavelength splitting filter into a third spectral band comprising wavelengths in a range of about 400 nm to about 450 nm, for example, about 415 nm to about 450 nm, and a fourth spectral band comprising wavelengths in a range of about 450 nm to about 500 nm, for example, about 455 nm to about 480 nm.

In another example, a 440 nm light source may be used to excite a biological sample and the demultiplexer may be configured to split the responsive optical signal into spectral bands for the characterization of FAD, FMN, and porphyrins.

It will be understood by one skilled in the art that the spectral bands may be in any ranges desired in order to characterize a biological sample and the wavelength splitting filters of the demultiplexer 104 may be configured to generate said spectral bands.

While an ultraviolet light pulse is described herein, it will be understood by one skilled in the art that the light source and light pulse may be any wavelength desired and the demultiplexer 104 may be configured to accommodate any wavelength of excitation light. For example, when an infrared light source is chosen, the demultiplexer 104 may be configured to split the responsive optical signal into spectral bands characteristic of the biological sample and a spectral band comprising the reflected infrared light.

The devices, systems, and methods described herein may be used to characterize a biological sample from a responsive optical signal comprising two distinct spectra. The responsive optical signal may comprise one or more of a fluorescence spectrum, a Raman spectrum, an ultraviolet-visible spectrum, or an infrared spectrum. For example, the responsive optical signal may comprise a fluorescence spectrum and a Raman spectrum. The fluorescence spectrum and the Raman spectrum may be used independently or in combination to characterize a biological sample radiated with a light pulse as the two spectra may provide distinct information about a biological sample which may be complimentary. The biological sample may be excited by a light pulse as described herein and the responsive optical signal comprising a fluorescence spectrum and a Raman spectrum may be collected by the signal collection element. The signal collection element may comprise a plurality of optical fibers as described herein. The signal collection element may comprise a bundle of optical fibers as described herein. The responsive optical signal may be collected by a first bundle of optical fibers. The responsive optical signal may be directed by the first bundle of fibers to a first demultiplexer. The first demultiplexer may be configured to split the fluorescence spectrum as described herein. The first demultiplexer may be configured to split the Raman spectrum in a manner similar to the fluorescence spectrum. The Raman spectrum may be split into spectral bands by a second demultiplexer. The spectral bands from the fluorescence spectrum and the Raman spectrum may then be directed to a detector and used to characterize the biological sample as described herein. Alternatively or in combination, the responsive optical signal may be directed to the first bundle of fibers as well as to a second bundle of fibers. The responsive optical signal may be directed by the first bundle of fibers to the first demultiplexer and by the second bundle of fibers towards the detector. The responsive optical signal may be directed by the first bundle of fibers to the first demultiplexer and by the second bundle of fibers to a second demultiplexer. The first demultiplexer may be configured to split the responsive optical signal such that the fluorescence spectrum is split at pre-determined wavelengths to obtain a first set of spectral bands. The second demultiplexer may be configured to split the responsive optical signal such that the Raman spectrum is split at pre-determined wavelengths to obtain a second set of spectral bands. The two sets of spectral bands may be directed to the detector via a time-delay mechanism and used to characterize the biological sample as described herein. The second demultiplexer may be substantially similar to the first demultiplexer, allowing for variations in the pre-determined spectral band ranges depending on the Raman spectral information desired. The second demultiplexer may, for example, comprise one or more of a beam splitter, an absorptive filter, a lowpass filter, a highpass filter, a notch filter, or a mirror. A time delay may or may not be applied to the first set of spectral bands, the second set of spectral bands, or both prior to detection.

The systems, devices, and methods described herein may be used to characterize multiple adjacent locations on a biological sample to produce high resolution images containing spectroscopic information about the biological sample. A signal modifying element may be coupled to the excitation signal transmission element and configured to receive the light pulse from the excitation signal transmission element and direct the light pulse to the biological sample. The responsive optical signal may be collected, spectrally separated, and temporally separated as described herein. The signal modifying element, for example, a raster scanning mechanism, may be configured to scan the light pulse across a pre-determined portion of the biological sample. A light pulse may be directed to a first location on a biological sample and time-delayed spectral bands may be collected from the responsive optical signal at that location as described herein. The raster scanning mechanism may be used to direct a second light pulse to a second location on the biological sample so as to collect time-delayed spectral bands from the second location. A pre-determined pattern may be scanned, with a new set of time-delayed spectral bands for each new location radiated, such that an image of the pre-determined portion of the biological sample may be created. The biological sample may be characterized in response to the time-delayed spectral bands from the first and second locations, and those from any other locations of interest. Alternatively or in combination, the signal modifying element, for example, a digital micromirror device, may be configured to shape the light pulse with one or more pre-determined patterns and direct the patterned light pulse across the pre-determined portion of the biological sample. The portion of the biological sample may be excited with a light pulse modified with a first pre-determined pattern to generate a first set of time-delayed spectral bands. The portion of the biological sample may be excited with a second light pulse modified with a second pre-determined pattern to generate a second set of time-delayed spectral bands. The patterns may be configured such that a pre-determined number of patterns or masks may be used to excite the potion of the biological sample and combined using a compression sensing method to recreate the image of the pre-determined portion of the biological sample using potentially fewer iterations or sample excitations than with the raster scanning method. The biological sample may be characterized in response to the first set of time-delayed spectral bands and the second set of the time-delayed spectral bands, and any others obtained using further masks of interest. Such methods of excitation may allow for the detection of a number of fluorescent molecules of interest (for example, three, four, five, six, or more) over a desired area of sample area in a relatively short period of time.

FIG. 5 shows a schematic of a trigger synchronization mechanism. The detector 106 may optionally be gated and controlled by a gate control circuit such that the detector 106 responds to the responsive optical signal during a defined detection window in which the detector gate 110 is open. The gate control circuit and the light pulse control may be synchronized such that the responsive optical signal may be recorded by the detector 106 during a single detection window. The light source 100 may have an inherent delay in generating a light pulse after the unit has been externally triggered. For example, the delay in generating the light pulse (also referred to herein as a trigger delay) may be up to about 85 microseconds. The trigger delay may be more than about 85 microseconds. In a fixed delay setup (left schematic), the light source 100 may be triggered at t0 and the detector 106 may be triggered about 84 microseconds later at t1 by a digital delay device 102. The detector gate (e.g. PMT gate) 110 may open about 90 nanoseconds later at t2 and the light pulse may be generated about 85 microseconds later at t3, thus allowing the light pulse to reach the detector (e.g. PMT) 106 during the detection window with the detector gate 110 open. The fixed delay setup may comprise a photodiode 109 and digitizer 107 as described herein. In a dynamic delay setup (right schematic), the timing of the detector gate opening may be synchronized to the light pulse by modifying a delay between the light pulse trigger by the light pulse control and the detector gate opening based on a delay recorded for a previous light pulse. The trigger delay may vary between each light pulse of the laser 100 and a feedback mechanism may be incorporated into the delay mechanism. A second photodiode 109a may optionally be added to the system in order synchronize the light pulse with the opening of the detector gate 110. The second photodiode 109a may detect the timing of the light pulse, compare the timing to the external trigger, and correct the timing of the subsequent trigger based on the detected timing of the light pulse. This feedback mechanism may include measurements of when the light source 100 is triggered to, when the light pulse fires t1 (for example, about 84 microseconds later), when the detector gate 110 is triggered t2 (adjusted for previous trigger delay rather than fixed), when the detector gate 110 is opened t4, and the photodiode-recorded delay t3. t2 may be dynamically set to ensure that the voltage gain on the detector 106 is 'on' when the responsive optical signal reaches the detector 106 for detection. A first photodiode 109 may optionally be added to trigger the digitizer in order to reduce the amount of data collected when the light pulse is inactive.

Figure 6:
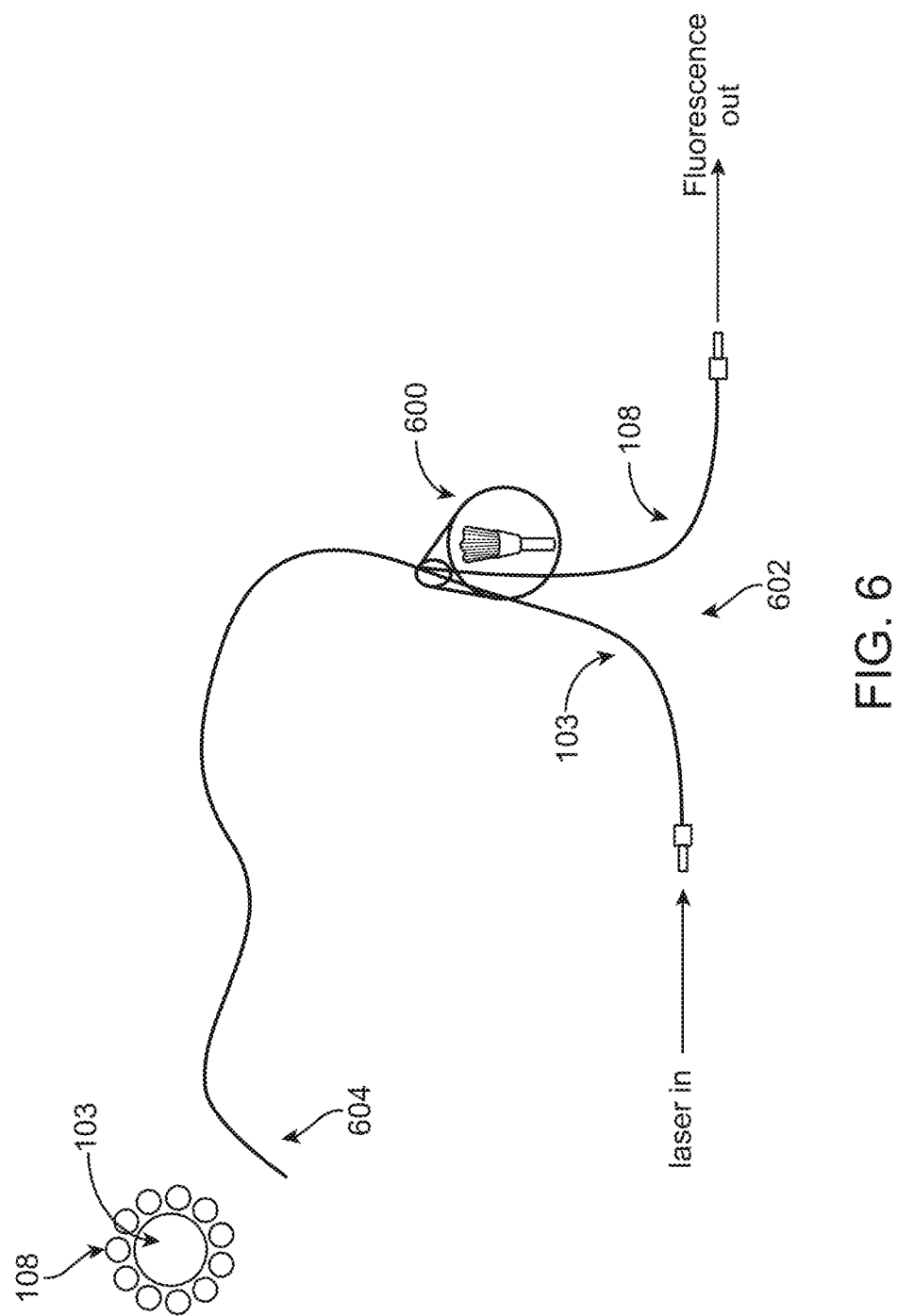
FIG. 6 shows a schematic of a probe for time-resolved spectroscopy, in accordance with embodiments.

FIG. 6 shows a schematic of a probe for time-resolved spectroscopy. The probe 600 may be used to characterize a biological sample as described herein. The probe 600 may, for example, comprise one or more of an excitation signal transmission element 103, a light source 100, a signal collection element 108, a demultiplexer 104 (or other optical assembly as described herein), an optical delay device or element 105, a detector 106, a digitizer 107, a photodiode 109, a detector gate 110, or a trigger synchronization mechanism 102. The probe 600 may, for example, comprise an excitation signal transmission element 103 and a plurality of signal collection elements 108. The probe 600 may be operably coupled at its proximal end 602 to a light source (not shown) which emits a light pulse. The light pulse may be directed onto the excitation signal transmission element 103 (in the direction of the arrow on the left side of the proximal end 602) and directed therealong towards the distal end 604 of the probe 600 and the biological sample. The excitation signal transmission element 103 may comprise an optical fiber, for example, a 600 um diameter optical fiber with a numerical aperture (NA) of 0.11 and a UV-grade silica core fiber when the light source is an ultraviolet light or laser source. The light pulse may be directed onto the biological sample from the distal end 604 of the probe 600 in order to radiate the sample and produce a responsive optical signal. The responsive optical signal may be collected by the plurality of signal collection elements 108. The plurality of signal collection elements 108 may comprise six optical fibers (see, for example, FIG. 15). The plurality of signal collection elements 108 may comprise twelve optical fibers, for example, twelve 200 um diameter optical fibers with a NA of 0.22 and a UV-grade silica core fiber. The signal collection fibers 108 may be arranged around the excitation signal transmission fiber 103 such that the probe 600 has a slim profile. The signal collection fibers 108 may be bundled into a single fiber using a multi-mode combiner 606 near the proximal end 602 of the probe 600 and the responsive optical signal may be directed (in the direction of the arrow on the right side of the proximal end 604) to a demultiplexer (not shown) or other optical assembly for splitting into spectral bands as described herein, or other component of the system as described herein (such as the optical delay device or element). The signal collection fibers 108 may be bundled into a plurality of fibers. The demultiplexer or other optical assembly may be integral or external to the probe 600. The spectral bands may then have one or more time delay applied by an optical delay element before being detected by a detector. The optical delay element may be integral or external to the probe 600. The detector may be external to the probe 600. The components of the probe 600 may be substantially similar to those described herein. The probe 600 may be configured to be handheld. The probe 600 may comprise a handheld probe. The probe 600 may be robotically-controlled, for example, with a commercially-available robotic surgery system. The probe 600 may be integrated with a suction cannula, for example, to allow for (near) real-time spectroscopy-guided surgical resection.

Figure 7:
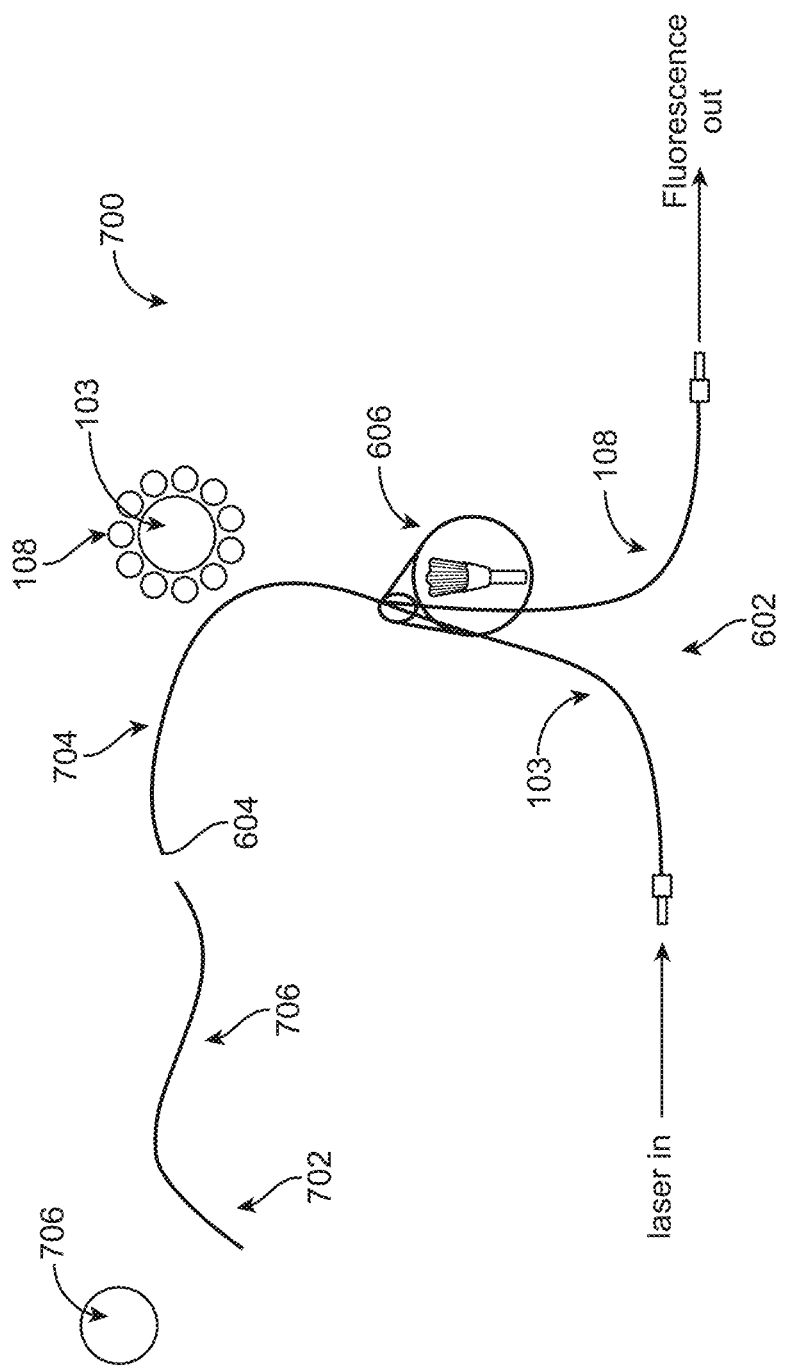
FIG. 7 shows a schematic of a two-piece probe for time-resolved spectroscopy, in accordance with embodiments.

FIG. 7 shows a schematic of a two-piece probe for time-resolved spectroscopy. In at least some instances, it may be beneficial to provide a probe 700 for characterizing a biological sample that comprises two parts, a distal part 702 and a proximal part 704. The proximal part 704 of the two-piece probe 700 may be substantially similar to the probe 600 described in FIG. 6. The distal part 702 of the two-piece probe 700 may comprise a distal signal transmission element 706. The distal signal transmission element 706 may comprise an optical fiber, a gradient-index lens, a ball lens, a dichroic filter, a mirror, or an absorptive filter. The distal signal transmission element 706 may comprise an optical fiber, for example, a 600 um diameter optical fiber with a numerical aperture (NA) of 0.11 and a UV-grade silica core fiber when the light source is an ultraviolet light or laser source. The distal signal transmission element 706 may be operably coupled to the proximal excitation signal transmission element 103 and the proximal signal collection element 108. The proximal part 704 and/or the distal part 702 may comprise a coupling element which couples the distal transmission element 706 to the proximal excitation signal transmission element 103 and the proximal signal collection element 108. A light pulse generated by a light source may be directed from the proximal excitation signal transmission element 103 to the distal signal transmission element 706. The distal signal transmission element 706 may direct the light pulse onto the biological sample and then collect the responsive optical signal from the biological sample. The distal signal transmission element 706 may direct the responsive optical signal to the proximal signal collection element 108. The proximal signal collection element 108 may direct the responsive optical signal to the demultiplexer or other optical assembly for spectral banding, temporal resolution, and/or detection as described herein. The distal part 702 may be detachable from the proximal part 704. The distal part 702 may be disposable. The distal part 702 may be replaceable. The distal part 702 may be configured to be handheld. The distal part 702 may comprise a handheld probe. The probe 700 may be integrated with a suction cannula, for example, to allow for (near) real-time spectroscopy-guided surgical resection. The probe 700 may be robotically-controlled, for example, with a commercially-available robotic surgery system. The distal part 702 may be robotically-controlled, for example, with a commercially-available robotic surgery system.

Figure 8:
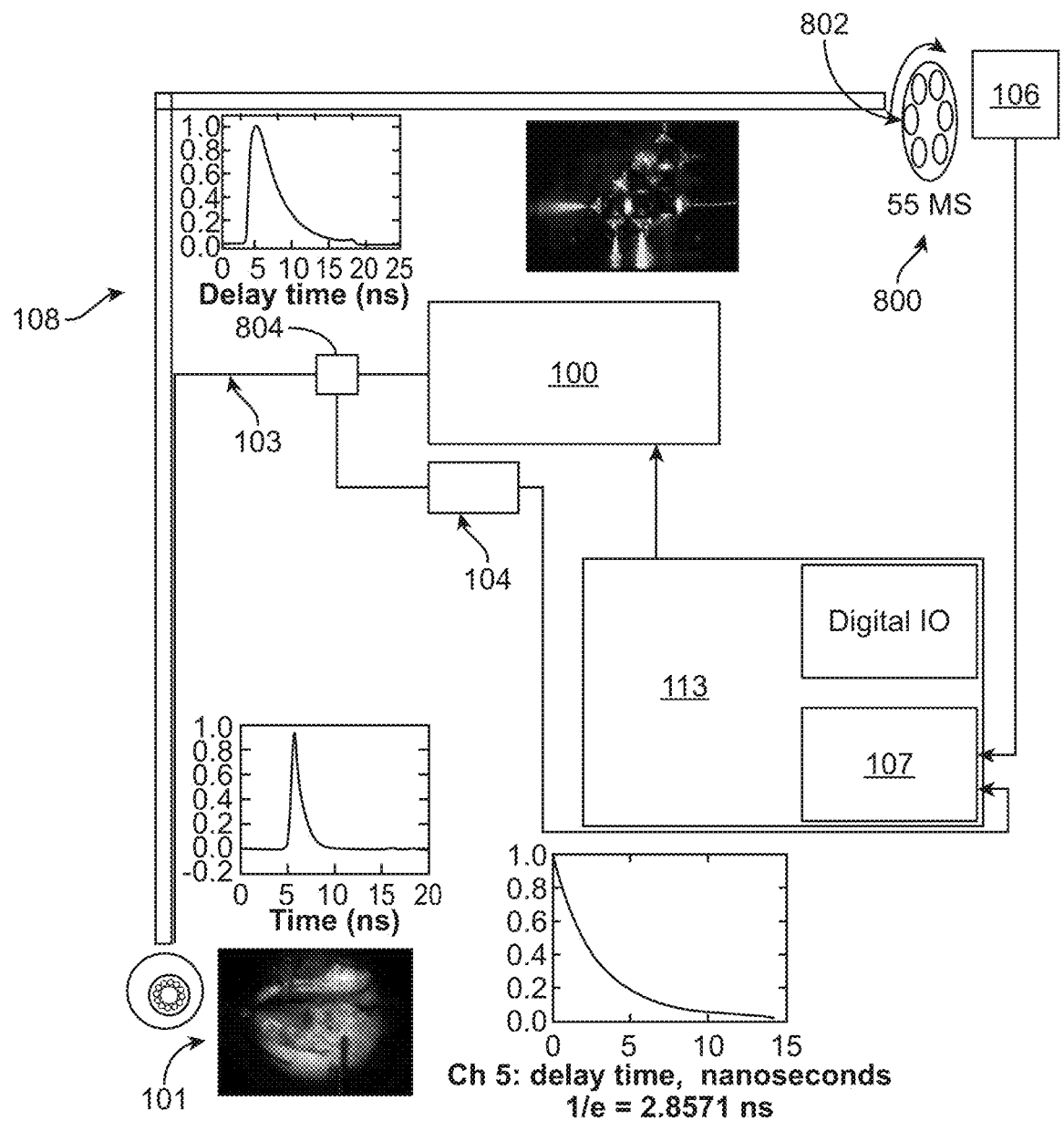
FIG. 8 shows a schematic of another time-resolved fluorescence spectroscopy (TRFS) system, in accordance with embodiments.

FIG. 8 shows a schematic of a time-resolved fluorescence spectroscopy system. The system may be used to characterize a biological samples using real-time, or near real-time, time-resolved fluorescence spectroscopy. The system may comprise an excitation signal transmission element 103, a light source 100, at least one signal collection element 108, and an optical assembly such as a filter wheel 800 comprising one or more spectral filters 802. The optical assembly may comprise any of the filter wheels described herein. The system may further comprise one or more of an optical delay device or element, a detector 106, a digitizer 107, a photodiode 109, a beam splitter 804 to direct a portion of the excitation light pulse to the photodiode 109, a detector gate, or a trigger synchronization mechanism as described herein. The excitation signal transmission element 103, light source 100, at least one signal collection element 108, detector 106, digitizer 107, photodiode 109, detector gate, optical delay device or element, and trigger synchronization mechanism may be substantially similar to those described herein.

The light source 100 may be configured to generate a light pulse or beam of continuous light at a pre-determined excitation wavelength. The light pulse may be directed towards the biological sample 101, for example, a patient's brain, by the excitation signal transmission element 103, for example, an optical fiber. Excitation by the light pulse may cause the biological sample 101 to produce a responsive optical signal which may be collected by one or more signal collection element 108. The responsive optical signal may then be directed towards the filter wheel 800 by the signal collection element 108 in order to split the responsive optical signal into at least two spectral bands at pre-determined wavelengths. The responsive optical signal may optionally be passed through a beam collimator, for example, one as shown in FIG. 9B, by the one or more signal collection element 108 in order collimate the responsive optical signal and direct it onto the one or more filters 802 of the filter wheel 800. The use of a beam collimator may increase the area of illumination on the collection window of the detector 106. The spectral bands may then be directed to an optical delay device which applies at least one time delay to the spectral bands in order to temporally separate the spectral bands prior to being recorded. Alternatively or in combination, the filter wheel 800 may act to temporally separate the spectral bands. In some instances, there may be no additional time-delay applied to the spectral bands. The spectral bands (time-delayed or not) may then be directed towards the detector 106 and detected one at a time. For each spectral band, the detector 106 may record the fluorescence decay and the fluorescence intensity of a spectral band before the next spectral band reaches the detector 106. In this way, a single excitation light pulse may be used to gather both time-resolved (fluorescence decay) information as well as wavelength-resolved (fluorescence intensity) information from the responsive optical signal in real-time or near real-time.

Figure 9A:
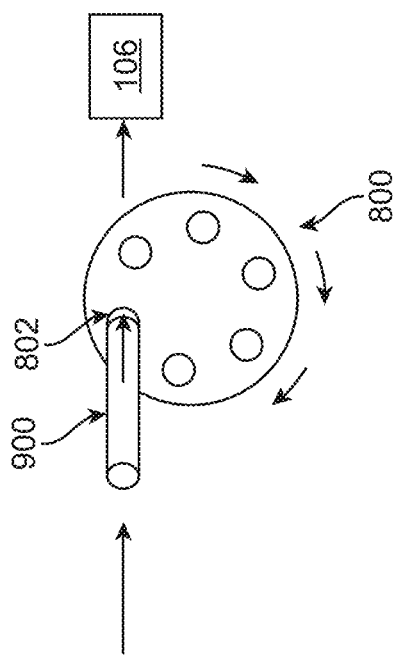
FIG. 9A shows a schematic of a high-speed filter wheel for use with a TRFS system, in accordance with embodiments.
Figure 9B:
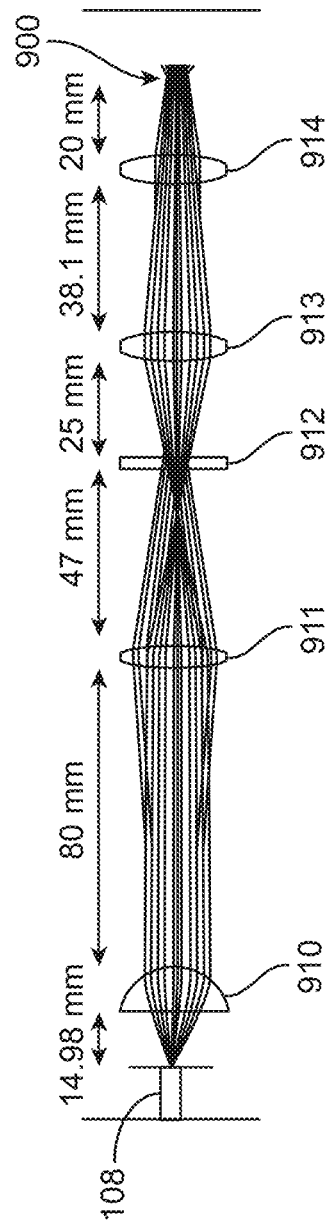
FIG. 9B shows a schematic of a beam collimator for use with a TRFS system, in accordance with embodiments.

FIG. 9A shows a schematic of a high-speed filter wheel. The responsive optical signal 900 may be directed onto an optical assembly or wavelength-splitting device, for example, a filter wheel 800, which splits the responsive optical signal 900 into spectral bands. The responsive optical signal 900 may be passed through the filter wheel 800. The filter wheel 800 may comprise a plurality of spectral filters 802 to generate the spectral bands. The responsive optical signal 900 may be passed through the plurality of spectral filters 802 to generate the spectral bands. The filter wheel 800 may comprise a rotating filter wheel. The rotating filter wheel 800 may be an ultra high-speed filter wheel in order to generate spectral bands rapidly to allow for the detector 106 to gather both time-resolved fluorescence decay information as well as wavelength-resolved fluorescence intensity information in real-time or near real-time. The rotating filter wheel 800 may be a free-flowing filter wheel or may be motorized. The rotating filter wheel 800 may be configured to rotate continuously or in a stepwise manner. The rotating filter wheel 800 may comprise one or more encoders which are configured to be detected by the detector 106 and may be used to encode the identities of the spectral bands (so as to distinguish a first spectral band from a second spectral band, for example).

The responsive optical signal 900 may, for example, be split by the spectral filters 802 of the filter wheel 800 in order to resolve the wide-band responsive optical signal into a number of narrow spectral bands, each with a distinct central wavelength. The filter wheel 800 may be configured with spectral filters 802 to split the responsive optical signal 900 into any number of spectral bands depending on the number desired. For example, the filter wheel 800 may be configured to repeatedly and rapidly split the responsive optical signal 900 into six spectral bands with six spectral filters 802 in order to characterize fluorescent decay of a biological sample comprising six fluorescent molecules. The filter wheel 800 may be rotate such that the responsive optical signal 900 passes through each of the six spectral filters 802 in quick succession, thereby generating a first set of wavelength-resolved spectral bands. Additional rotation of the filter wheel 800 may generate additional sets of wavelength-resolved spectral bands, each set be temporally delayed compared to the previous set. One or more encoders may be applied to the wheel as described herein in order to help distinguish between wavelength-resolved spectral bands and/or sets of spectral bands so as to allow the system (for example, a computer processor as described herein) to temporally align the spectral bands and generate both time-resolved and wavelength-resolved information from the responsive optical signal 900. The wavelength-resolved spectral bands may be directed from the filter wheel 800 to the detector 106 by the filter wheel 800.

FIG. 9B shows a schematic of a beam collimator. The responsive optical signal 900 may be delivered to the beam collimator 910 by the one or more signal collection elements 108 and passed through a series of optical focusing elements 910-914 in order to collimate the responsive optical signal 900 before being passed through a filter wheel (not shown) as described herein. In order to generate a 5 mm diameter collimated responsive optical signal beam 900, optical focusing element 910 may be spaced about 14.98 mm away from the one or more signal collection elements 108. Optical focusing element 911 may be within a range of about 60 mm to about 80 mm, for example about 80 mm, away from optical focusing element 910. Optical focusing element 911 may be located about 47 mm away from element 912. Optical focusing element 912 may be about 25 mm from optical focusing element 913. Optical focusing element 913 may be about 38.1 mm from optical focusing element 914. Optical focusing element 914 may be about 20 mm from the filter wheel (not shown). The optical focusing elements 910-914 may be spatial separated along a beam path (which may be linear as shown or may comprise angles) at distinct intervals as shown in order to generate a 5 mm diameter collimated beam 900 on the filter wheel. Alternatively or in combination, elements 910-914 may be configured with different distances between elements as desired by one of ordinary skill in the art in order to generate a collimated beam 900 at a different distance from the one or more signal collection elements 108 and/or a collimated beam 900 with a different beam diameter.

Figure 10:
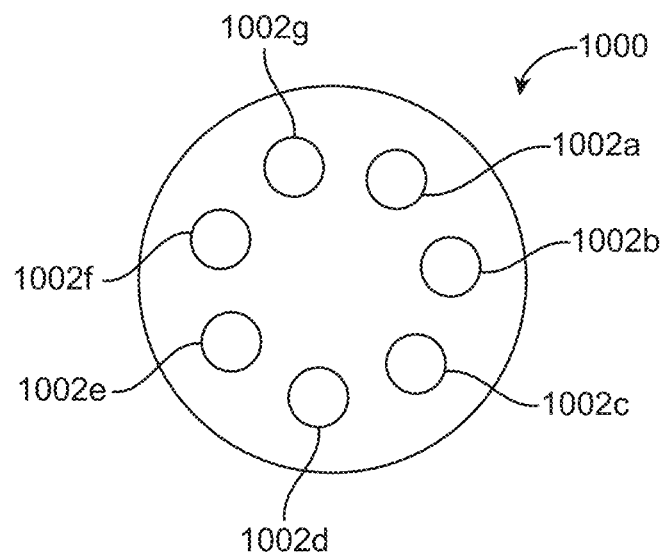
FIG. 10 shows a schematic a filter wheel for use with a TRFS system which may be used to measure the instrument response function (IRF), in accordance with embodiments.

FIG. 10 shows a schematic a filter wheel which may be used to measure the instrument response function (IRF). The filter wheel 1000 may be substantially similar to any of the filter wheels described herein. It will be understood by one of ordinary skill in the art that any of the features of the filter wheels described herein may be combined as desired. The instrumentation of the system (including the optical assembly, light source, detector, digitizer, etc.) may affect the fluorescence signal (or responsive optical signal) of the tissue. This effect is referred to as the IRF. In many cases, the contribution of many of the components to the IRF may not vary significantly over time and can therefore be measured in advance, prior to measuring a signal from the tissue, and stored on the computer without the need for continual monitoring. The stored IRF may be used to perform deconvolution on the collected sample fluorescence decays in order to determine the "true" decay signals. The light source, for example, a laser, however, may change in pulse characteristics (for example, signal intensity, etc.) over time due to variations in the laser temperature, duration of usage, drifts, etc. In some instances, it may be desirable to configure the system to compensate for variations in the laser pulse quality by collecting the IRF during each cycle of the filter wheel 800 and using the newly-collected IRF for deconvolution of the set of spectral bands collected during that cycle. The filter wheel 1000 may comprise one or more spectral filters, for example, 6 spectral filters 1002b-1002g as shown, which split the responsive optical signal into spectral bands as described herein. The filters wheel 1000 may further comprise a seventh filter 1002a, for example, a low pass filter, which may provide information about the IRF of the system. The seventh spectral filter 1002a may comprise a low pass filter and a neutral density filter (to reduce the signal intensity as the laser intensity is typically several orders of magnitude higher than the intensity of the responsive optical signal) in order to collect information about the laser itself in order to determine the IRF for each cycle of the filter wheel 800.

Figure 11:
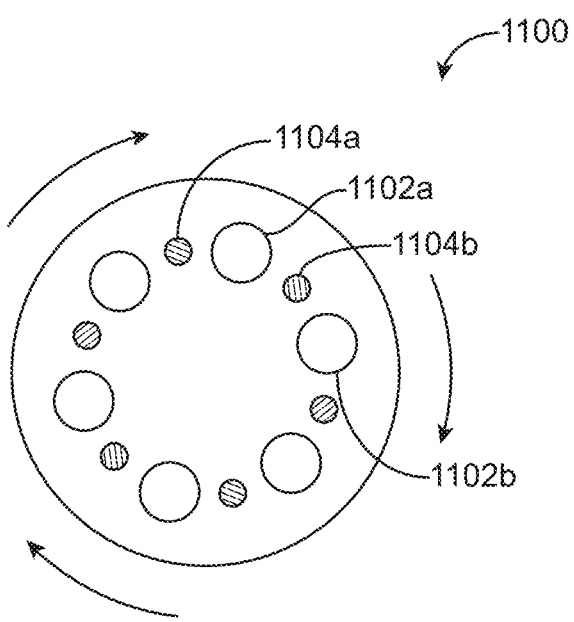
FIG. 11 shows a schematic of a filter wheel with integrated encoders for use with a TRFS system, in accordance with embodiments.

FIG. 11 shows a schematic of a filter wheel with integrated encoders. The filter wheel 1100 may be substantially similar to any of the filter wheels described herein. It will be understood by one of ordinary skill in the art that any of the features of the filter wheels described herein may be combined as desired. In some cases, the filter wheel 1100 may be a stepped filter which uses a stepper motor to ensure accurate positioning of the filters 1102 and inform the system (for example, the computer processor) which spectral band corresponds to which spectral filter 1102. In some cases, however, a continuous motor may be used to continuously rotate the filter wheel 1100. Using a continuous motor may allow for increased signal acquisition speed and decreased acquisition time. One or more encoders 1104 may be integrated onto the filter wheel 1100 in order to "flag" each spectral band as corresponding to a particular spectral filter 1102 as the signal is acquired by the detector. For example, there may be an encoder 1104 between each filter 1102 in order to identify each spectral band as it is generated by the filter wheel 1100. A first encoder 1104*a* may identify a first filter 1102*a* which may generate a first spectral band and a second encoder 1104*b* may identify a second filter 1102*b* which may generate a second spectral band, and so on for each spectral band. The encoders 1104 may also be used to trigger data acquisition by the digitizer in order to start data capture and identify the wavelength(s) of the spectral bands.

Figure 12:
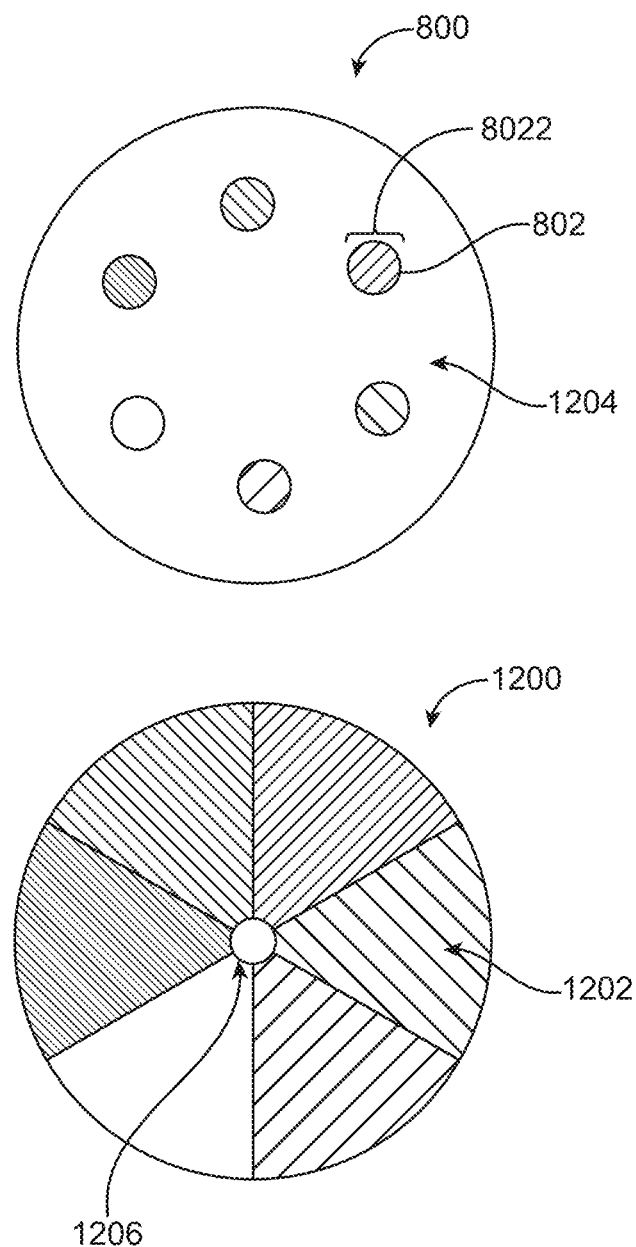
FIG. 12 shows a schematic of a filter wheel with reduced dead space for use with a TRFS system, in accordance with embodiments.

FIG. 12 shows a schematic of a filter wheel with reduced dead space. The filter wheel 1200 may be substantially similar to any of the filter wheels described herein. It will be understood by one of ordinary skill in the art that any of the features of the filter wheels described herein may be combined as desired. On the left is shown a filter wheel 800 which may comprise one or more spectral filters 802 set into the filter wheel 800 with a holder 8022. Each spectral filter 802 comprises some amount of dead space 1204 between it and its neighboring filters. This dead space 1204 may prevent transmission of the responsive optical signal when the signal is not focused on the filter 802, for example, while the filter wheel 800 is rotating between adjacent filters 802. In some instances, for example, to increase acquisition time and/or ensure that data is captured reliably, it may be beneficial to reduce the amount of dead space 1204 on the filter wheel 800. In many cases, dead space 1204 on the filter wheel 800 may require pulsing of the laser to be temporarily stopped as the filter wheel 800 moves between filters 802. Temporarily stopping a laser, even for a microsecond, may require time (for example, 100 us of pulses) to stabilize after restarting which can lead to wasted laser pulses when the filter 802 is properly positioned in front of the detector once more. Alternatively or in combination, the dead space 1204 may lead to a lack of signal and a time during which the system is not acquiring data (and thus is less efficient than it might be if continuously acquiring data). On the right is shown a filter wheel 1200 which has been configured to reduce the amount of dead space in the filter wheel 1200. The filter wheel 1200 may comprise a coated glass which has been coated so as to generate multiple adjacent spectral zones 1202 without dead space between them. The lack of dead space may increase the efficiency of the system as the light source may be continuously fired and the signal may be continuously acquired as the filter wheel 1200 rotates past each spectral filter 1202. The filter wheel 1200 may optionally comprise an IRF filter region 1206 which may comprise a short pass filter and optionally a neutral density filter so as to collect information about the IRF for each cycle of the filter wheel 1200 as described herein.

Figure 13:
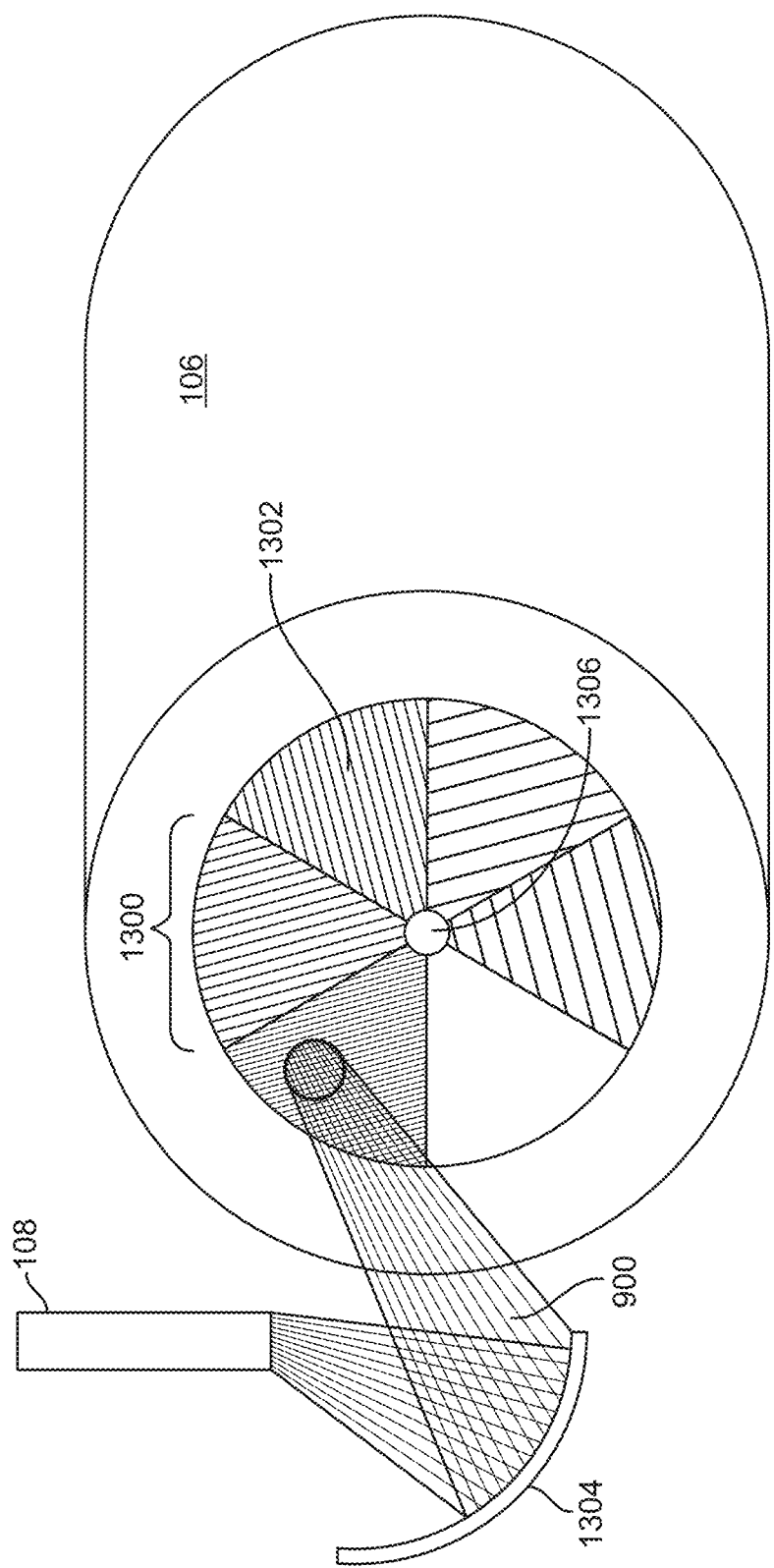
FIG. 13 shows a schematic of an optical assembly comprising a focusing mirror gavlometer and spectral filters for use with a TRFS system, in accordance with embodiments.

FIG. 13 shows a schematic of an optical assembly comprising a focusing galvo mirror and spectral filters. A stationary filter wheel 1300 may be provided between the detector 106 and the one or more signal collection element 108 and a focusing mirror galvometer 1304 may be used to direct the responsive optical signal 900 from the signal collection elements 108 through the spectral filters 1302 of the stationary filter when 1300 to the detector 106. The responsive optical signal may be directed onto the spectral filters 1302 in sequence by the mirror galvometer 1304. The mirror galvometer 1304 may deviate in x and y directions in order to focus the responsive optical signal 900 onto each filter 1302 of the filter wheel 1300 with a small area in a pre-determined sequence. The filter wheel may be substantially similar to any of the filter wheels described here in composition and filter 1302 type (e.g. insert or coating). The mirror galvometer 1304 may rapidly move the responsive optical signal 900 to focus the signal 900 on a single filter 1302 at a time. Use of a stationary filter wheel 1300 and a mirror galvometer 1304 may increase the acquisition speed of the system compared to a rotating filter wheel. The mirror galvometer 1304 may repeat its acquisition sequence of spectral filters 1302 in order to generate time-resolved, spectrally-resolved data. The filter wheel 1300 may optionally comprise an IRF filter region 1306 which may comprise a short pass filter and optionally a neutral density filter so as to collect information about the IRF for each sequence of the mirror galvometer 1304 as described herein.

FIG. 14A shows a schematic of a probe for time-resolved spectroscopy. FIG. 14C shows a magnified end view of the tip of the prove of FIG. 14A. FIG. 14C shows a magnified view of the tip of the probe of FIG. 14A. The probe 1400 may be substantially similar to any of the probes described herein. The probe 1400 may, for example, comprise one or more of an excitation signal transmission element 103, a light source, a signal collection element 108, an optical assembly, an optical delay device or element, a detector, a digitizer, a photodiode, a detector gate, or a trigger synchronization mechanism 102. The probe 1400 may, for example, comprise an excitation transmission element 103 and one or more, for example, six, signal collection element 108. The excitation transmission element 103 and one or more signal collection element 108 may be substantially similar to those described herein. The excitation transmission element 103 and six signal collection elements 108 may, for example, comprise optical fibers (e.g. 600 um, NA 0.27) arranged such that the excitation transmission fiber 103 is centrally-positioned with the six signal collection elements 108 arranged therearound. The probe 1400 may be operably coupled at its proximal end to a light source (not shown) which emits a light pulse. The light pulse may be directed onto the excitation signal transmission element 103 and directed therealong towards the distal end 1402 of the probe 1400 and the biological sample. The light pulse may be directed onto the biological sample from the distal end 1402 of the probe 1400 in order to radiate the sample and produce a responsive optical signal. The distal end 1402 of the probe 1400, or any probe described herein, may comprise a front-facing window 1404, for example, a sapphire window. The window 1404 may be configured to reduce contamination of space between the excitation transmission element 103, one or more signal collection element 108, and/or the body of the probe 1400. Alternatively or in combination, the window 1404 may be configured to provide a small distance between the distal end of the excitation transmission element 103 and the sample in order to increase the size of the energy beam or pulse which reaches the sample and illuminate/radiate a larger are of target tissue. The responsive optical signal may be collected by the plurality of signal collection elements 108. The responsive optical signal may be directed to an optical assembly (not shown) for splitting into spectral bands as described herein. The signal collection fibers 108 may be bundled into a plurality of fibers. The demultiplexer or other optical assembly may be integral or external to the probe 1400. The spectral bands may then have one or more time delay applied by an optical delay element before being detected by a detector. An optical delay element may be integral or external to the probe 1400. The detector may be external to the probe 1400. The components of the probe 1400 may be substantially similar to those described herein. The probe 1400 may be configured to be handheld. The probe 1400 may comprise a handheld probe. The probe 1400 may be robotically-controlled, for example, with a commercially-available robotic surgery system. The probe 1400 may be integrated with a suction cannula, for example, to allow for (near) real-time spectroscopy-guided surgical resection.

Figure 15:
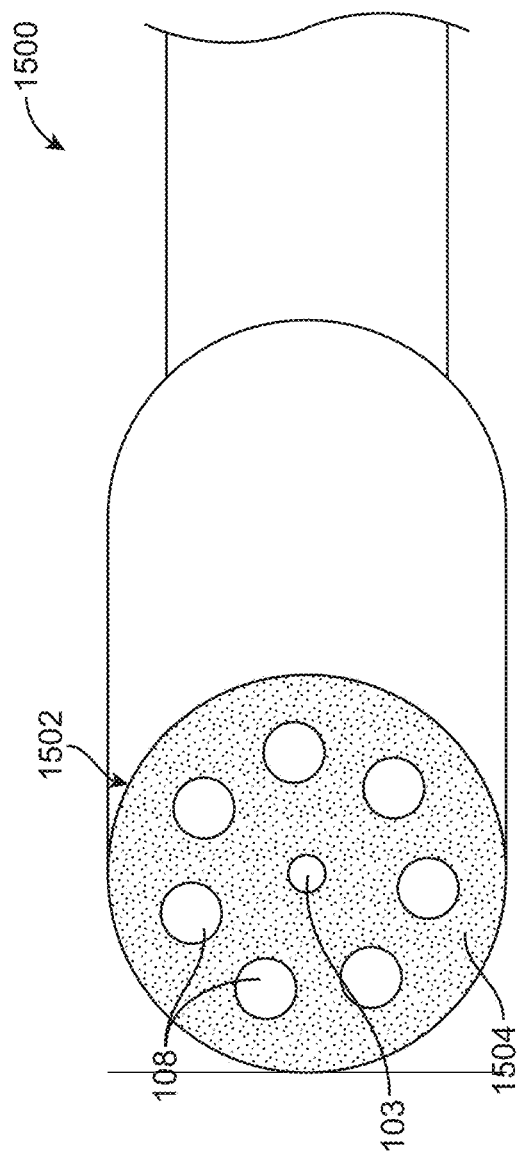
FIG. 15 shows a schematic of the tip of a probe for time-resolved spectroscopy comprising a low-fluorescence epoxy, in accordance with embodiments.

FIG. 15 shows a schematic of the tip of a probe for time-resolved spectroscopy comprising a low-fluorescence epoxy. The probe 1500 may be substantially similar to any of the probes described herein. It will be understood by one of ordinary skill in the art that any of the features of the probes described herein may be combined as desired. The distal end 1502 of the probe 1500 is highlighted. The probe 1500 may comprise an excitation transmission element 103 and one or more, for example, six, signal collection element 108. The excitation transmission element 103 and one or more signal collection element 108 may be substantially similar to those described herein. In some instances, the materials used to make an optical probe, such as any of the probes described herein, may be selected to reduce auto-fluorescence of the materials themselves as light is passed through the probe. Epoxy 1504, which may be used to bind the excitation transmission element 103 and signal collection elements 108 may produce a strong fluorescent signal depending on the wavelength of the incident light. Fluorescence of the epoxy within the probe may obscure or disrupt collection and analysis of the optical response signal. In some cases, it may be beneficial to reduce the amount of auto-fluorescence generated by the epoxy 1504 used to bind the fibers 103, 108. For example, the epoxy 1504 may be mixed with carbon black or soot before being used to bind the fibers. Carbon black or soot in the epoxy 1504 may absorb the light which reaches the epoxy, thereby reducing fluorescent noise from the epoxy 1504.

Figure 16B:
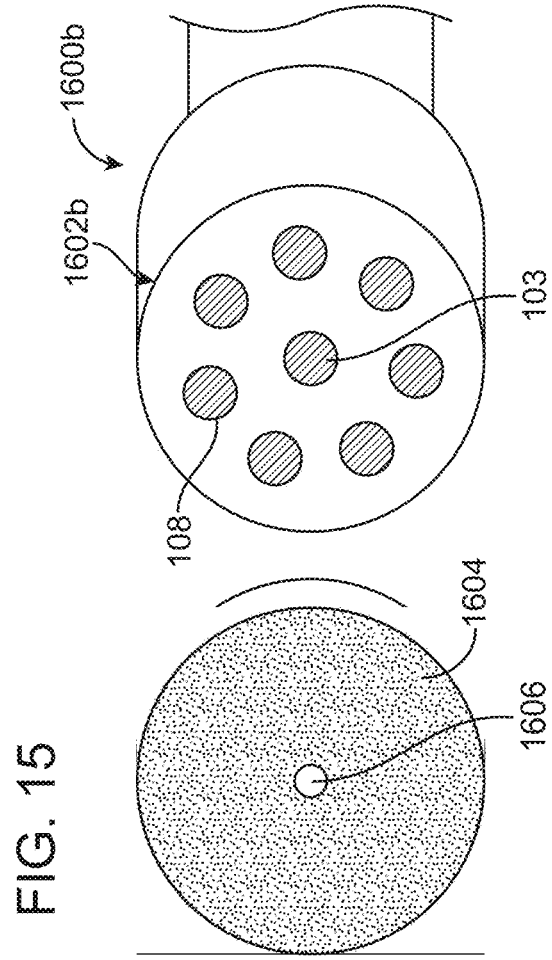
FIG. 16B shows a schematic of the tip of a probe for time-resolved spectroscopy with a sapphire window comprising a short-pass filter, in accordance with embodiments.
Figure 16A:
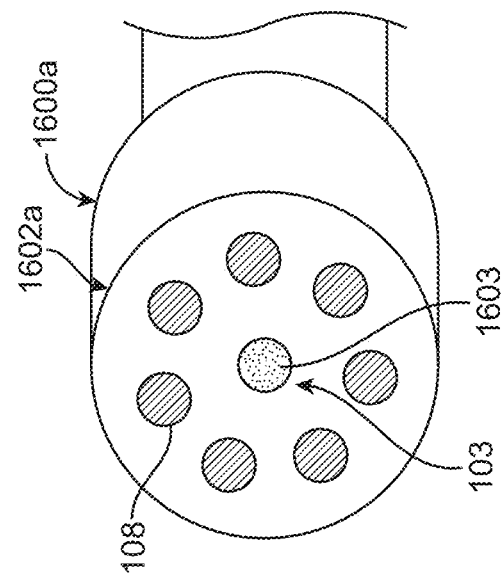
FIG. 16A shows a schematic of the tip of a probe for time-resolved spectroscopy comprising a short-pass filter coupled to the excitation element, in accordance with embodiments.

FIG. 16A shows a schematic of the tip of a probe for time-resolved spectroscopy comprising a short-pass filter coupled to the excitation element. The probe 1600a may be substantially similar to any of the probes described herein. It will be understood by one of ordinary skill in the art that any of the features of the probes described herein may be combined as desired. The distal end 1602a of the probe 1600a is highlighted. The probe 1600a may comprise an excitation transmission element 103 and one or more, for example, six, signal collection element 108. The excitation transmission element 103 and one or more signal collection element 108 may be substantially similar to those described herein. In some instances, the materials used to make an optical probe, such as any of the probes described herein, may be selected to reduce auto-fluorescence of the materials themselves as light is passed through the probe. For example, the excitation transmission element 103 may auto-fluoresce when the excitation light pulse travels therealong. Fluorescence of the excitation transmission element 103 may be collected by the signal collection element 108 along with the optical response signal, thereby obscuring or disrupting the optical response signal and increasing the amount of noise in the system. In some cases, it may be beneficial to coat the excitation transmission element 103 with a short pass filter 1603 to prevent auto-fluorescence of the excitation transmission element 103 from influencing the responsive optical signal collected from the tissue.

FIG. 16B shows a schematic of the tip of a probe for time-resolved spectroscopy with a sapphire window comprising a short-pass filter. The probe 1600b may be substantially similar to any of the probes described herein. It will be understood by one of ordinary skill in the art that any of the features of the probes described herein may be combined as desired. The distal end 1602b of the probe 1600b is highlighted. The probe 1600b may comprise an excitation transmission element 103 and one or more, for example, six, signal collection element 108. The excitation transmission element 103 and one or more signal collection element 108 may be substantially similar to those described herein. As an alternative to or in combination with coating the excitation transmission element 103 as described in FIG. 16A, it may be beneficial to provide a short pass filter 1606 between the sample and the excitation transmission element 103 in order to prevent auto-fluorescence of the excitation transmission element 103 from influencing the responsive optical signal collected from the tissue. For example, a sapphire window 1604 with a short pass filter 1606 therein which sits between the excitation transmission element 103 and the sample may be provided at the distal end 1602b of the probe 1600b.

Figure 17:
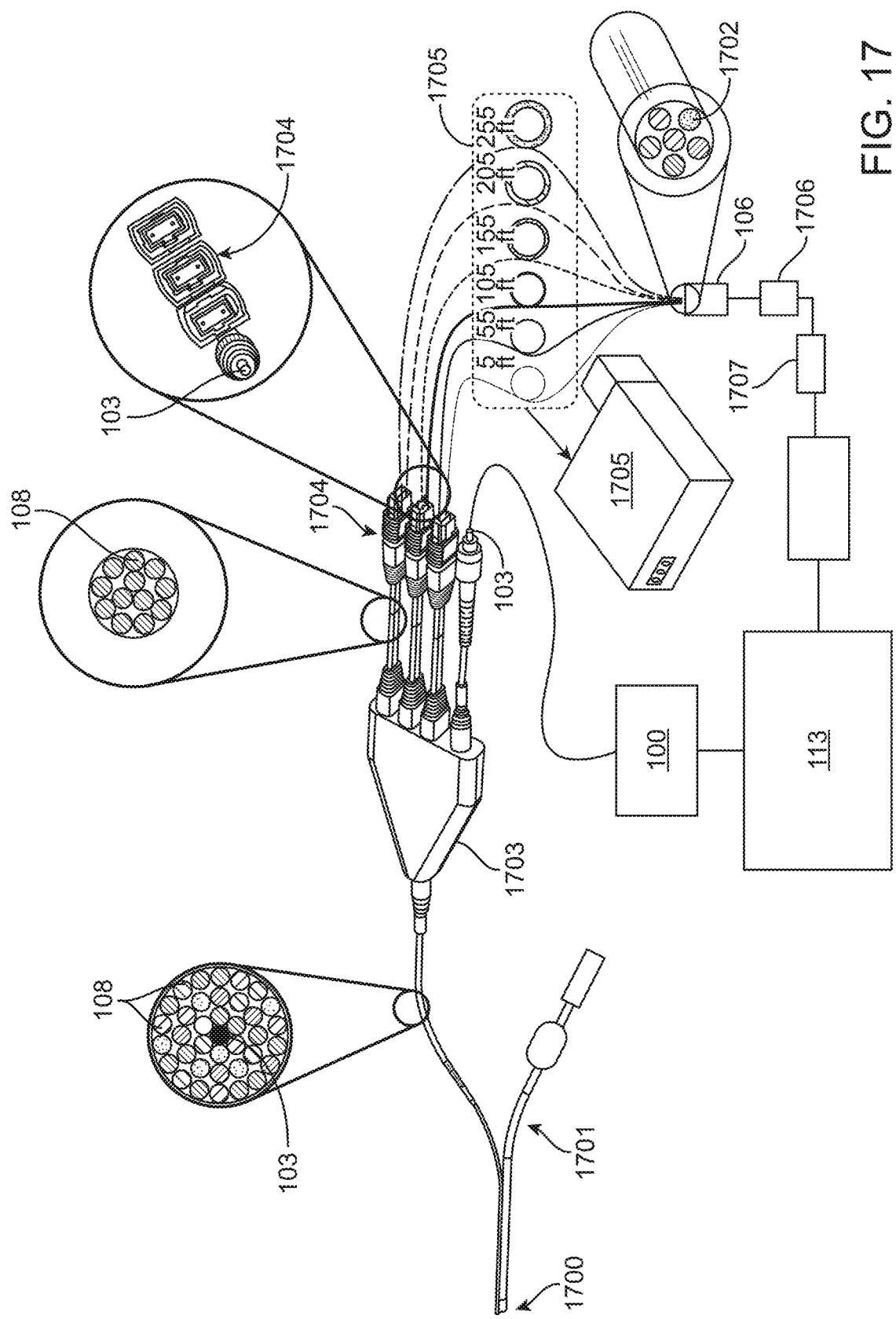
FIG. 17 shows a schematic of a time-resolved fluorescence spectroscopy system, in accordance with embodiments.

FIG. 17 shows a schematic of a time-resolved fluorescence spectroscopy system. The system may be used to characterize a biological samples using real-time, or near real-time, time-resolved fluorescence spectroscopy. The system may comprise an excitation signal transmission element 103, a light source 100, at least one signal collection element 108, and an optical assembly such as one or more spectral filters 1702. The excitation signal transmission element 103 and the at least one signal collection element 108 may be coupled together in a probe 1700, which may be substantially similar to any of the probes described herein. The probe 1700 may be integrated with a suction cannula 1701, for example, to allow for (near) real-time spectroscopy-guided surgical resection. The system may comprise one or more of an optical delay device or element 1705, a detector 106, a computer or processor 113, a digitizer, a photodiode, a detector gate, or a trigger synchronization mechanism as described herein. The system may further comprise a voltage-gated attenuator 1706 and/or a pre-amplifier 1707. The excitation signal transmission element 103, light source 100, at least one signal collection element 108, detector 106, digitizer, photodiode, detector gate, and trigger synchronization mechanism may be substantially similar to those described herein. The optical delay device 1705 may be substantially similar to those described herein, for example, comprising a plurality of fibers or fiber bundles of different lengths in order to introduce a time-delay for each spectral band.

The light source 100 may be configured to generate a light pulse or beam of continuous light at a pre-determined excitation wavelength. The light pulse may be directed towards the biological sample, for example, a patient's brain, by the excitation signal transmission element 103, for example, an optical fiber. Excitation by the light pulse may cause the biological sample 101 to produce a responsive optical signal which may be collected by one or more signal collection element 108. For example, 36 signal collection elements 108 may be bundled together to collect the responsive optical signal. The excitation signal transmission element 103 may be the central fiber within the bundle of 36 collection fibers 108 as shown. A connector 1703 may be used to couple each of the fibers within the 36-fiber bundle to corresponding fibers in three 12-fiber bundles. The three 12-fiber bundles may then be split into six 6-fiber bundles by a collection fiber bundle coupler 1704 which feeds into the optical delay device 1705. The responsive optical signal may be directed towards the optical delay device 1705 from the sample by the signal collection elements 108 in order to apply a time delay to the responsive optical signal collected by each of the six 6-fiber bundles. Each of the six 6-fiber bundles may, for example, have a length which differs from each of the other 6-fiber bundles in order to generate a time delay as described herein. The delay fibers may be graded-index fibers so as to maintain the bandwidth of the responsive optical signal over the fiber length. The optical delay device 1705 may then direct the time-delayed responsive optical signals to an optical assembly configured to split the time-delay responsive optical signals into time-delayed spectral bands. For example, the time-delay responsive optical signal may be directed onto a demultiplexer or filter wheel as described herein. Alternatively or in combination, the delay fibers of the optical delay device 1705 may comprise an optical assembly. For example, the proximal end of each of the six 6-fiber bundles may comprise a spectral filter such that each 6-fiber bundle directs a time-delayed, wavelength-resolve spectral band to the detector 106. Alternatively or in combination, the proximal end of each of the six 6-fiber bundles may be coated with a coloring so as to generate time-delayed spectral bands. The time-delayed spectral bands may then be directed towards the detector 106 and detected one at a time. For each spectral band, the detector 106 may record the fluorescence decay and the fluorescence intensity of a spectral band before the next spectral band reaches the detector 106. In this way, a single excitation light pulse may be used to gather both time-resolved (fluorescence decay) information as well as wavelength-resolved (fluorescence intensity) information from the responsive optical signal in real-time or near real-time.

Any of the systems, devices, or probes described herein may further comprise an ablation element to ablate the target tissue. The target tissue may be ablated in response to characterization of the target tissue as described herein. The ablation element may be configured to apply one or more of radiofrequency (RF) energy, thermal energy, cryo energy, ultrasound energy, X-ray energy, laser energy, or optical energy to ablate a target tissue. The ablation element may be configured to apply laser or optical energy to ablate the target tissue. The ablation element may comprise the excitation signal transmission element. The ablation element may comprise any of the probes described herein. In a two-part probe design, the ablation element may comprise the proximal excitation signal transmission element and/or the distal signal transmission element. The combination of ablation and time-resolved fluorescence spectroscopy may be used to determine which tissue should be ablated prior to ablation, to monitor ablation as it occurs, and/or to confirm that the correct tissue was ablation after ablation ends. In some instances, commercially-available ablation probes may be modified to collect a fluorescence signal from the tissue as described herein and used to generate time-resolved fluorescence spectroscopy data as described herein.

The systems, devices, and methods described herein may be used to characterize a biological sample in (near) real-time in combination with image-guided surgery techniques in order to better inform surgeons. For example, the biological sample may be characterized as normal tissue, benign tissue, or malignant tissue and the characterization may be registered with an image of the biological sample at the same location in order to provide spectral information about the location to guide surgical decisions. The location of the time-resolved spectroscopy probe described herein may be tracked during use. The characterization of the target tissue may be registered with the location of the probe and the image of the biological sample at the tracked location. Imaging of the target tissue may occur pre-operatively, intra-operatively, and/or post-operatively. The spectroscopic information may be display separately from, alongside, or overlaid on the pre-operative, intra-operative, and/or post-operative image(s). The imaging device used to produce the image of the target tissue location on the biological sample may comprise an MRI scanner, a CT scanner, a PET scanner, an optical coherence tomography (OCT) device, an ultrasound transducer, an NMR imager, or an electrical impedance tomography (EIT) device. The image may comprise an MRI image, an ultrasound image, a CT image, an OCT image, an NMR image, a PET image, or an EIT image. The combined imaging-spectral characterization may be repeated at multiple locations on the biological sample, or scanned over multiple locations as described herein, to create a larger image of at least a part of the biological sample, for example, to locate a tumor margin. For example, the spectroscopic information obtained by the systems, devices, and methods described herein may be registered with images generated by neuronavigation during brain surgery in order to provide surface information (spectroscopy) with deeper imaging (neuronavigation) and better inform surgical decisions.

The time-resolved florescence spectroscopy systems, devices, and methods described herein may be actively or passively integrated with neuro-navigation for intra-operative localization. For example, a commercially-available neuro-navigation system, such as the Medtronic SureTrak® system, available from Medtronic plc. of Dublin, Ireland, may be coupled to one of the probes described herein in order to track the location of the probe. Passive integration of the probe may entail utilizing a portion of the SureTrak® display to display the time-resolved data without additional data exchange, other than the video signal itself, between the two systems. Active integration of the probe may entail combining the neuronavigation and time-resolved fluorescence spectroscopy systems to generate combined data. For example, the time-resolved fluorescence spectroscopy system described herein may send data to the neuronavigation system which may then display (or plot) the data on a pre-operative MRI image(s) at the "SureTrak" co-ordinates. Alternatively or in combination, the neuronavigation system may send the "SureTrak" co-ordinates to the system described herein which may be configured to independently plot the co-ordinate data in the native software in relation to the pre-operative MRI image(s).

The systems, devices, and methods described herein may be used to characterize a biological sample in combination with other tissue detection or diagnostic techniques. For example, the biological sample may be characterized in combination with histological diagnostics. The biological sample may be characterized in combination with electrical impedance analysis. For example, the biological sample may be assessed for changes in electrical impedance characteristic of a particular tissue type in combination with time-resolved spectroscopy characterization. Changes in electrical impedance of a tissue may, for example, be used to detect the presence of tumor cells in a tissue sample in vivo or ex vivo which may be deeper than the penetrance of the time-resolved spectroscopy. The systems, devices, and methods described herein may be used in combination with any other tissue detection or diagnostic methodology in order to characterize a biological sample.

The systems, devices, and methods described herein may be used to determine tissue viability after injury. An alteration in the responsive optical signal of a tissue sample, either an increase or a decrease relative to a healthy subject depending on the molecule being assessed, may be indicative of tissue viability. For example, the NADH redox state may differ between viable and non-viable tissue samples such that an increase in NADH fluorescence in an injured tissue sample may be indicative of NADH accumulation and poor tissue viability. Analysis of one of more molecules within the biological sample may distinguish between multiple tissue types, for example, necrotic tissue, hypoxic tissue, or scar tissue.

The systems, devices, and methods described herein may be used to monitor cellular metabolism in a biological sample. The cellular metabolism of the sample may be characterized periodically or continuously over a desired time period. Cellular metabolism may, for example, be characterized by the NADH redox state. Continuous monitoring of cellular metabolism may allow for assessment of cell viability and the vulnerability of cells in ischemic conditions. Continuous monitoring of cellular metabolism may allow for assessment of the effects of therapeutics in order to optimize the therapeutic window of a drug. Continuous monitoring of cellular metabolism in addition to monitoring pH and/or oxygen levels may be used to determine the metabolic state of the cell or tissue sample.

The systems, devices, and methods described herein may be used to detect tumors and/or determine the malignancy of the tumor. The wavelength decay characteristics for a given tumor type compared to its normal tissue counterpart may be determined and used to inform characterization of unknown tissue types. The characteristic spectral response of a given tumor type may be specific to that tumor type, allowing not only for the characterization of biological tissue as cancerous or non-cancerous but the potential determination of tumor type and/or grade (e.g. severity). The systems, devices, and methods described herein may be used to detect known brain tumor-targeting molecules such as chlorotoxin (CTX), 5-aminolevulinic acid (5-ALA), or sodium fluorescein, to name a few. It may be possible to characterize a tissue based on the parameters selected from the total autofluorescence of a tissue, rather than based on specific fluorescence by known molecules.

The systems, devices, and methods described herein may be used to characterize a biological sample comprising an exogenous fluorescent molecule. The systems, methods, and devices described herein may be used to determine one or both of the concentration or distribution of the exogenous fluorescent molecule in a biological sample. In at least some instances, the distribution and/or concentration of an injected fluorescently-labeled molecule may be of interest when treating a patient. For example, it may be beneficial to diagnosis or treatment decisions to be able to determine the location or concentration of an injected therapeutic agent in a particular part of the body. In another example, it may be of interest to inject a fluorescently-labeled tumor-targeting molecule in order to determine where the margins of a tumor are prior to, during, or after surgical resection. The concentration of the exogenous fluorescent molecule may be determined from the time-delayed spectral bands by comparing the time-delayed spectral bands to data generated from spectral bands of the exogenous fluorescent molecule at known concentrations. The distribution of the exogenous fluorescent molecule within a biological sample may be determined by assessing the time-delayed spectral bands acquired at one or more locations on the biological sample for the presence or absence of the spectrum emitted by the exogenous fluorescent molecule. The exogenous fluorescent molecule may comprise one or more of a fluorescently-labeled drug, a fluorescent dye, or a fluorescently-labeled tissue marker. The exogenous fluorescent molecule may comprise any known fluorescent moiety conjugated to any known drug, dye, tissue marker or the like, or any combinations thereof. It will be understood that the choice of exogenous fluorescent molecule used to characterize a biological sample may be dependent of the biological sample of interest. The exogenous fluorescent molecule may, for example, comprise one or more of ICG-labeled CTX, ICG-labeled knottin, Cy5-labeled knottin, Cy7-labeled knottin, a fluorescently-conjugated tumor-targeting antibody, or a fluorescently-labeled tumor-targeting moiety when the biological sample is a brain to be characterized as normal brain, benign tumor, or malignant tumor. The systems and devices described herein may be configured to detect specific fluorophores of interest. For example, the light source may be tuned to excite an injected fluorescently-labeled tumor marker. The demultiplexer may be configured to split the responsive optical signal into wavelength ranges which best capture the emission of the fluorescent label (e.g. fluorophore) and/or remove tissue autofluorescence. The systems, devices, and methods described herein may be configured to optimally excite or detect any exogenous fluorophore of interest in a biological sample.

The systems, devices, and methods described herein may be used to characterize a biological sample with a high degree of specificity. The biological sample may be characterized with a specificity of about 80 percent to about 100 percent. The biological sample may be characterized with a specificity of about 85 percent to about 100 percent. The biological sample may be characterized with a specificity of about 90 percent to about 100 percent. The biological sample may be characterized with a specificity of about 95 percent to about 100 percent. The biological sample may be characterized with a specificity of about 80 percent to about 95 percent. The biological sample may be characterized with a specificity of about 85 percent to about 90 percent.

The systems, devices, and methods described herein may be used to characterize a biological sample with a high degree of sensitivity. The biological sample may be characterized with a sensitivity of about 80 percent to about 100 percent. The biological sample may be characterized with a sensitivity of about 85 percent to about 100 percent. The biological sample may be characterized with a sensitivity of about 90 percent to about 100 percent. The biological sample may be characterized with a sensitivity of about 95 percent to about 100 percent. The biological sample may be characterized with a sensitivity of about 80 percent to about 95 percent. The biological sample may be characterized with a sensitivity of about 85 percent to about 90 percent.

The systems, devices, and methods described herein may be used to detect any molecule which has a detectable (for example, emitted or absorbed) optical spectrum in response to excitation with a light pulse. The systems, devices, and methods described herein may, for example, be used to detect any molecule, fluorescently-labeled or unlabeled, including but not limited to therapeutic agents, antibodies, toxins, endotoxins, exotoxins, tumor markers, or combinations thereof. The systems, devices, and methods described herein may for example be used to detect the intrinsic fluorescence of unlabeled molecules (e.g., autofluorescence).

Therapeutic agents may include chemotherapeutic agents. Examples of chemotherapeutic agents include but are not limited to Albumin-bound paclitaxel (nab-paclitaxel), Actinomycin, Alitretinoin, All-trans retinoic acid, Azacitidine, Azathioprine, Bevacizumab, Bexatotene, Bleomycin, Bortezomib, Carboplatin, Capecitabine, Cetuximab, Cisplatin, Chlorambucil, Cyclophosphamide, Cytarabine, Daunorubicin, Docetaxel, Doxifluridine, Doxorubicin, Epirubicin, Epothilone, Erlotinib, Etoposide, Fluorouracil, Gefitinib, Gemcitabine, Hydroxyurea, Idarubicin, Imatinib, Ipilimumab, Irinotecan, Mechlorethamine, Melphalan, Mercaptopurine, Methotrexate, Mitoxantrone, Ocrelizumab, Ofatumumab, Oxaliplatin, Paclitaxel, Panitumab, Pemetrexed, Rituximab, Tafluposide, Teniposide, Tioguanine, Topotecan, Tretinoin, Valrubicin, Vemurafenib, Vinblastine, Vincristine, Vindesine, Vinorelbine, Vorinostat, Romidepsin, 5-fluorouracil (5-FU), 6-mercaptopurine (6-MP), Cladribine, Clofarabine, Floxuridine, Fludarabine, Pentostatin, Mitomycin, ixabepilone, Estramustine, or combinations thereof.

The chemotherapeutic agents may be labeled or unlabeled (for example, if the chemotherapeutic agent has intrinsic fluorescence). The label may be a fluorescent label, for example. Examples of fluorescent labels that may be used with the systems, devices, and methods described herein to label the therapeutic agents include but are not limited to indocyanine green (ICG), curcumin, rhodamine (such as rhodamine B, rhodamine 123, rhodamine 6G or variants thereof), green fluorescent protein (GFP), luciferin, fluorescein, quantum dots, or combinations thereof.

Antibodies, including therapeutic antibodies, may include but are not limited to 3F8, 8H9, Abagovomab, Abciximab, Actoxumab, Adalimumab, Adecatumumab, Aducanumab, Afelimomab, Afutuzumab, Alacizumab pegol, ALD518, Alemtuzumab, Alirocumab, Altumomab pentetate, Amatuximab, Anatumomab mafenatox, Anifrolumab, Anrukinzumab, Apolizumab, Arcitumomab, Aselizumab, Atinumab, Atlizumab, Atorolimumab, Bapineuzumab, Basiliximab, Bavituximab, Bectumomab, Belimumab, Benralizumab, Bertilimumab, Besilesomab, Bevacizumab, Bezlotoxumab, Biciromab, Bimagrumab, Bivatuzumab mertansine, Blinatumomab, Blosozumab, Brentuximab vedotin, Briakinumab, Brodalumab, Canakinumab, Cantuzumab mertansine, Cantuzumab ravtansine, Caplacizumab, Capromab pendetide, Carlumab, Catumaxomab, cBR96-doxorubicin immunoconjugate, Cedelizumab, Certolizumab pegol, Cetuximab, Citatuzumab bogatox, Cixutumumab, Clazakizumab, Clenoliximab, Clivatuzumab tetraxetan, Conatumumab, Concizumab, Crenezumab, Dacetuzumab, Daclizumab, Dalotuzumab, Daratumumab, Demcizumab, Denosumab, Detumomab, Dorlimomab aritox, Drozitumab, Duligotumab, Dupilumab, Dusigitumab, Ecromeximab, Eculizumab, Edobacomab, Edrecolomab, Efalizumab, Efungumab, Eldelumab, Elotuzumab, Elsilimomab, Enavatuzumab, Enlimomab pegol, Enokizumab, Enoticumab, Ensituximab, Epitumomab cituxetan, Epratuzumab, Erlizumab, Ertumaxomab, Etaracizumab, Etrolizumab, Evolocumab, Exbivirumab, Fanolesomab, Faralimomab, Farletuzumab, Fasinumab, FBTA05, Felvizumab, Fezakinumab, Ficlatuzumab, Figitumumab, Flanvotumab, Fontolizumab, Foralumab, Foravirumab, Fresolimumab, Fulranumab, Futuximab, Galiximab, Ganitumab, Gantenerumab, Gavilimomab, Gemtuzumab ozogamicin, Gevokizumab, Girentuximab, Glembatumumab vedotin, Golimumab, Gomiliximab, Guselkumab, Ibalizumab, Ibritumomab tiuxetan, Icrucumab, Igovomab, IMAB362, Imciromab, Imgatuzumab, Inclacumab, Indatuximab ravtansine, Infliximab, Inolimomab, Inotuzumab ozogamicin, Intetumumab, Ipilimumab, Iratumumab, Itolizumab, Ixekizumab, Keliximab, Lambrolizumab, Lampalizumab, Lebrikizumab, Lemalesomab, Labetuzumab, Lerdelimumab, Lexatumumab, Libivirumab, Ligelizumab, Lintuzumab, Lirilumab, Lodelcizumab, Lorvotuzumab mertansine, Lucatumumab, Lumiliximab, Mapatumumab, Margetuximab, Maslimomab, Matuzumab, Mavrilimumab, Mepolizumab, Metelimumab, Milatuzumab, Minretumomab, Mitumomab, Mogamulizumab, Morolimumab, Motavizumab, Moxetumomab pasudotox, Muromonab-CD3, Nacolomab tafenatox, Namilumab, Naptumomab estafenatox, Namatumab, Natalizumab, Nebacumab, Necitumumab, Nerelimomab, Nesvacumab, Nimotuzumab, Nivolumab, Nofetumomab merpentan, Ocaratuzumab, Ocrelizumab, Odulimomab, Ofatumumab, Olaratumab, Olokizumab, Omalizumab, Onartuzumab, Ontuxizumab, Oportuzumab monatox, Oregovomab, Orticumab, Otelixizumab, Otlertuzumab, Oxelumab, Ozanezumab, Ozoralizumab, Pagibaximab, Palivizumab, Panitumumab, Pankomab, Panobacumab, Parsatuzumab, Pascolizumab, Pateclizumab, Patritumab, Pemtumomab, Perakizumab, Pertuzumab, Pexelizumab, Pidilizumab, Pinatuzumab vedotin, Pintumomab, Placulumab, Polatuzumab vedotin, Ponezumab, Priliximab, Pritoxaximab, Pritumumab, PRO 140, Quilizumab, Racotumomab, Radretumab, Rafivirumab, Ramucirumab, Ranibizumab, Raxibacumab, Regavirumab, Reslizumab, Rilotumumab, Rituximab, Robatumumab, Roledumab, Romosozumab, Rontalizumab, Rovelizumab, Ruplizumab, Samalizumab, Sarilumab, Satumomab pendetide, Secukinumab, Seribantumab, Setoximab, Sevirumab, SGN-CD19A, SGN-CD33A, Sibrotuzumab, Sifalimumab, Siltuximab, Simtuzumab, Siplizumab, Sirukumab, Solanezumab, Solitomab, Sonepcizumab, Sontuzumab, Stamulumab, Sulesomab, Suvizumab, Tabalumab, Tacatuzumab tetraxetan, Tadocizumab, Talizumab, Tanezumab, Taplitumomab paptox, Tefibazumab, Telimomab aritox, Tenatumomab, Teneliximab, Teplizumab, Teprotumumab, TGN 1412, Ticilimumab (tremelimumab), Tigatuzumab Tildrakizumab, TNX-650, Tocilizumab (atlizumab), Toralizumab, Tositumomab, Tovetumab, Tralokinumab, Trastuzumab, TRBS07, Tregalizumab, Tremelimumab, Tucotuzumab celmoleukin, Tuvirumab, Ublituximab, Urelumab, Urtoxazumab, Ustekinumab, Vantictumab, Vapaliximab, Vatelizumab, Vedolizumab, Veltuzumab, Vepalimomab, Vesencumab, Visilizumab, Volociximab, Vorsetuzumab mafodotin, Votumumab, Zalutumumab, Zanolimumab, Zatuximab, Ziralimumab, Zolimomab aritox, or combinations thereof.

The antibodies may be labeled or unlabeled. The label may be a fluorescent label, for example. Examples of fluorescent labels that may be used with the systems, devices, and methods described herein to label the therapeutic agents include but are not limited to ICG, curcumin, rhodamine (such as rhodamine B, rhodamine 123, rhodamine 6G or variants thereof), GFP, luciferin, fluorescein, quantum dots, or combinations thereof.

Toxins include but are not limited to alpha toxin, anthrax toxin, bacterial toxin, diphtheria toxin, exotoxin, pertussis toxin, shiga toxin, shiga-like toxin, heat-stable enterotoxins, channel forming toxins, mycotoxins, cholera toxin, scorpion venom, cholorotoxin, tetanus toxins, or combinations thereof.

The toxins may be labeled or unlabeled. The label may be a fluorescent label, for example. Examples of fluorescent labels that may be used with the systems, apparatus, and methods described herein to label the therapeutic agents include but are not limited to ICG, curcumin, rhodamine (such as rhodamine B, rhodamine 123, rhodamine 6G or variants thereof), GFP, luciferin, fluorescein, quantum dots, or combinations thereof.

Proteins, for example, cell surface proteins, may be c using the systems, devices, and methods described herein. The proteins may be detected using antibodies (for example, labeled or unlabeled antibodies) that bind to the cell surface markers. The proteins may be detected using siRNAs (for example, labeled or unlabeled siRNAs) that bind to the proteins of interest. Examples of proteins that may be detected using the systems, methods, and devices described herein include but are not limited to 4-1BB, 5T4, adenocarcinoma antigen, alpha-fetoprotein, annexin (for example, annexins A1, A2, A5), BAFF, B-lymphoma cell, C242 antigen, CA-125, carbonic anhydrase 9 (CA-IX), C-MET, CCR4, CD152, CD19, CD20, CD200, CD22, CD221, CD23

(IgE receptor), CD28, CD30 (TNFRSF8), CD33, CD4, CD40, CD44 v6, CD51, CD52, CD56, CD74, CD80, CEA, CNT0888, CTLA-4, DRS, EGFR, EpCAM, CD3, FAP, fibronectin extra domain-B, folate receptor 1, GD2, GD3 ganglioside, glycoprotein 75, GPNMB, HER2/neu, HGF, human scatter factor receptor kinase, IGF-1 receptor, IGF-1, IgG1, L1-CAM, IL-13, IL-6, insulin-like growth factor I receptor, integrin α5βI, integrin αvβ3, MORAb-009, MS4A1, MUC1, mucin CanAg, N-glycolylneuraminic acid, NPC-1C, PDGF-R a, PDL192, phosphatidylserine, prostatic carcinoma cells, RANKL, RON, ROR1, SCH 900105, SDC1, SLAMF7, TAG-72, tenascin C, TGF beta 2, TGF-β, TRAIL-R1, TRAIL-R2, tumor antigen CTAA16.88, VEGF-A, VEGFR-1, VEGFR-2, vimentin, or combinations thereof. Additional examples include but are not limited to AOC3 (VAP-1), CAM-3001, CCL11 (eotaxin-1), CD125, CD147 (basigin), CD154 (CD40L), CD2, CD20, CD23 (IgE receptor), CD25 (a chain of IL-2 receptor), CD3, CD4, CD5, IFN-α, IFN-γ, IgE, IgE Fe region, IL-1, IL-12, IL-23, IL-13, IL-17, IL-17A, IL-22, IL-4, IL-5, IL-5, IL-6, IL-6 receptor, integrin α4, integrin α4β7, Lama glama, LFA-1 (CDlla), MEDI-528, myostatin, OX-40, rhuMAb (37, scleroscin, SOST, TGF beta 1, TNF-α, VEGF-A, beta amyloid, MABT5102A, L-1(3, CD3, C5, cardiac myosin, CD41 (integrin alpha-IIb), fibrin II, beta chain, ITGB2 (CD18), sphingosine-1-phosphate, anthrax toxin, CCR5, CD4, clumping factor A, cytomegalovirus, cytomegalovirus glycoprotein B, endotoxin, *Escherichia coli* proteins, hepatitis B surface antigen, hepatitis B virus, HIV-1, Hsp90, Influenza A hemagglutinin, lipoteichoic acid, *Pseudomonas aeruginosa*, rabies virus glycoprotein, respiratory syncytial virus, TNF-α, Lewis Y and CEA antigens, Tag72, folate binding protein, or combinations thereof.

The proteins may be labeled or unlabeled. The label may be a fluorescent label, for example. Examples of fluorescent labels that may be used with the systems, apparatus, and methods described herein to label the therapeutic agents include but are not limited to ICG, curcumin, rhodamine (such as rhodamine B, rhodamine 123, rhodamine 6G or variants thereof), GFP, luciferin, fluorescein, quantum dots, or combinations thereof.

EXPERIMENTAL EXAMPLES

Figures 18A, 18B:
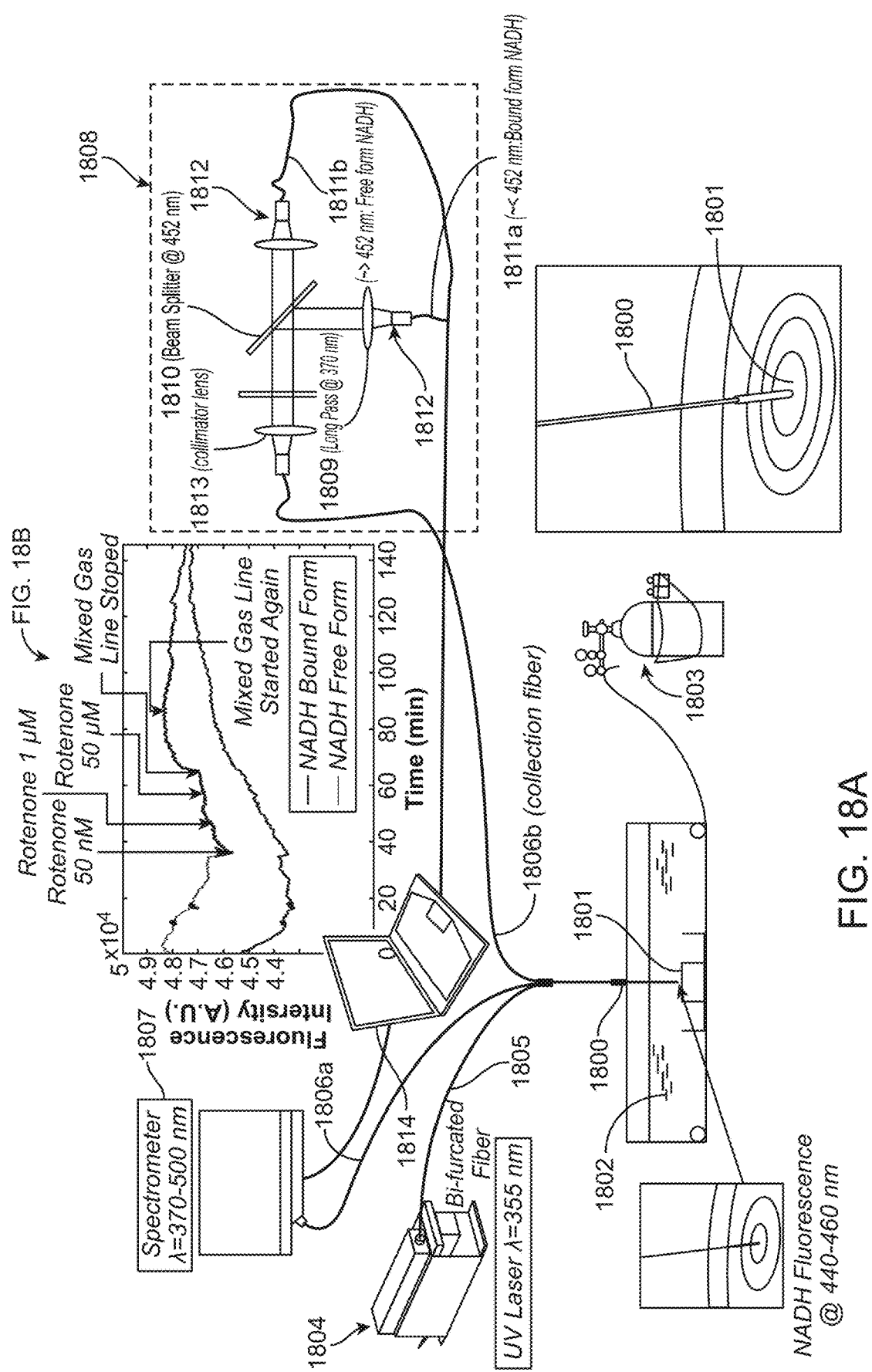
FIG. 18A shows a schematic of a time-resolved spectroscopy system used for the continuous monitoring of NADH in an ex vivo brain sample, in accordance with embodiments.
FIG. 18B shows results of an experiment with continuous monitoring of NADH in an ex vivo brain sample, in accordance with embodiments.

FIG. 18A shows a schematic of a time-resolved spectroscopy system used for continuous monitoring of NADH in an ex vivo brain sample. Changes in NADH level were assessed to determine changes in the metabolic status of the brain sample in response to oxygen depletion, stimulation with neuro-protective drugs, and other stimuli. During ATP production in aerobic respiration conditions, NADH is oxidized to NAD+. In low oxygen conditions, for example, in areas of hypoxia or ischemia after a stroke, NADH accumulates in cells and persistent oxygen depletion can lead to cell death and breakdown of NADH. The different NADH states and levels may allow for the assessment of the viability and vulnerability of cells in an ischemic environment. Fluctuations in NADH levels were evaluated by measuring the fluorescence emission from NADH and NAD+, both of which absorb strongly in the UV spectrum but have different fluorescence characteristics. NADH fluoresces strongly around about 440 nm and about 460 nm depending on whether it is bound to cytochrome or not. NAD+ is non-fluorescent. The system was configured to detect a spectral band of less than about 452 nm and a spectral band of more than about 452 nm in order to monitor the bound vs. free NADH populations within the brain sample, respectively.

The system comprised a Q-switched ND:YaG laser (Teem Photonics PNVM02510) 1804 running at 1 KHz which emitted laser pulse at a wavelength of about 350 nm and a pulse width of about 400 ps full width half maximum (FWHM). The total energy per laser pulse did not exceed 5 uJ in order to prevent the NADH in the sample from photobleaching. The excitation light was delivered to the tissue 1801 using a custom-made trifurcated optical probe 1800. The probe 1800 comprised a central 600 um fiber 1805 to deliver the excitation light surrounded by twelve 200 um fibers to collect the responsive fluorescence signal. Every other of the twelve collection fibers were bundled together, thus forming two bundles 1806a, 1806b of six fibers each. One bundle of collection fibers 1806a was coupled to a spectrometer (Ocean Optics, Maya) which monitored the fluorescence spectrum every 100 ms. The other bundle of collection fibers 1806b was coupled to a demultiplexer 1808 via a collimator lens 1813. The demultiplexer 1808 comprised a long pass filter 1809 to filter out light below about 370 nm. The filtered light was then split by a beam splitter 1810 at a wavelength of about 452 nm to generate a spectral band 1811a of less than about 452 nm (e.g. bound NADH) and a spectral band 1811b of more than about 452 nm (e.g. free NADH). The spectral bands 1811a, 1811b were then collected with by a set of collimators 1812, one per spectral band, and fed into optical delay fibers of different lengths in order to generate time-delayed spectral bands as described herein. The time-delayed spectral bands were recorded by both an MCP-PMT and the spectrometer.

A rabbit brain was collected and transported in a cold, oxygen-rich Kreb-Ringer solution 1802 to the laboratory. The cortex 1801 was separated out and placed in Kreb-Ringer solution 1802 with continuous bubbling 1803 of 95% 02 and 5% $CO_2$ to maintain tissue viability. The probe 1800 was adjusted on the tissue 1801 to record the fluorescence signal using the methods described herein. Bound and free NADH baseline signals were recorded until the fluorescence from the tissue sample 1801 equilibrated and plateaued to a steady-state. After approximately 30 minutes, a measured dose of 50 nM rotenone was added 1820 to the Kreb-Ringer bath. Rotenone blocks the binding of NADH to cytochrome in the mitochondria. Additional doses 1822, 1824 of rotenone (at 1 uM and 50 uM, respectively) were added at 10 minute intervals thereafter.

FIG. 18B shows results of an experiment with continuous monitoring of NADH in an ex vivo brain sample. The concentrations of both free and bound NADH were mapped in near real-time (about every 100 ms) in response to added stimuli over a period of about two hours. Addition 1820 of the 50 nM rotenone increased NADH levels as expected due to the blocking of NADH consumption leading to accumulation of NADH. Increasing concentrations of rotenone 1822, 1824 similarly lead to further increases in fluorescence detected. The gas was stopped 1826 at about 65 minutes causing the NADH levels to rise in response to hypoxia until the gas was restarted 1828 about 20 minutes later.

Figure 19A:
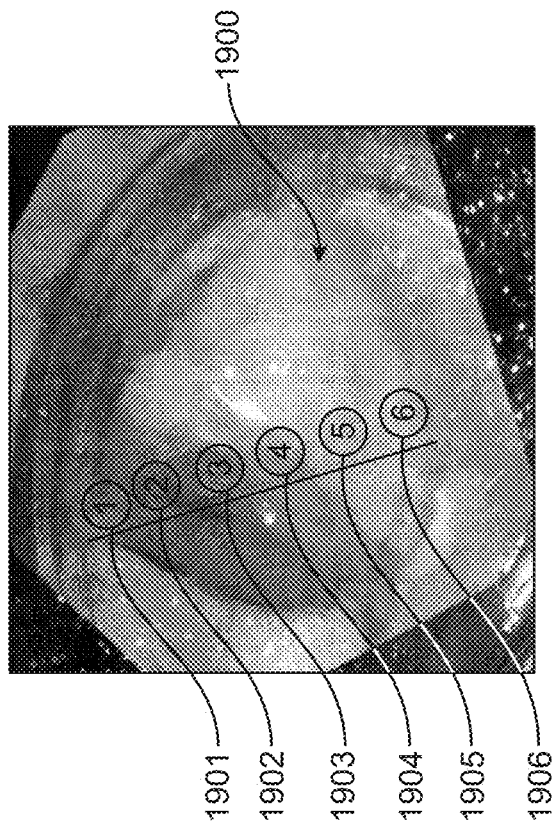
FIG. 19A shows a perspective view image of sample locations in an ex vivo brain measured for NADH levels and characterized for cell viability after a stroke, in accordance with embodiments.

FIG. 19A shows sample locations in an ex vivo brain measured for NADH levels and characterized for cell viability after a stroke. In addition to real-time or near real-time monitoring of NADH level changes and metabolic state, the systems, devices, and methods herein may be used to characterize tissue as viable or non-viable after ischemic injury. NADH levels may be changed by changed in brain tissue after ischemic stroke and assessment of NADH across a region of the tissue may allow for the assessment of the number of viable cells that may be in shock due to lack of apoptosis but have not yet undergone apoptosis. Such cells may be salvaged and the knowledge of the extent of damage across a tissue may be used to inform treatment. In brain tissue which has undergone ischemic stroke, there are two major zones of injury—the core ischemic zone which is typically necrotic tissue and the ischemic penumbra which contains ischemic but still viable tissue. One goal of treatment may be to reduce the size of the penumbra while salvaging as many neurons as possible. Monitoring of NADH over the entire penumbra region may allow for the assessment of the effectiveness of various therapeutic interventions. Such monitoring may be done over the entire penumbra region using the systems, methods, or device described herein. Alternatively or in combination, such monitoring may be done at discrete locations of interest in the penumbra region, indicated as 1-6, as shown in FIG. 19A, using the system described in FIG. 18A.

Figure 19B:
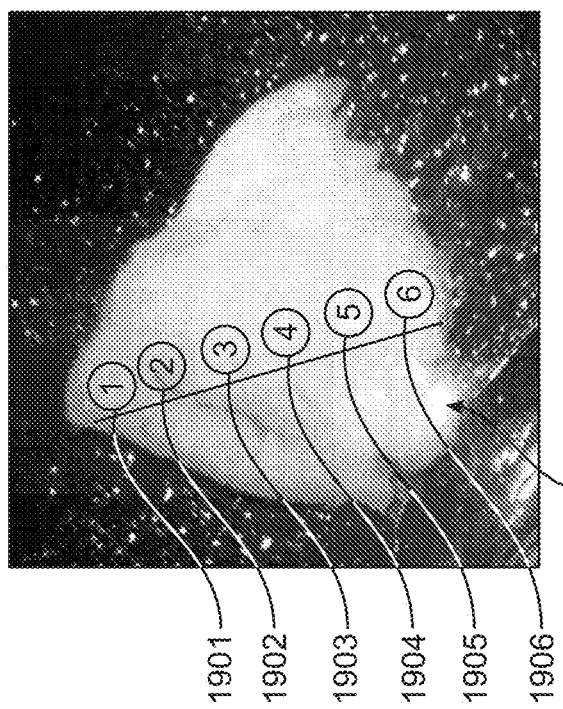
FIG. 19B shows a perspective view image of an overlay of FIG. 19A and a bright field image of the brain after treatment with TTC, in accordance with embodiments.
Figure 19C:
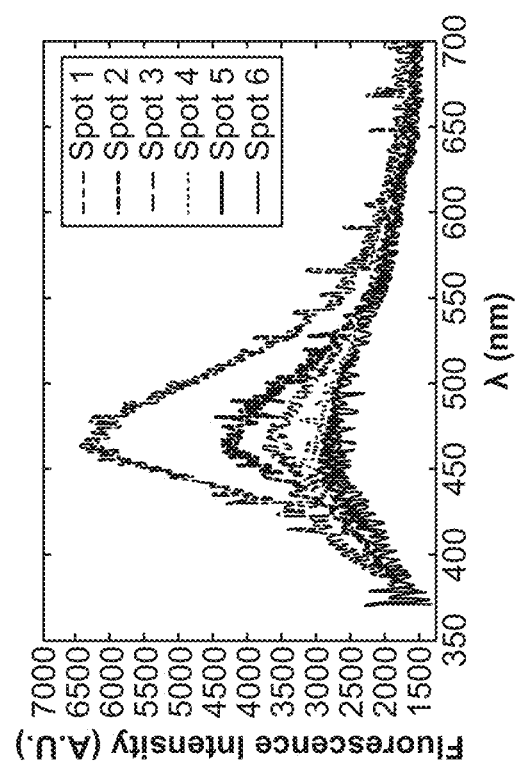
FIG. 19C shows a chart of the relative fluorescence intensities for each sample location measured in FIG. 19A, in accordance with embodiments.

A rabbit brain stroke model was used in which stroke was induced in the brain by injecting a clot in the cerebral artery prior. The rabbit was tested for neurological damage and sacrificed after confirmation of damage. The rabbit brain was collected and transported in a cold, oxygen-rich Kreb-Ringer solution to the laboratory. The infarcted cortex 1900 was separated out and placed in Kreb-Ringer solution with continuous bubbling of 95% 02 and 5% $CO_2$ to maintain tissue viability. The probe was adjusted on the tissue to record the NADH fluorescence signal using the methods described herein. A first reading of the fluorescence intensity was taken at location 1901, at the edge of cortex, and then the probe was moved over the surface to take a second reading at location 1902, and so on until the sixth reading at location 1906. The tissue was then submerged in a solution of TTC (2,3,5-triphenyl tetrazolium) when turned the viable cells red. TTC is a gold standard for testing the viability of cells and was used to confirm the fluorescence intensity-based viability characterization. FIG. 19B shows an overlay of FIG. 19A and a brightfield image of the cortex 1900 after treatment with TTC. FIG. 19C shows the relative fluorescence intensities for each sample location 1901-1906 measured. While TTC uptake showed an abrupt change between viable and non-viable tissue, the fluorescence intensity data showed a smooth gradient of NADH autofluorescence decreasing from the healthy tissue (location 1901) to the dead tissue (location 1906), indicating the presence of viable cells in what TTC would have determined to be dead. The fluorescence intensity data was therefore able to detect viable cells in unhealthy tissue which TTC missed. Such sensitive measurements could be used to better inform treatment decisions than current methods when salvaging viable cells is of interest.

Figure 20A:
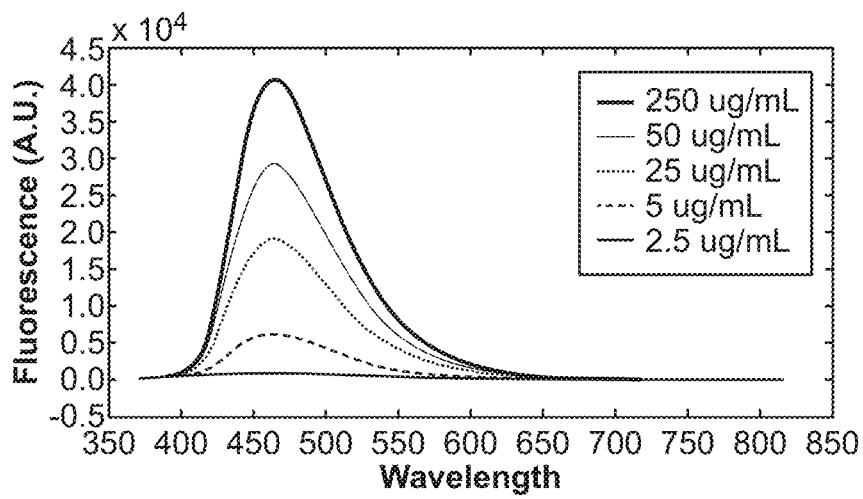
FIG. 20A shows a chart of the fluorescence intensity of varying concentrations of MTX after exposure to light for 20 minutes, in accordance with embodiments.
Figure 20B:
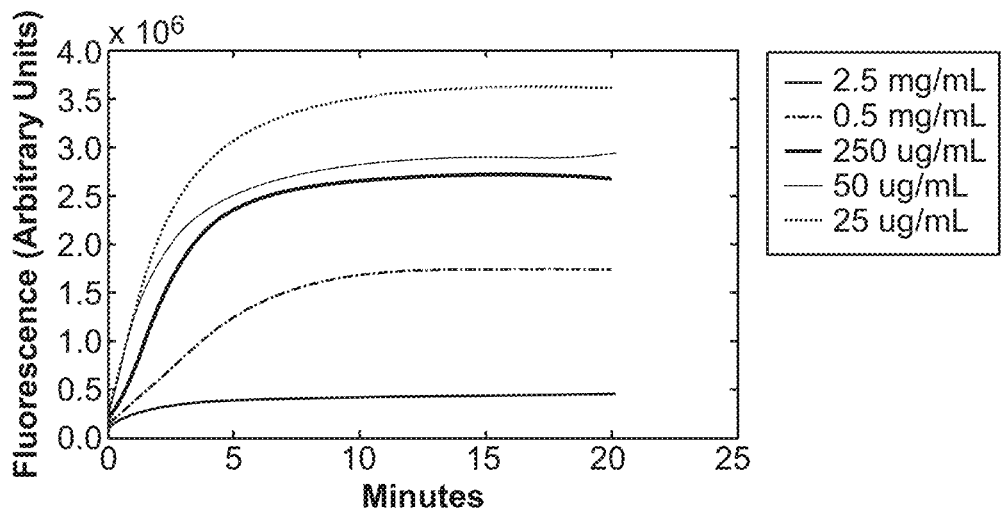
FIG. 20B shows a chart of the fluorescence intensity time course of varying concentrations of MTX over a period of 20 minutes of exposure to light, in accordance with embodiments.
Figure 20C:
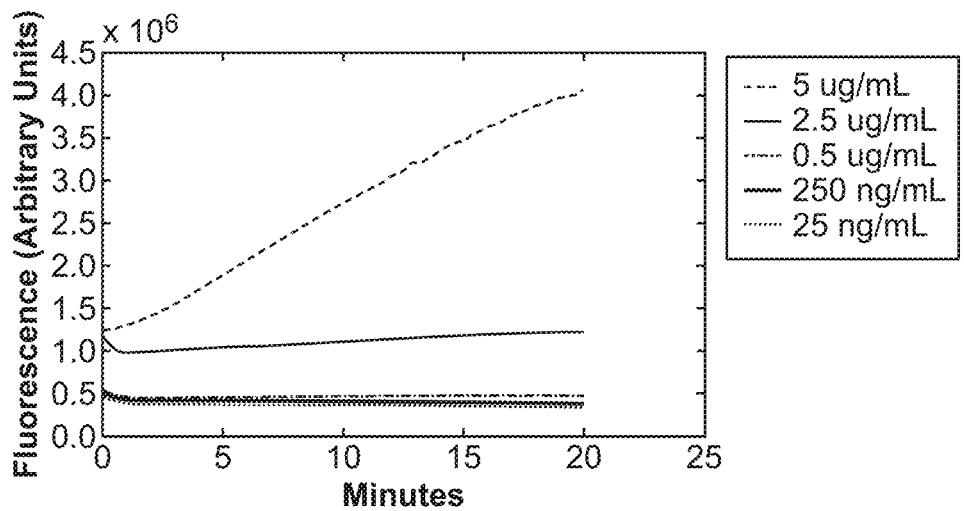
FIG. 20C shows a chart of the fluorescence intensity time-course of varying concentrations of MTX over a period of 20 minutes of exposure to light, in accordance with embodiments.

FIGS. 20A-20C show the fluorescence intensity of varying concentrations of MTX after exposure to light for 20 minutes. Many anti-cancer drugs have a therapeutic window (e.g. range of tissue or plasma concentrations) in which they are most efficacious. Outside of that range, the drugs may be toxic to healthy tissue at high concentrations and/or lose efficacy at low concentrations. Drug concentrations in the plasma, tumor tissue, or health tissue may vary for a given dose due to variations in height, weight, metabolism, and ethnicity between patients. In spite of these known contributors to variations in drug concentration, drug dosages are currently calculated based on the weight of the patient and a standardized pharmacokinetic profile of the drug. The systems, devices, and methods described herein may be used to quickly and inexpensively determine drug levels or concentrations in the plasma and/or tissue of interest in order to allow for optimization of dosages on a patient by patient basis. In addition to determining concentration, the distribution of a drug may be assessed in a tissue of interest in order to determine if and how well the drug is reaching the tissue. The drugs may be fluorescent or otherwise responsive to optical excitation. The drugs may be fluorescently-labeled in order to facilitate characterization using the methods, systems, and devices described herein.

Methotrexate (MTX), for example, is an anti-cancer drug which converts into a fluorescent form when stimulated by UV light. Serial dilutions of MTX from 25 ug to 25 ng were prepared in agar and exposed to UV light for 20 minutes. The conversion from the low fluorescent MTX form to the fluorescent MTX form was allowed to take place until a saturation level was reached (about 20 minutes). The agar gels were monitored for fluorescence intensity and the accumulation of fluorescent MTX was measured over the exposure time using the device of FIG. 18A. FIG. 20A shows the final intensity reach for MTX concentrations of 250 ug/ml, 50 ug/ml, 25 ug/ml, 5 ug/ml, and 2.5 ug/ml after 20 minutes. FIG. 20B shows the fluorescence intensity time course of 2.5 mg/ml, 0.5 mg/ml, 250 ug/ml, 50 ug/ml, and 25 ug/ml MTX over the 20 minute time period. FIG. 20C shows the fluorescence intensity time-course of 5 ug/ml, 2.5 ug/ml, 0.5 ug/ml, 250 ng/ml, and 25 ng/ml MTX over the 20 time period. The fluorescence intensity of MTX after 20 minutes exposure to UV light was a good indicator of the concentration of MTX in the agar gel.

Figure 21C:
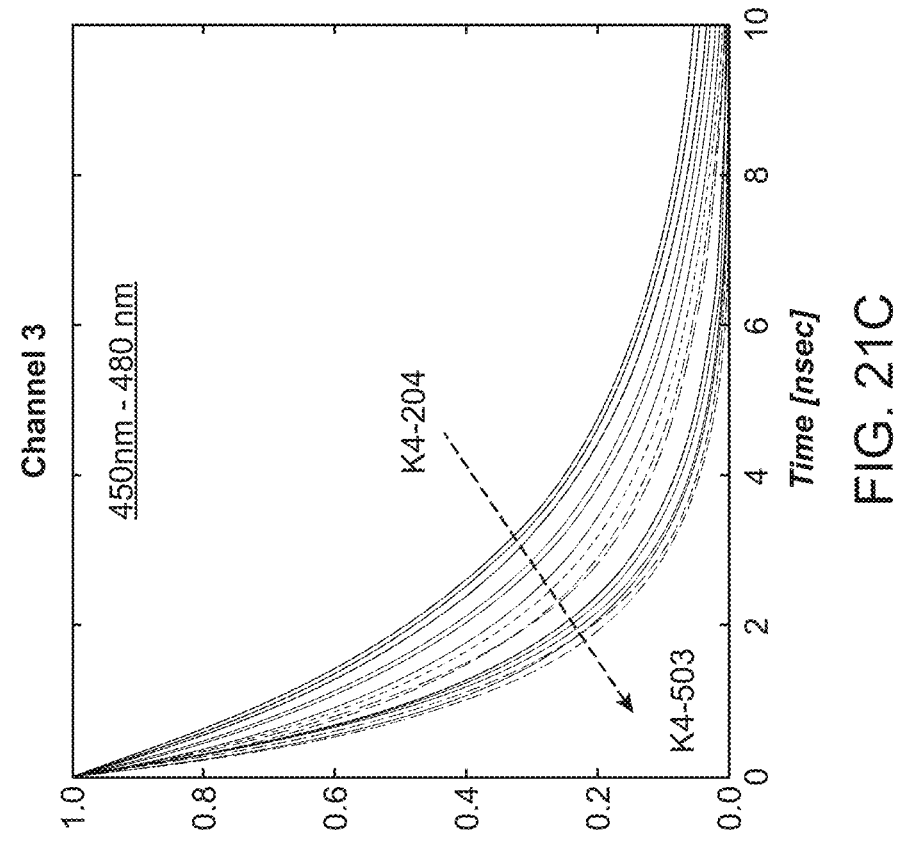
FIG. 21C shows a chart of the fluorescence decay profiles of varying concentrations of K4-204 mixed with K4-503, in accordance with embodiments.
Figure 21A:
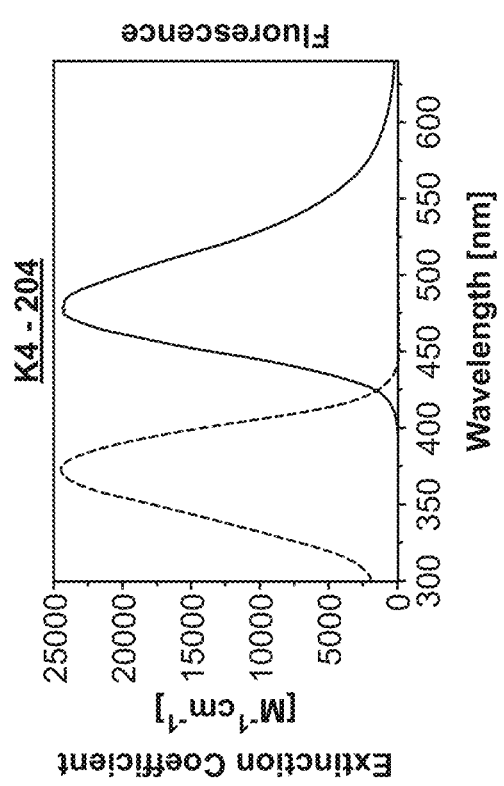
FIG. 21A shows a chart of a diagram of a K4-204 fluorescence emission spectrum, in accordance with embodiments.
Figure 21B:
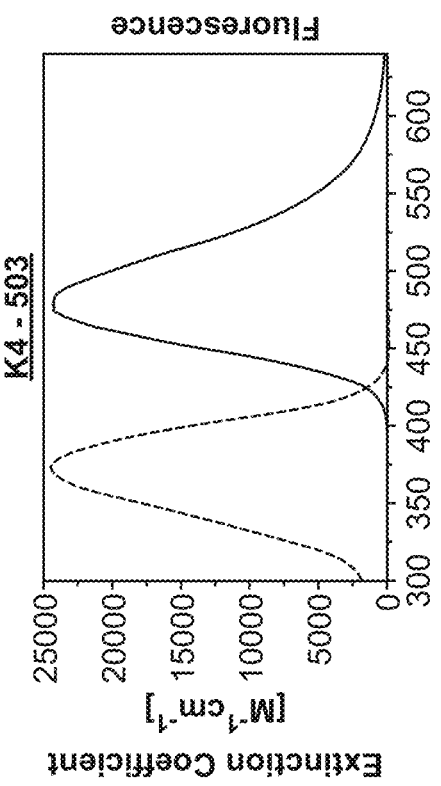
FIG. 21B shows a chart of a diagram of a K4-503 fluorescence emission spectrum, in accordance with embodiments.

FIGS. 21A-21C show charts illustrating that the fluorescence decay of a biological sample may be used to determine the concentration of known fluorophores. FIGS. 21A and 21B show the extinction coefficient (dashed lines) and fluorescence (solid lines) over a range of wavelengths for K4-201 and K4-503, respectively, when excited by UV light. K4-204 and K4-503 have very similar fluorescence emission spectra when excited by UV light, as shown in FIG. 21A and FIG. 21B respectively. Using the experimental system described in FIG. 18A, solutions of varying concentrations of K4-204 and K4-503 were excited with UV light and the responsive fluorescence decay signals were recorded. The concentrations analyzed are shown in Table 1.

Table 1 shows the concentrations of the K4-204 and K4-503 mixes assessed.

TABLE 1

| K4-204 | K4-503 |
|---|---|
| 0% | 100% |
| 10% | 90% |
| 20% | 80% |
| 30% | 70% |
| 40% | 60% |
| 50% | 50% |
| 60% | 40% |
| 70% | 30% |
| 80% | 20% |
| 90% | 10% |
| 100% | 0% |

FIG. 21C shows a chart of the fluorescence decay profiles of the varying concentrations of K4-204 mixed with K4-503, from 100% K4-204 to 100% K4-503 in the direction of the dashed arrow. The fluorescence decay profiles were distinct for each of the various mix concentrations. These data may thus be used as standards to determine the concentration of an unknown mix of K4-204 and K4-503.

Similar dosing or mixing experiments may be used to determine the fluorescence profiles of other fluorophore mixes of interest, for example, to aid in the characterization of complex biological samples.

FIGS. 22A-22D show charts of results from a classification training of a time-resolved spectroscopy system for the detection of brain tumors. The altered metabolic state seen in many brain tumors may cause changes in the fluorescence emission of endogenous fluorescent molecules including amino acids like tyrosine and tryptophan, structural proteins light collagen and elastin, and/or enzyme cofactors like NADH and FAD, among others. Some of the most common fluorophores in the brain include NADH, FAD, lipopigments, and porphyrins. Most endogenous fluorophores are excited by light in a range of about 280 nm to about 450 nm. Excitation of brain tissue with UV radiation may be used to characterize the tissue as tumor or normal, and potentially further characterize the tumor by grade and severity, based on the differing spectral decay and spectral intensity properties of the tissue types. In general, tumors have lower fluorescence emission compared to normal tissue when excited with UV light.

Figure 22A:
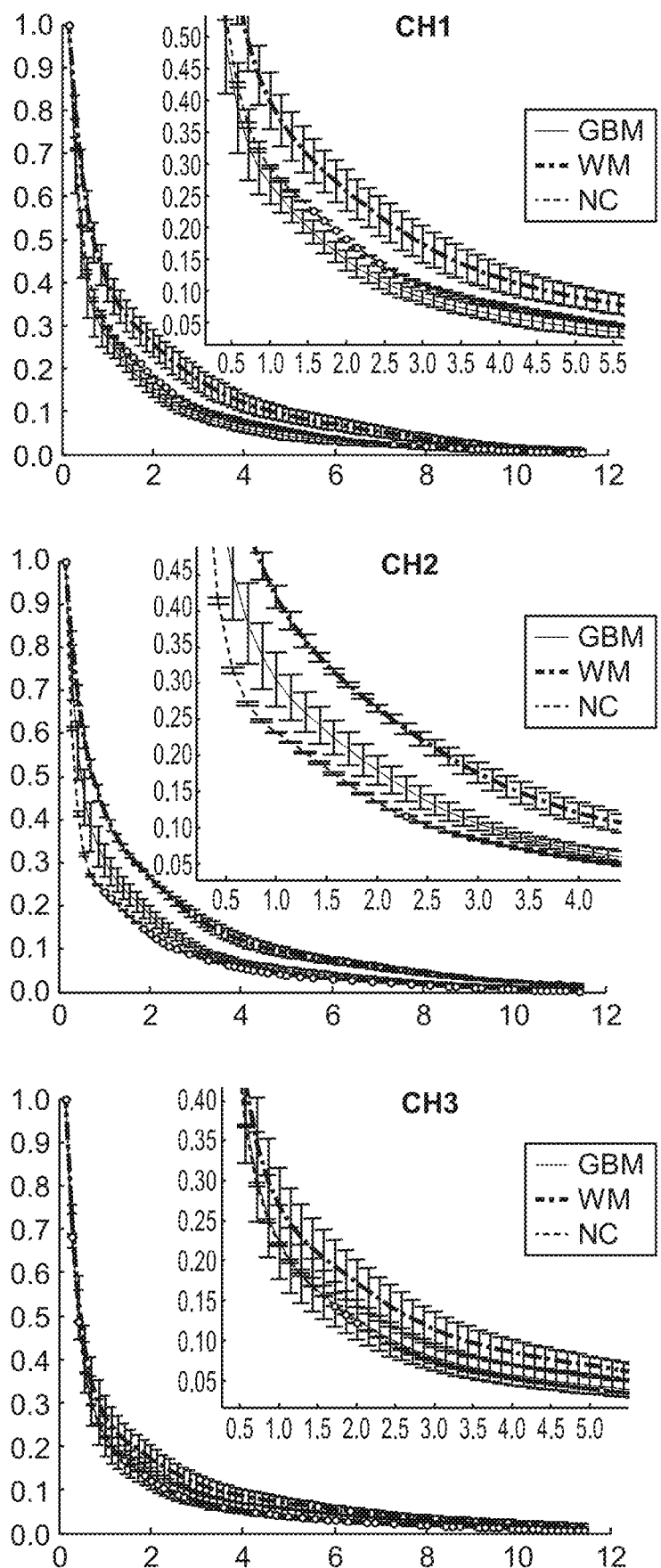
FIG. 22A shows a chart of the fluorescence decay profiles of normal cortex, white matter, and glioblastoma (GBM) tissues using six channel time-resolved fluorescence spectroscopy, in accordance with embodiments.

FIG. 22A shows the fluorescence decay profiles of normal cortex (NC), white matter (WM), and glioblastoma (GBM) tissues using six channel time-resolved fluorescence spectroscopy. Each channel comprises a spectral band as shown in FIG. 4 which was split from the responsive optical signal as described herein using system comprising a demultiplexer substantially similar to that of FIG. 2. For each channel, the entire fluorescence decay profile as well as a blown-up inset of a portion of the decay is shown. Brain tissue samples were excited with UV light at about 355 nm and the decay of the tissue responsive autofluorescence signal was recorded. Experiments were done using a time-resolved spectroscopy system configured to collect six spectral bands. The system comprised a Q-switched ND:YaG laser (Teem Photonics PNVM02510) running at 1 KHz which emitted laser pulse at a wavelength of about 350 nm and a pulse width of about 400 ps FWHM. The energy output of the light pulse was adjusted to 5 uJ. The excitation light was delivered to the tissue using a custom-made sterilizable trifurcated optical probe. The probe was flexible throughout its entire length (about 3 meters) except for a 7 cm distal part made of rigid stainless steel tubing which facilitated mounting and micro-manipulation of the probe. A spacer with two slits on opposite sides was added in front of the distal end of the probe to allow the probe to contact the tissue while maintaining a fixed distance of about 3 mm from the tissue in order to improve light collection and steady the probe. The dual slits on the space enabled the surgeon to apply a suction tube and maintain a clear field of view. The probe comprised a central 600 um excitation fiber to deliver the excitation light surrounded by twelve 200 um collection fibers to collect the responsive fluorescence signal. The laser light was coupled into the excitation fiber of the probe with a standard SMA connector. The twelve collection fibers were bundled together and combined into a single 600 um fiber. The center-to-center separation between the excitation and collection fibers was 480 um. The distal end of the collection fibers formed a straight line in order to facilitate coupling to the demultiplexer. The collection fibers were beveled at a 10° angle in order to increase the overlap between excitation and collection for small tissue-to-probe distances. The collection fibers were coupled to a demultiplexer which split the responsive optical signal into seven spectral bands (including a band comprising the emission wavelength) as described herein. The spectral bands were then collected with by a set of collimators, one per spectral band, and fed into optical delay fibers of different lengths in order to generate time-delayed spectral bands as described herein. The optical delay fibers were configured to have lengths in increments of 50 feet starting at about 5 feet for the first fiber. The time-delayed spectral bands were recorded by a MCP-PMT (Photek model 210, rise time 80 ps). The recorded data was amplified by a fast preamplifier (Photek model PA200-10, 2 GHz) before being digitized by a digitizer (SPDevices ADQ-108, 8 Giga-samples/second) and transmitted to a computer processor. The system was controlled using timing and synchronization circuitry as described herein. The system was configured such that it was contained in a standard-size endoscopic cart. The system components were shielded from the main power supply using a medical grade Isolation transformer (Toroid® ISB-170A) to ensure low electronic noise. The overall time resolution of the system was approximately 150 ps.

The system was trained to classify unknown samples as either normal cortex, white matter, or GBM following a series of classification training samples of known disease state (as determined by histology). The training samples were taken from nine patients undergoing surgical resection of GBM. UV light was delivered to the tumor site using a custom-made fiber optic probe substantially similar to the probe described in FIG. 6. The probe was positioned above the areas of interest and the brain tissue was spectroscopically interrogated. A biopsy was performed at the site and histopathological analysis was performed to confirm the diagnosis and validate the classification results. The training samples comprised 10 normal cortex samples, 12 white matter samples, and 13 GBM samples. FIG. 22A shows the average fluorescence decay curve of each sample type.

The calculated fluorescence decay function in the different measured wavelengths may comprise different fluorescence components when characterizing an unknown sample. Each component may have a mono-exponential, bi-exponential, or multi-exponential decay function. In order to classify a complex tissue as tumor or normal, the conventional fluorescence lifetime scalar values may be insufficient. To address this, the decay functions in different wavelength ranges (i.e. for different spectral bands) may be transformed to a two-dimensional Specto-Lifetime Matrix (SLM) with m×n dimensions, where m is the number of spectral bands used in the measurements and n is the number of decay points used. For example, m may be six when six spectral bands are assessed and n may be three where the different decay points cover fast, average, and slow decay responses. The SLM may be extracted for each responsive optical signal and used as an input to a classification algorithm.

Figure 22B:
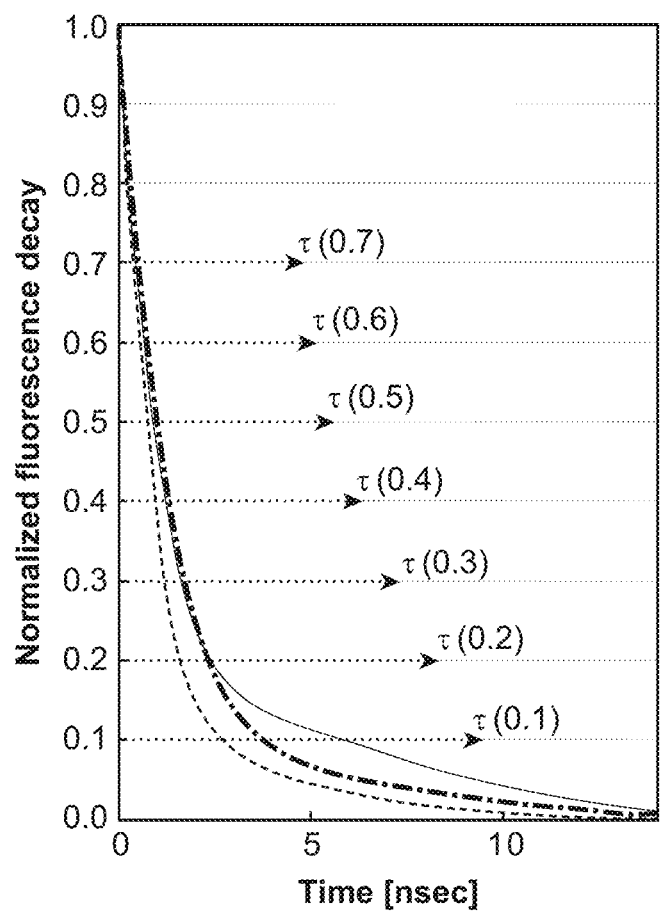
FIG. 22B shows a chart of parameter extraction from a fluorescence decay profile, in accordance with embodiments.
Figure 22C:
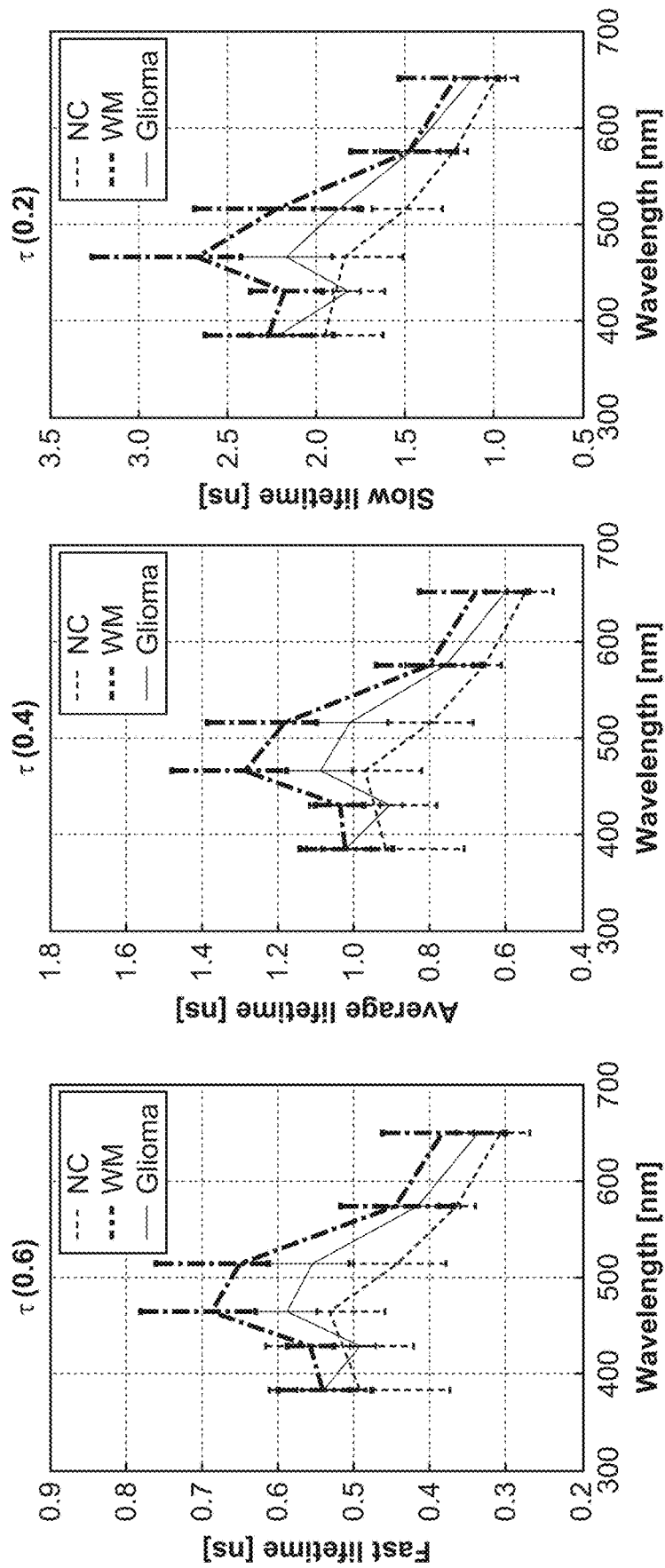
FIG. 22C shows a chart of parameters extracted from fluorescence decay profiles of a classification set of tissue samples, in accordance with embodiments.

For the training samples, a series of parameters $\tau(0.1)$-$\tau(0.7)$ were determined from the detected spectral band decay data for each detection channel. FIG. 22B shows a schematic of parameter extraction from a representative fluorescence decay profile. The decay was assessed for each spectral band using Laguerre deconvolution. The parameters $\tau(0.1)$-$\tau(0.7)$ were determined for each spectral band of each sample and used to accurately define the fast, normal, and slow components of the fluorescence decay instead of using a full fluorescence decay curve for characterization. Three lifetime values $\tau(0.2)$, $\tau(0.4)$, and $\tau(0.6)$ were extracted from the decay points by crossing the normalized fIRF at 0.2, 0.4, and 0.6 intensity levels, respectively, and used as an input to the a classification algorithm as representative of slow, normal, and fast decay, respectively. FIG. 22C shows the lifetime parameters extracted from the training samples at each channel. Error bars contain the mean and standard deviation of lifetime values in the six spectral bands. Normal cortex exhibited a faster decay than either white matter or GBM.

FIG. 22D shows how the extracted parameters were used to distinguish between tissue types in the training samples in order to create a classification algorithm. The system generated spectroscopic lifetime (decay) information of the tissue samples which were used as a signature by a machine training algorithm for tissue classification. Linear discriminant analysis (LDA) with a three-group classifier set was used to analyze the fluorescence decay in the six spectral bands collected to maximize the difference in statistical significance between training groups, with the output being sent to either of the training groups. The NC classifier, for example, grouped WM and GBM measurements in the "Not NC" group. The same process was employed for the WM and GBM groups, where "Not WM" comprised NC and GBM and "Not GBM" comprised WM and NC, respectively. These subclassifiers were able to discriminate between training groups and classify the training samples as normal cortex, white matter, or GBM.

Table 2 shows the classification accuracy of the training samples. 46 tissue samples from 5 patients were classified as NC (n=25), WM (n=12), or GBM (n=9) using time-resolved spectroscopy and confirmed using by histopathology. The classification was accurate for nearly every sample, with only 1 false negative.

TABLE 2

| Tissue type | NC | WM | GBM |
| --- | --- | --- | --- |
| NC classifier | TP = 25<br>FN = 0 | TN = 12<br>FP = 0 | TN = 9<br>FP = 0 |
| WM classifier | TN = 25<br>FP = 0 | TP = 11<br>FN = 1 (?) | TN = 9<br>FP = 0 |
| GBM classifier | TN = 25<br>FP = 0 | TN = 12<br>FP = 0 | TP = 9<br>FN = 0 |

FIGS. 23-26 show the results of preliminary in vivo tissue characterization and diagnosis experiments. Experiments were done using the time-resolved spectroscopy system as trained in FIGS. 22A-22D. For each experimental location, the surgeon was asked for an initial diagnosis. The fiber optic probe was then positioned 3 mm above the exposed brain tissue of the patient at the experimental location and time-resolved spectroscopic data was collected as described herein. The sample data was classified as in FIGS. 22A-22D as WM/Not-WM, NC/Not-NC, or GM/Not-GBM using the classification coefficients (e.g. classifiers) generated by the training set in order to characterize the tissue. The classification data for the sample was then plotted next to the training set in order to visualize the tissue characterization. The sample data is shown with a dashed circle around it in order to distinguish it from the training data points. After spectroscopic analysis, the tissue was biopsied at the experimental and histopathologically analyzed. The system was used to characterize the tissue as NC, WM, or GBM based on the training classifiers determined in FIGS. 22A-22D.

Figure 23:
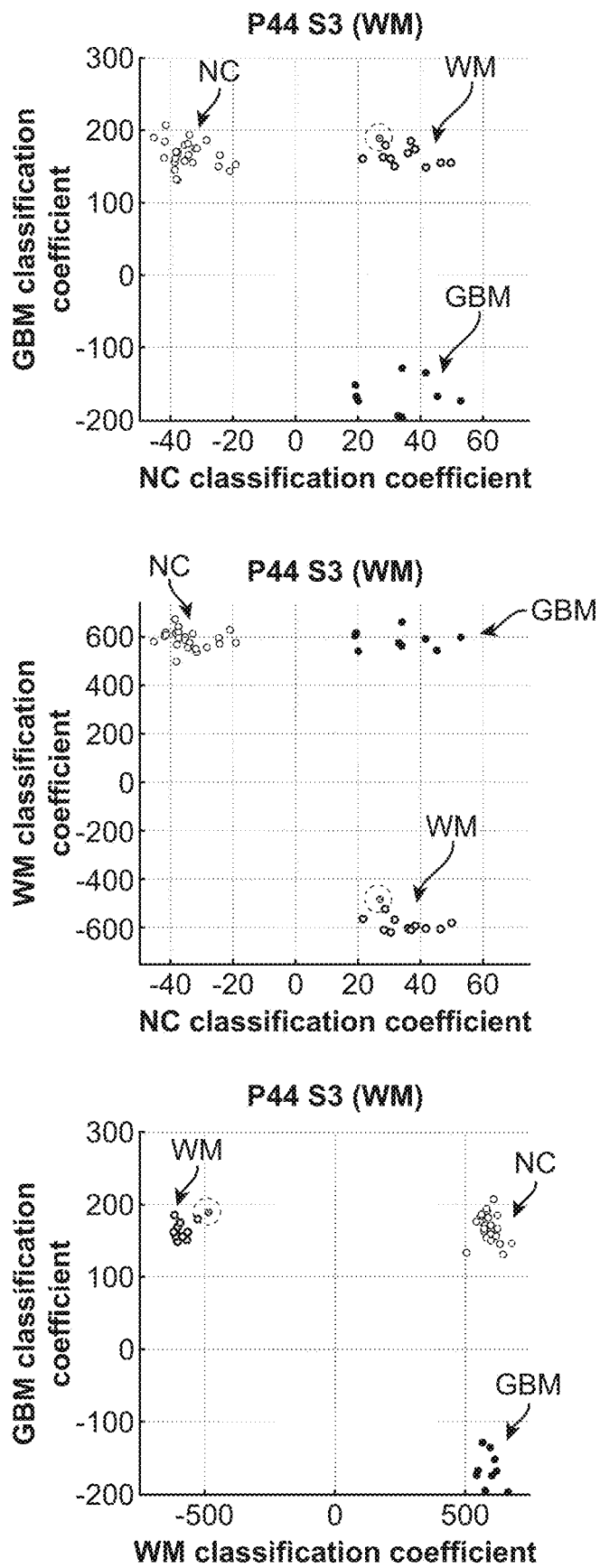
FIG. 23 shows a chart of the results of tissue characterization in a first brain tumor experiment, in accordance with embodiments.

FIG. 23 shows the results of tissue characterization in brain tumor experiment 1. The surgeon initially diagnosed the tissue location as tumor. Histological analysis of the biopsied sample location revealed that the area was normal cortex tissue. The patient was spectroscopically assessed as previously described and the time-resolved classification characterized the location as normal white matter (WM) with very high confidence.

Figure 24:
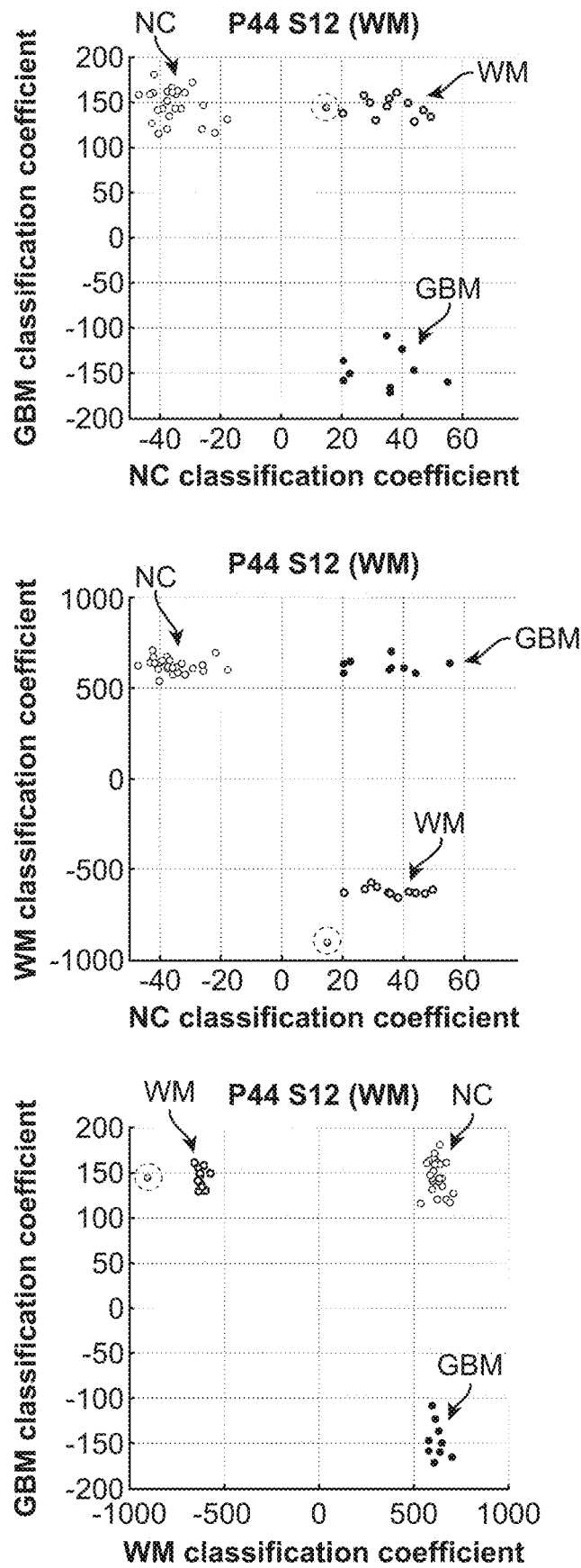
FIG. 24 shows a chart of the results of tissue characterization in a second brain tumor experiment, in accordance with embodiments.

FIG. 24 shows the results of tissue characterization in brain tumor experiment 2. The surgeon initially diagnosed the tissue location as tumor. Neuronavigation also showed that the location was tumor. Histological analysis of the biopsied sample location revealed that the area was normal white matter. Spectroscopic analysis and time-resolve classification characterized the location as normal WM with very high confidence.

FIG. 25 shows the results of tissue characterization in brain tumor experiment 3. The surgeon initially diagnosed the tissue location as being something other than GBM, though not completely normal, having identified some gliotic changes and necrosis. Histological analysis of the biopsied sample location revealed that the area was GBM. Spectroscopic analysis and the time-resolved classification characterized the location as GBM with very high confidence.

Figure 26:
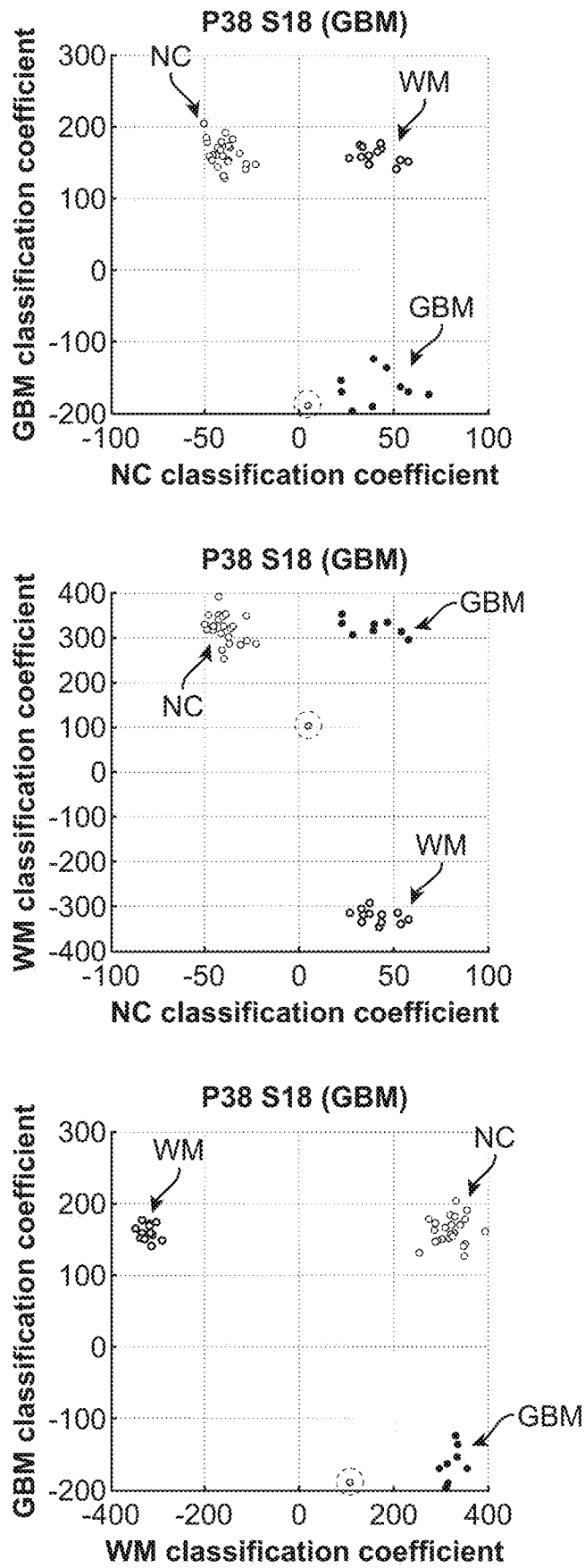
FIG. 26 shows a chart of the results of tissue characterization in a fourth brain tumor experiment, in accordance with embodiments.

FIG. 26 shows the results of tissue characterization in brain tumor experiment 4. The surgeon initially diagnosed the tissue location as tumor. Neuronavigation also showed that the area was GBM. Histological analysis of the biopsied sample location revealed that the area was GBM. Spectroscopic analysis and time-resolve classification characterized the location as GBM with very high confidence.

FIGS. 27-30E show the results of classification training using a five subclassifiers. Ten patients were evaluated at multiple locations, for a total of 75 tissue samples assayed. Experiments were done using a time-resolve spectroscopy system configured to collect six spectral bands. The system was substantially similar to the system for in vivo measurements described herein. The system comprised a Q-switched ND:YaG laser (Teem Photonics PNVM02510) running at 1 KHz which emitted laser pulse at a wavelength of about 355 nm and a pulse width of about 350 ps FWHM. The energy output of the light pulse was adjusted to 5 uJ. The excitation light was delivered to the tissue using a custom-made sterilizable trifurcated optical probe. The probe was flexible throughout its entire length (about 3 meters) except for a 7 cm distal part made of rigid stainless steel tubing which facilitated mounting and micro-manipulation of the probe. A spacer with two slits on opposite sides was added in front of the distal end of the probe to allow the probe to contact the tissue while maintaining a fixed distance of about 3 mm from the tissue in order to improve light collection and steady the probe. The dual slits on the space enabled the surgeon to apply a suction tube and maintain a clear field of view. The probe comprised a central 600 um excitation fiber to deliver the excitation light surrounded by twelve 200 um collection fibers to collect the responsive fluorescence signal. The laser light was coupled into the excitation fiber of the probe with a standard SMA connector. The twelve collection fibers were bundled together and combined into a single 600 um fiber. The center-to-center separation between the excitation and collection fibers was 480 um. The distal end of the collection fibers formed a straight line in order to facilitate coupling to the demultiplexer. The collection fibers were beveled at a 10° angle in order to increase the overlap between excitation and collection for small tissue-to-probe distances. The collection fibers were coupled to a demultiplexer which split the responsive optical signal into seven spectral bands (including a band comprising the emission wavelength) as described herein. The spectral bands were then collected with by a set of collimators, one per spectral band, and fed into optical delay fibers of different lengths in order to generate time-delayed spectral bands as described herein. The optical delay fibers were configured to have lengths in increments of 50 feet starting at about 5 feet for the first fiber. The time-delayed spectral bands were recorded by a MCP-PMT (Photek model 210, rise time 80 ps). The recorded data was amplified by a fast preamplifier (Photek model PA200-10, 2 GHz) before being digitized by a digitizer (SPDevices ADQ-108, 7 Giga-samples/second, 8-bit resolution) and transmitted to a computer processor. The system was controlled using timing and synchronization circuitry as described herein. The system was configured such that it was contained in a standard-size endoscopic cart. The system components were shielded from the main power supply using a medical grade Isolation transformer (Toroid® ISB-170A) to ensure low electronic noise. The overall time resolution of the system was approximately 150 ps. The time to record the fluorescence of each sample was about 1 second and the specific tumor classification was determined immediately thereafter.

Analysis of the tissues was initially established to classify three tissue types as described herein—NC, WM, and GBM. However, two distinct subclasses were identified for each of white matter (WM1 and WM2) and glioblastoma (GBM1 and GBM2) based on the tissue fluorescence emission data of the 75 tissue samples. The three tissue types thus represented five classifiers for training of a classification algorithm. The system generated spectroscopic lifetime (decay) information of the tissue samples which were used as a signature by a machine training algorithm for tissue classification. Linear discriminant analysis (LDA) with a five-group classifier set was used to analyze the fluorescence decay in the six spectral bands collected to maximize the difference in statistical significance between training groups, with the output being sent to either of the training groups. The NC classifier, for example, grouped WM1, WM2, GBM1, and GBM2 measurements in the "Not NC" group. The same process was employed for the WM1, WM2, GBM1, and GBM2 groups. For example, "Not WM1" comprised NC, WM2, GBM1, and GBM2. These subclassifiers were able to discriminate between training groups and classify the training samples as normal cortex, WM1, WM2, GBM1, or GBM2.

FIGS. 27A-27F show representative histological images of the features characterizing WM1 vs. WM2 and GBM1 vs. GBM2. Slides were imaged at 20X. The WM1 sample (see FIG. 27A) shows no edema with low cellularity. The neurons are seen to have a nucleolus, with blue-ish cytoplasm. These normal cells 2701 are slightly larger than the tumor cells 2702 which have a "blurred" appearance. Another example of WM1 (see FIG. 27B) shows rare atypical nuclei 2703. The clustered nuclei 2703 are considered abnormal and be a characteristic of a low-grade glioma. WM2 (see FIG. 27C) shows evidence of edema 2704 (characterized by white holes on the slide). GBM1 (see FIG. 27D) shows viable glioma which also contains red stains representing the hemoglobin in blood vessels 2705. The GBM1 sample also shows mitotic figures and cytoplasm. GBM2 (see FIG. 27E) usually contains necrosis 2706, some with the regions of the field being more viable, while the majority is necrotic. In some cases, GBM2 has both edema and necrosis (see FIG. 27F). The left half of the sample is more viable while right half of the sample is necrotic. A thrombosed blood vessel 2707 near the center may be viable.

A leave-one-out cross-validation method was used to determine the predictive accuracy of the classification algorithm. Linear discriminant analysis (LDA) was used as the supervised classifier for the algorithm. LDA finds the discriminant function line that presents a maximum variance in the data between groups, while minimizing the variance between members of the same set. The leave-one-out classifiers used 75 spectral measurements, including their lifetime components, represented by six spectral bands. One tissue sample was removed from the data set, with the 74 remaining measurements comprised the "training set". The training set data was input into the LDA model, which then calculated a discriminant function line from the results. The data from the remove tissue sample was input into the LDA algorithm and a tissue-type prediction was attained. This process was repeated, with each tissue sample being left out in sequence and one at a time. The prediction of the classification algorithm was compared with the diagnosis obtained from pathological interrogation of a biopsy taken from the tissue sample location (GBM n=19, white matter n=22, normal cortex n=3) or by pre-MRI 3D images registered by a neuronavigation system (normal cortex n=30) in order to assess the algorithm's ability to discriminate between tissue types. The normal cortex training data confirmed by neuronavigation were acquired at locations far from the tumor. The accuracy, sensitivity, specificity, positive predictive value, and negative predictive values were all tested for and analyzed.

To classify each unknown sample, five probability values (PV) were obtained corresponding to each tissue group. For example, the probability value of NC ($PV_{NC}$) was obtained suing four sub-classifiers of binary sets using the linear discriminant model (e.g. NC vs. WM1, NC vs. WM2, NC vs. GBM1, and NC vs. GBM2), which classified unknown data into specific tissue groups and predicted the posterior probability (P) of belonging to each class. Each of the 4 sub-classifiers provided an independent P corresponding to a specific tissue group. The four posterior probabilities of NC (e.g. $P_{(x=NC/vs.\ WM1)}$, $P_{(x=NC/vs.\ WM2)}$, $P_{(x=NC/vs.\ GBM1)}$, $P_{(x=NC/vs.\ GBM2)}$) were averaged to obtain $PV_{NC}$. The same methodology was applied to calculate the PV of the remaining tissue classes ($PV_{WM1}$, $PV_{WM2}$, $PV_{GBM1}$, $PV_{GBM2}$).

Figure 28:
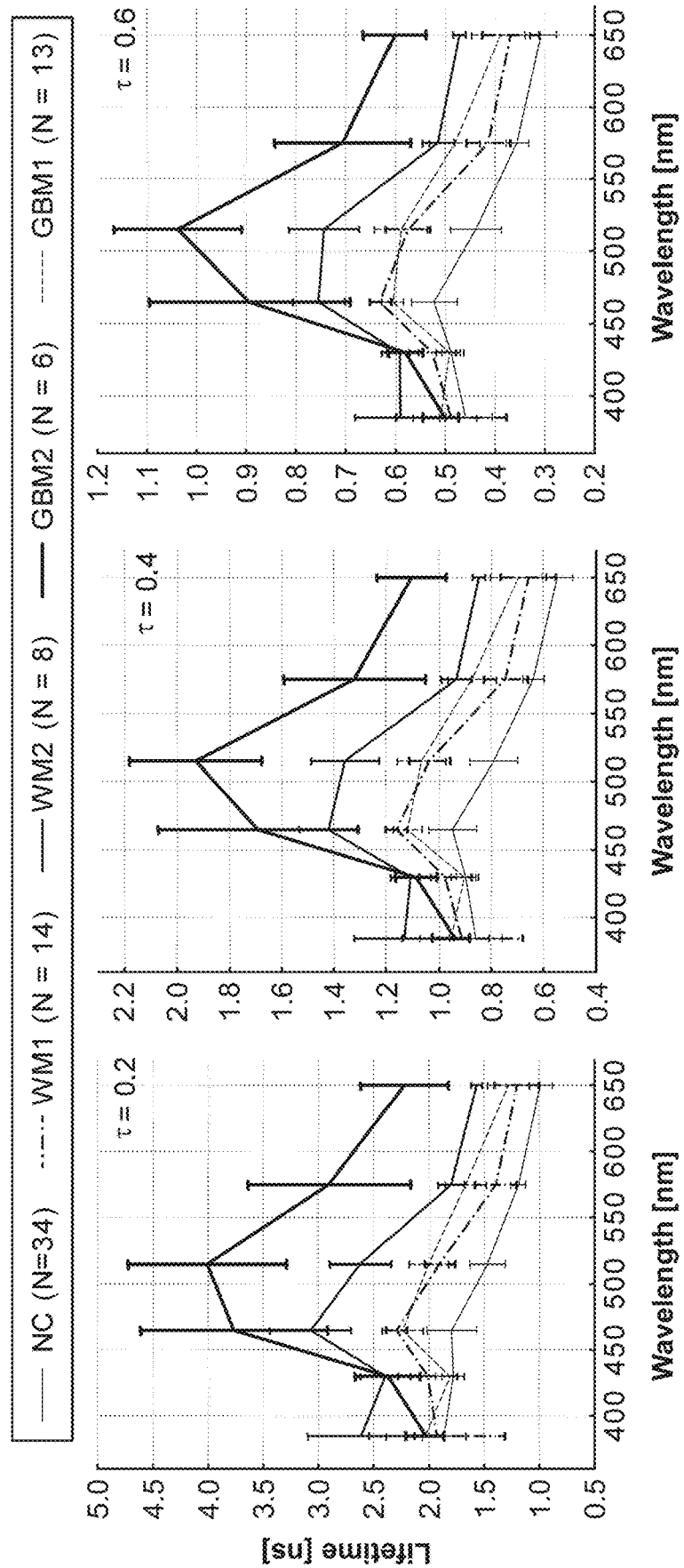
FIG. 28 shows a chart of parameters extracted from fluorescence decay profiles of a classification set of tissue samples, in accordance with embodiments.

Three lifetime values $\tau(0.2)$, $\tau(0.4)$, and $\tau(0.6)$ were extracted from the decay points by crossing the normalized fIRF at 0.2, 0.4, and 0.6 intensity levels, respectively, and used as an input to the a classification algorithm as representative of slow, normal, and fast decay, respectively, as described herein. FIG. 28 shows the lifetime parameters extracted from the training samples at each channel. Error bars contain the mean and standard deviation of lifetime values in the six spectral bands. Normal cortex exhibited a faster decay than either white matter or GBM. Both white matter and glioblastoma lifetimes presented higher standard variation than the normal cortex values. Therefore each of WM and GBM were gathered in two separate sub-sets. The majority of white matter samples with shorter lifetimes (e.g. WM1) contained white matter with no edema or with increased cellularity as shown in FIG. 27A, while the second group with longer lifetimes (e.g. WM2) consisted of white matter with edema as shown in FIG. 27C. The pathologies also confirmed that the glioblastoma group with longer lifetimes (e.g. GBM2) was resultant from a mixture of glioblastoma and necrotic cells, while the glioblastoma group with shorter decay (e.g. GBM1) exhibited less necrosis.

Figure 29A:
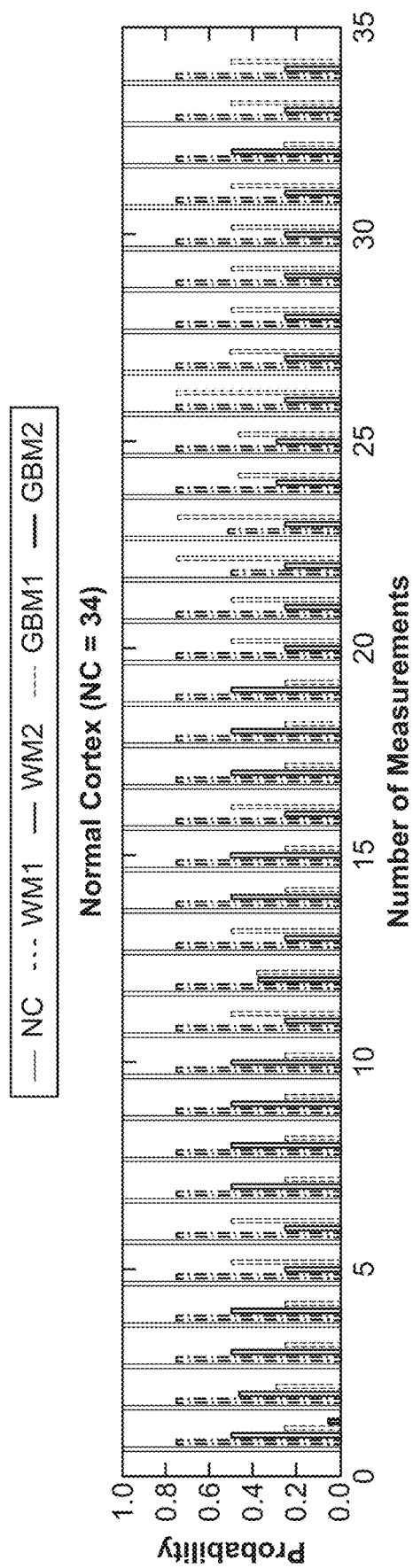
FIG. 29A shows a chart of the classification results of normal cortex tissue, in accordance with embodiments.
Figure 29B:
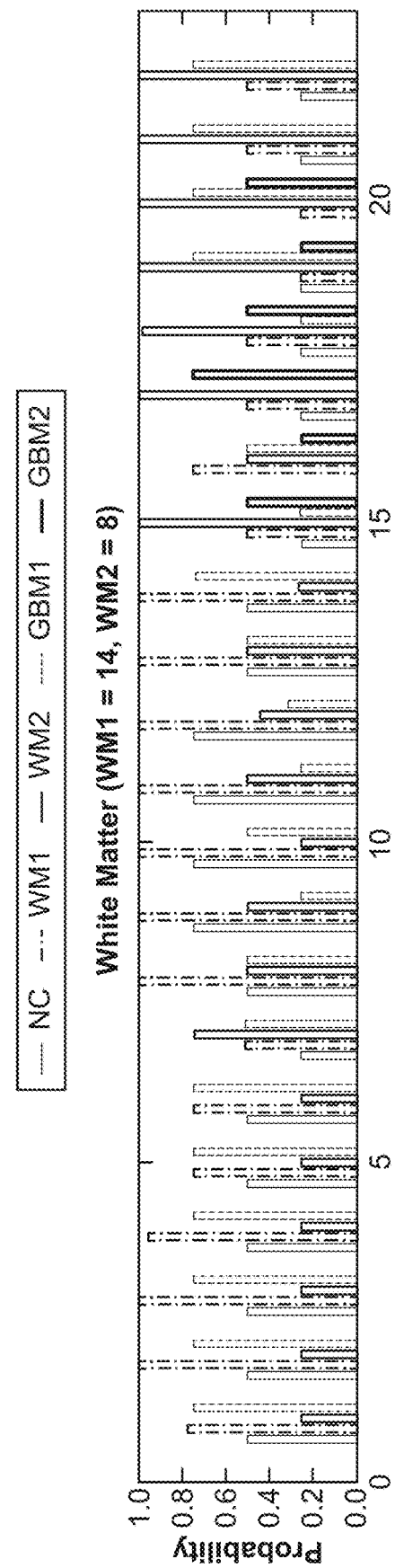
FIG. 29B shows a chart of the classification results of white matter tissue, in accordance with embodiments.
Figure 29C:
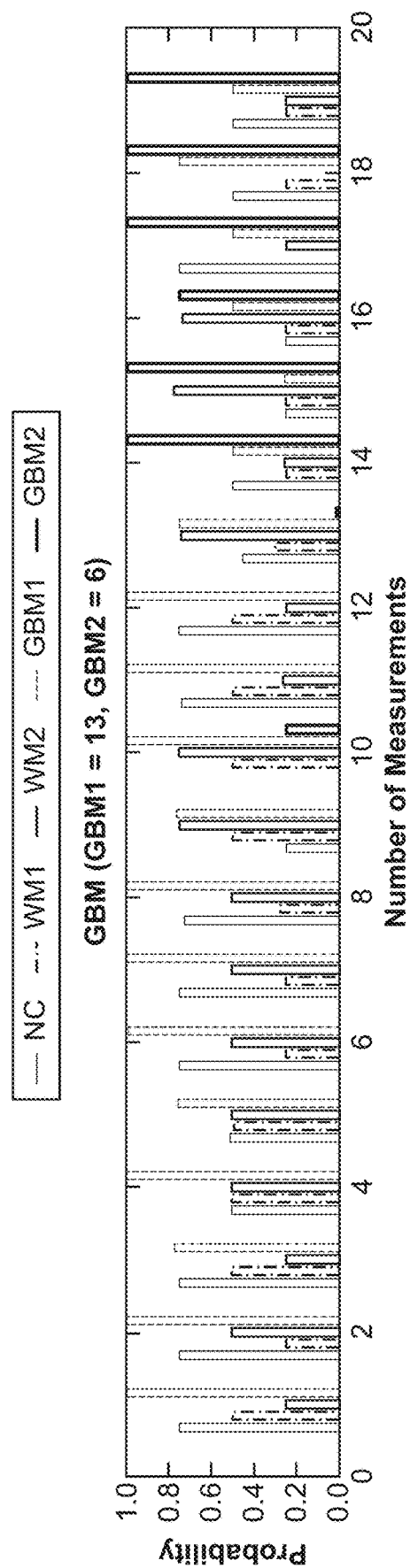
FIG. 29C shows a chart of the classification results of brain tumor tissue, in accordance with embodiments.
Figure 30A:
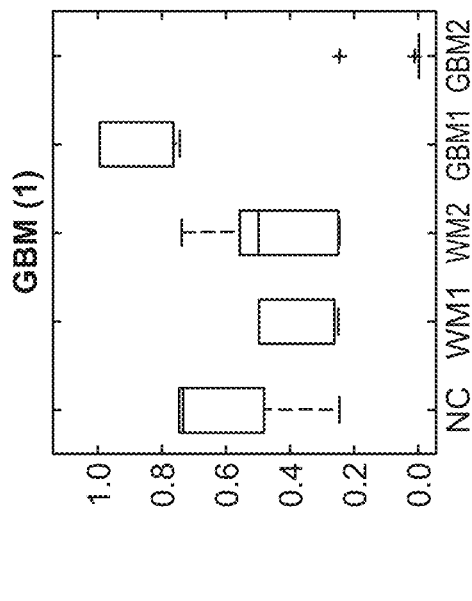
FIGS. 30A-30E show probability box plots of brain tissue classification, in accordance with embodiments.
Figure 30B:
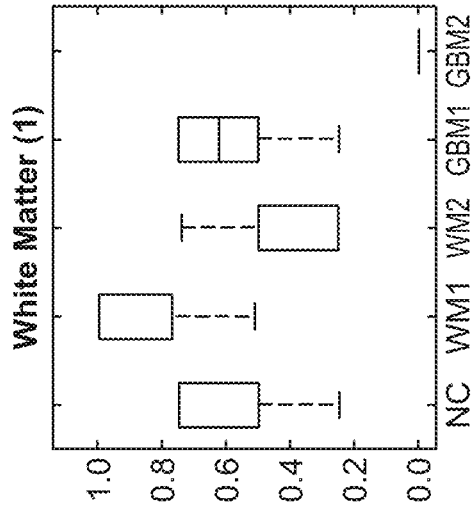
Figure 30C:
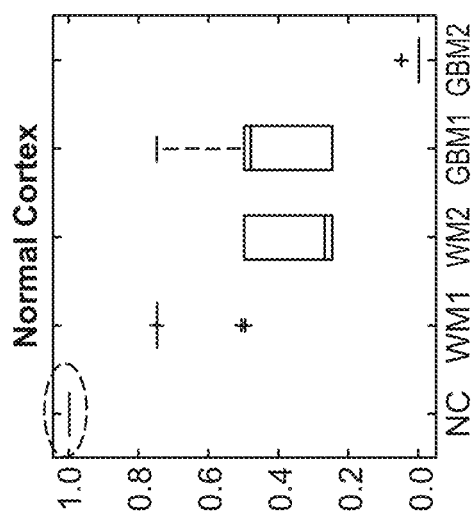
Figure 30D:
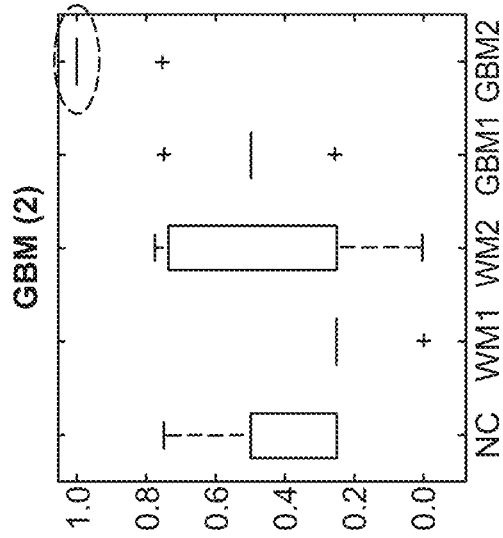
Figure 30E:
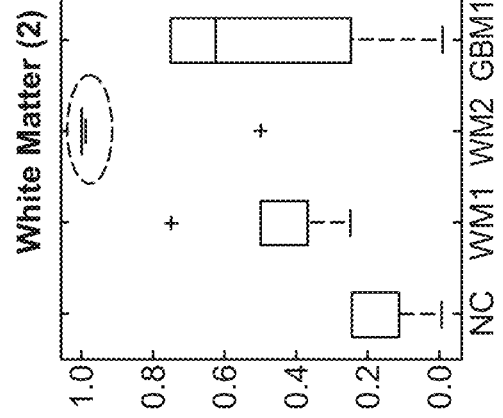

FIGS. 29A-29C show charts of the classification results (e.g. probability bar graphs) of the human brain data collected in vivo for each of the 75 tissue samples. The classification results were grouped by pathological diagnosis for comparison of the predictive accuracy of the classification algorithm. FIG. 29A shows the results of the normal cortex tissue, FIG. 29B shows the results of the white matter tissue, and FIG. 29C shows the results of the GBM tissue. There were 34 normal cortex samples, 14 WM1 samples, 8

WM2 samples, 13 GBM1 samples, and 6 GBM2 samples identified by pathology. Each bar represents an average value from the probability of a specific tissue class compared to the other four tissue type classes. The classification algorithm assigned each unknown sample based on a comparison of the PV calculated as described herein for all tissue classes. An unknown sample was assigned to a definitive tissue class when the PV of the corresponding tissue class had the highest value compared to the values of the other tissue groups. The tissue was classified as "infiltration" when the probabilities of two or more of the tissue types were similar to (or within 5% of) each other. All of the NC samples measured were classified using the leave-one-out method described herein as definitive NC since the probability of NC was nearly 1 in all cases while the second-highest probability was at most 0.75. Differentiation between WM and GBM was more complicated because of the prevalence of GBM growing in the WM areas. For example, WM1 samples 5 and 6 (shown in FIG. 29B) had nearly equal probabilities of being WM1 and GBM1, thus their classifier output was infiltration of WM and GBM.

FIGS. 30A-30E show probability box plots of the brain tissue classification samples of FIGS. 29A-29C. The average probability of the combined samples for each classifier (NC, WM1, WM2, GBM1, and GBM2) was plotted for each tissue type. Normal cortex, WM2, and GBM2 samples were classified with very high probability and low variation, as indicated by the probability values of nearly 1 (indicated by dashed ovals) for each of the tissue types. WM1 and GBM1 samples exhibited higher variation between samples but were nonetheless able to be correctly characterized by spectroscopic analysis in nearly all instances. The time-resolved spectroscopy system operated with 100% sensitivity, 96% specificity, 90% positive predictive value, and 100% negative predictive value.

Table 3 shows the results of tissue characterization of brain tumor experiment 5.

TABLE 3

| TRFS No. | Surgeon prediction | TRFS prediction | Pathological result |
|---|---|---|---|
| 29-30 | Tumor | WM2: infiltrated White Matter | Biopsy 1: White Matter involved by glioma (95% of tumor cellularity) |
| 43 | Tumor | WM2: Infiltrated White Matter | Biopsy 2: White Matter involved by glioma |
| 46-48 | Tumor | WM2: Infiltrated White Matter | Biopsy 3: White Matter involved by glioma |
| 52 | Tumor | WM2: Infiltrated White Matter | Biopsy 4: White Matter involved by glioma |
| 53 | Tumor | WM2: Infiltrated White Matter | Biopsy 5: White Matter involved by glioma |
| 57 | NC | NC: Normal Cortex | Biopsy 6: Normal cortex |

Six locations were assessed for a single patient. The surgeon diagnosed the tissue locations prior to time-resolved classification and biopsy. Histological analysis of the biopsied sample locations were used as the definitive diagnoses for comparison purposes. The tissue characterization by the time-resolved spectroscopy system (TRFS), the diagnostic prediction of the surgeon at the time of biopsy, and the pathological diagnosis of each biopsy were compared. The TRFS prediction correctly identified the tissue 100% of the time whereas the surgeon was unable to distinguish between tumor and tumor-infiltrated white matter.

Table 4 shows the results of tissue characterization of brain tumor experiment 6.

TABLE 4

| TRF No. | Surgeon prediction | TRF prediction | Pathological results |
|---|---|---|---|
| 28 | Tumor | 95% GBM1 and 80% WM1 | Biopsy 1: White Matter with Infiltrative tumor cells |
| 29-30 | Tumor | 100% NC | Biopsy 2: Cerebral cortex |
| 31-32 | NC | 100% NC | Biopsy 3: Superficial cerebral cortex with leptomeninges |
| 33-35 | WM with infiltrative tumor | 100% GBM2 | Biopsy 4: White matter with intramyelinic edema and perivascular accumulation of mature lymphocytes |
| 36-38 | WM with infiltrative tumor | 100% WM2 | Biopsy 5: White matter with minimal edema |
| 39 | WM with infiltrative tumor | 100% WM2 | Biopsy 6: White matter with minimal edema |
| 41-43 | WM | 100% GBM2 | Biopsy 7: white matter with collection of foamy macrophages (40%) |

TABLE 4-continued

| TRF No. | Surgeon prediction | TRF prediction | Pathological results |
|---|---|---|---|
| 45 | GBM | 100% GBM2 | Biopsy 8: White Matter with minimal edema |
| 46-47 | GBM | 100% GBM1 | Biopsy 9: White matter with gliotic scar, rare infiltrative tumor cells (1%) and foamy macrophages (10%) |
| 48-49 | Tumor | 100% NC | Biopsy 10: cerebral cortex with rare infiltrative tumor cells (2%) |
| 52 | GBM | 100% WM2 | Biopsy 11: Cortex with edema, infiltration by tumor cells (60%) |
| 53 | Tumor | 100% WM1 | Biopsy 12: Cortex and white matter with infiltration by tumor cells (50%) |
| 54 | Tumor | 100% NC | Biopsy 13: Cerebral cortex |
| 55-56 | Tumor | 100% WM2 | Biopsy 14: White matter infiltrated by tumor cells (95% cellularity) |
| 57-58 | Unknown | 100% GBM2 | Biopsy 15: White matter infiltrated by tumor cells (60% cellularity), macrophages (20% cellularity) |
| 59-60 | WM | 100% GBM2 | Biopsy 16: Necrotic tissue white matter with infiltration by tumor cells (30% of cellularity) |
| 61-62 | WM with infiltrative tumor | 100% GBM2 | Biopsy 17: White Matter with rare infiltrative tumor cells (1%) and reactive gliosis) |

Seventeen locations were assessed for a single patient. The surgeon diagnosed the tissue locations prior to time-resolved classification and biopsy. Histological analysis of the biopsied sample locations were used as the definitive diagnoses for comparison purposes. The tissue characterization by the time-resolved spectroscopy system (TRFS), the diagnostic prediction of the surgeon at the time of biopsy, and the pathological diagnosis of each biopsy were compared. The TRFS prediction correctly characterized the tissue in 12/15 samples whereas the surgeon correctly predicted the diagnosis in 6/14 samples. Two samples (biopsies 4 and 17) where difficult to interpret.

Table 5 shows the number of true positives, true negatives, false positives, and false negatives of the TRFS system and the surgeon for experiment 6.

TABLE 5

|  | TRFS | Surgeon |
|---|---|---|
| True Positive | 6 | 5 |
| True negative | 6 | 1 |
| False Positive | 1 | 7 |
| False negative | 2 | 1 |

Table 6 shows the sensitivity, specificity, positive predictive value, and negative predictive value of the TRFS system and the surgeon for experiment 6.

TABLE 6

|  | TRFS | Surgeon |
|---|---|---|
| Sensitivity | 75% | 83% |
| Specificity | 85% | 12.5% |
| Positive Predictive Value | 85% | 41% |
| Negative Predictive Value | 75% | 50% |

The TRFS system had a higher specificity, positive predictive value, and negative predictive value than the surgeon. The surgeon had a slightly higher sensitivity than the TRFS system in this experiment. This may be due to the fact that the system was trained to recognize only pure sample of the classifiers and therefore behaves unpredictable when the tissue sample of interest is a mixed type. Additional training of the classification algorithm may improve tissue characterization.

In another example, the probe and/or system described herein is used to characterize a biological sample after biopsy, excision, or extraction from a patient. For example, a tissue sample is excised from a patient undergoing brain surgery. A user positions the probe on, above, or adjacent one or more locations of interest of the excised tissue sample. The tissue sample is then excited using the six-channel probe system described herein in order to characterize the tissue sample as cancer or non-cancer and/or the degree of severity (e.g. clinical grade, malignant or benign) of the lesion. Characterization of the tissue is used to inform further surgical intervention by the surgeon in real-time and provide information relevant for future treatment decisions. In another example, the tissue is excised and prepared for pathohistological examination (e.g. frozen, fixed, and/or embedded in embedding media). The tissue is characterized using time-resolved spectroscopy prior to or after staining for pathohistological diagnosis as a quick preliminary assessment which is relayed to the surgeon while pathohistological analysis is ongoing. In another example, a bodily fluid such as blood or cerebral spinal fluid is collected from a patient and assessed for the presence or absence of a marker of interest such as a fluorescently-labeled therapeutic compound or cancer cell. The time-resolved spectroscopy system is configured to preferentially or optimally collect emitted light from the fluorescent label with a high signal-to-noise ratio. The concentration of the fluorescently-labeled therapeutic compound or the number of fluorescently-labeled cancer cells is determined from the time-resolved spectroscopy, the fluorescence intensity, or a combination thereof.

In another example, the probe and/or system described herein is used to characterize a biological sample beneath the skin, for example, blood or muscle, non-invasively or minimally-invasively. The time-resolved spectroscopy system is configured to emit light which penetrates beneath the skin and detect light which is emitted through the skin. The system is optionally configured to account for scatter caused by the skin or minimize the recordation of unwanted autofluorescence. A user positions the probe on the skin adjacent a location of interest. The probe emits light at a skin penetrating wavelength (for example, UV, visible, or IR depending on the excitation/emission properties of the sample of interest and the depth of the sample below the skin) and the sample is excited. The emitted light is collected and used to characterize the biological sample. For example, a fluorescently-labeled therapeutic agent is intravenously injected and the blood plasma concentration is non-invasively measured (continuously or at one or more pre-determined time points after injection) using a probe system configured to detect the fluorescent label. In another example, a fluorescently-labeled therapeutic agent is intravenously injected and the distribution of the therapeutic agent into a sub-dermal region of interest is non-invasively monitored (continuously or at one or more pre-determined time points after injection) to assess for tissue penetration and inform future dosing regimens.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for classifying or characterizing a biological sample, the system comprising:
   (a) a light source configured to irradiate a biological sample with at least one light pulse, wherein the biological sample generates responsive optical signals in response to the at least one light pulse;
   (b) a signal collection element, wherein the signal collection element comprises a single pixel detector and a filter wheel comprising a plurality of spectral filters, wherein the signal collection element is configured to receive the responsive optical signals from the biological sample and temporally split the responsive optical signals into a plurality of temporally distinct spectral bands corresponding to the plurality of spectral filters; and
   (c) a processor coupled to the signal collection element and configured to: (i) characterize the biological sample using time-resolved fluorescence spectroscopy in response to the plurality of temporally distinct spectral bands in near real-time or real-time, and (ii) direct a display in communication with the processor to show spectroscopic information of the plurality of temporally distinct spectral bands alongside or overlaid on an image of the biological sample.

2. The system of claim 1, wherein each of the temporally distinct spectral bands is time delayed with respect to another.

3. The system of claim 1, wherein the responsive optical signal comprises one or more of a fluorescence spectrum, a Raman spectrum, an ultraviolet-visible spectrum, or an infrared spectrum.

4. The system of claim 1, wherein the single pixel detector comprises a photomultiplier tube.

5. The system of claim 1, wherein the biological sample is characterized by determining one or more of a concentration or a distribution of a molecule in the biological sample based on the plurality of temporally distinct spectral bands.

6. The system of claim 5, wherein the molecule comprises an exogenous fluorescent molecule.

7. The system of claim 5 wherein the molecule comprises an endogenous fluorescent molecule.

8. The system of claim 5, wherein the molecule comprises one or more of Flavin mononucleotide (FMN) riboflavin, Flavin adenine dinucleotide (FAD) riboflavin, lipopigments, endogenous porphyrin, free nicotinamide adenosine dinucleotide (NADH), bound NADH, lipofuscin, PpIX, purodaxine, retinol, riboflavin, chlorotoxin (CTX), 5-aminolevulinic acid (5-ALA), sodium fluorescein, ICG-labeled CTX, ICG-labeled knottin, Cy5-labeled knottin, Cy7-labeled knottin, a fluorescently-conjugated tumor-targeting antibody, a fluorescently-labeled tumor-targeting moiety, a fluorescently labeled antibody, fluorescently-labeled toxin, fluorescently-labeled endotoxin, fluorescently-labeled exotoxins, fluorescently-labeled tumor markers, or pyridoxal phosphate-glutamate decarboxylase (PLP-GAD).

9. The system of claim 1, wherein the biological sample is characterized in about 100 ms or less.

10. The system of claim 1, wherein an identifier is encoded into one or more of the temporally distinct spectral bands using one or more of the plurality of spectral filters.

11. The system of claim 1, wherein the light source is scanned across a pre-determined portion of the biological sample.

12. The system of claim 11, wherein the light source is scanned with a raster scanning pattern.

13. The system of claim 1, wherein the signal collection element is configured to pass the responsive optical signal through an optical assembly comprising one or more optical components having a numerical aperture of 0.22 or greater.

14. The system of claim 13, wherein the numerical aperture is of one or more fibers of the optical assembly, and wherein the total cross-sectional area is based on a number of the one or more fibers and a diameter of the one or more fibers.

15. The system of claim 1, wherein a gain of the single pixel detector is automatically adjusted.

16. The system of claim 1, wherein the at least one light pulse comprises a wavelength in a range of about 300 nm to about 1100 nm.

17. The system of claim 1, wherein the biological sample is obtained from a surgical procedure of a patient.

18. The system of claim 1, wherein the filter wheel comprises a rotating filter wheel.

19. The system of claim 1, wherein the biological sample is characterized as normal, benign, malignant, scar tissue, necrotic, hypoxic, viable, non-viable, or inflamed.

20. The system of claim 1, further comprising an optical delay element configured to apply an optical delay to the responsive optical signals and optically couple the responsive optical signal to the signal collection element.

21. The system of claim 1, wherein the image of the biological sample comprises a brightfield image.

22. The system of claim 1, wherein the image of the biological sample comprises a pre-operative image.

23. The system of claim 1, wherein the image of the biological sample comprises an intra-operative image.

24. The system of claim 1, wherein the image of the biological sample comprises a post-operative image.

* * * * *